(12) United States Patent
Lewis et al.

(10) Patent No.: US 10,730,604 B2
(45) Date of Patent: Aug. 4, 2020

(54) SANDWICH PANEL INSERTS AND RELATED METHODS

(71) Applicant: The Boeing Company, Chicago, IL (US)

(72) Inventors: Michael Steven Lewis, Lake Forest Park, WA (US); Brad Jeremy Reeves, Everett, WA (US); James S. Bradley, Arlington, WA (US); Christopher John Mills, Charleston, SC (US); Supriya Balachander, North Charleston, SC (US); Brian M. Wilkie, Charleston, SC (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 16/122,658

(22) Filed: Sep. 5, 2018

(65) Prior Publication Data

US 2019/0009880 A1 Jan. 10, 2019

Related U.S. Application Data

(62) Division of application No. 14/818,004, filed on Aug. 4, 2015, now Pat. No. 10,099,767.

(51) Int. Cl.
*F16B 5/01* (2006.01)
*B64C 1/12* (2006.01)
(Continued)

(52) U.S. Cl.
CPC .................. *B64C 1/12* (2013.01); *F16B 5/01* (2013.01); *F16L 5/00* (2013.01); *H02G 3/22* (2013.01)

(58) Field of Classification Search
CPC ......... F16B 5/01; B32B 2605/18; B32B 3/12; B32B 2250/40; B32B 3/266; B32B 2605/00; B32B 7/08; B64C 1/12
See application file for complete search history.

(56) References Cited

U.S. PATENT DOCUMENTS

| 1,056,452 A | 3/1913 | Remhilt |
| 1,194,792 A | 8/1916 | Stewart |

(Continued)

FOREIGN PATENT DOCUMENTS

| DE | 102014014624 | 4/2016 |
| DE | 102015211798 | 9/2016 |

(Continued)

OTHER PUBLICATIONS

Printout of The Young Engineers, Inc., New Products webpage, downloaded from youngengineers.com/newproducts on Apr. 6, 2015.

(Continued)

*Primary Examiner* — Jun S Yoo
(74) *Attorney, Agent, or Firm* — Dascenzo Intellectual Property Law, P.C.

(57) ABSTRACT

The present disclosure relates to inserts for use with sandwich panels, such as composite panels, and related methods. Presently disclosed inserts may include a retention feature and/or an anti-rotation feature that may be configured to retain the insert in place within a bore formed in the sandwich panel. In this manner, presently disclosed inserts may be secured without the use of adhesive compounds, which may increase efficiency and/or reduce costs in manufacturing apparatus that include one or more sandwich panels having one or more inserts placed therein. Presently disclosed methods of installing an insert into a sandwich panel may include rotating the insert with respect to the sandwich panel as the insert is installed, such that a portion of the insert may be positioned under the skin of the (Continued)

sandwich panel (e.g., a portion of the insert may be positioned between the skin and the core of the sandwich panel).

17 Claims, 20 Drawing Sheets

(51) Int. Cl.
*F16L 5/00* (2006.01)
*H02G 3/22* (2006.01)

(56) References Cited

U.S. PATENT DOCUMENTS

| | | | |
|---|---|---|---|
| 2,098,389 A | 6/1937 | Hutchison | |
| 2,883,012 A | 4/1959 | Hoffman | |
| 3,078,002 A * | 2/1963 | Rodgers, Jr. | F16B 19/1063 |
| | | | 52/787.12 |
| 3,174,523 A | 3/1965 | Hult | |
| 3,252,493 A | 5/1966 | Smith | |
| 3,296,765 A * | 1/1967 | Rohe | F16B 5/01 |
| | | | 52/787.12 |
| 3,355,850 A * | 12/1967 | Rohe | F16B 39/34 |
| | | | 52/787.1 |
| 3,384,142 A | 5/1968 | Phelan | |
| 3,512,328 A * | 5/1970 | Eriksson | F16B 5/01 |
| | | | 52/787.1 |
| 3,579,942 A | 5/1971 | Cole | |
| 3,601,278 A | 8/1971 | Merz et al. | |
| 3,621,557 A | 11/1971 | Cushman et al. | |
| 3,640,327 A | 2/1972 | Burt | |
| 3,651,563 A * | 3/1972 | Volkmann | F16B 5/01 |
| | | | 29/523 |
| 3,678,535 A | 7/1972 | Charles | |
| 3,678,980 A | 7/1972 | Gutshall | |
| 3,778,957 A | 12/1973 | Appleberry | |
| 3,962,843 A | 6/1976 | King, Jr. | |
| 4,266,687 A | 5/1981 | Cummings | |
| 4,283,898 A | 8/1981 | Claver | |
| 4,423,819 A | 1/1984 | Cummings | |
| 4,509,308 A | 4/1985 | Dettfurth et al. | |
| 4,717,612 A * | 1/1988 | Shackelford | B32B 3/12 |
| | | | 428/116 |
| 4,981,735 A | 1/1991 | Rickson | |
| 5,006,025 A | 4/1991 | Duran | |
| 5,093,957 A | 3/1992 | Do | |
| 5,253,967 A | 10/1993 | Orban et al. | |
| 5,542,777 A * | 8/1996 | Johnson | B61D 17/043 |
| | | | 403/384 |
| 5,620,287 A | 4/1997 | Pratt | |
| 5,682,678 A * | 11/1997 | Gallagher | F16B 5/01 |
| | | | 29/402.15 |
| 6,126,355 A | 10/2000 | Clover, Jr. | |
| 6,488,460 B1 | 12/2002 | Smith et al. | |
| 6,641,343 B1 | 11/2003 | Duran | |
| 8,382,415 B1 | 2/2013 | Goldbaum | |
| 8,814,430 B2 | 8/2014 | Veternik et al. | |
| 9,284,972 B1 * | 3/2016 | Reeves | F16B 5/0208 |
| 9,757,867 B2 | 9/2017 | Heine et al. | |
| 2004/0265091 A1 | 12/2004 | Cheung | |
| 2005/0103433 A1 | 5/2005 | Flynn et al. | |
| 2006/0137294 A1 | 6/2006 | Waits, Jr. et al. | |
| 2008/0031685 A1 | 2/2008 | Dupriest et al. | |
| 2008/0302545 A1 * | 12/2008 | Kulesha | A62C 3/08 |
| | | | 169/62 |
| 2012/0174765 A1 * | 7/2012 | Kunda | F16B 5/025 |
| | | | 89/36.08 |
| 2012/0189401 A1 | 7/2012 | Chiu | |
| 2013/0108392 A1 | 5/2013 | Henrikson, Jr. | |
| 2013/0240701 A1 | 9/2013 | Marks | |
| 2016/0031184 A1 * | 2/2016 | Lewis | B32B 7/08 |
| | | | 428/136 |
| 2016/0069375 A1 | 3/2016 | Henricksen, Jr. | |
| 2017/0253006 A1 | 9/2017 | Lopez et al. | |

FOREIGN PATENT DOCUMENTS

| | | |
|---|---|---|
| EP | 0273515 | 7/1988 |
| EP | 2594809 | 5/2013 |
| EP | 2610505 | 7/2013 |
| EP | 3059459 | 8/2016 |
| GB | 861884 | 3/1961 |
| GB | 1059928 | 2/1967 |
| GB | 2017857 | 10/1979 |
| WO | WO 2009/050239 | 4/2009 |
| WO | WO 2014/088600 | 6/2014 |

OTHER PUBLICATIONS

Printout of screenshots of Dupo, Threaded Inserts webpage, downloaded from dupo.nl on Apr. 6, 2015.
Printout of Shur-Lok Products, Fasteners for Sandwich Structure webpage, downloaded from shur-lok.eu/contents/products/sandwich on Jan. 14, 2016.
"TYE2400 Series Insert: Molded In, Adjustable, Threaded, Self-Locking, Clearance Hole, Sandwich Panel," The Young Engineers, Inc., available at least as early as Mar. 31, 1989.
Printout of The Young Engineers, Inc., Composite Fasteners, Non-metallic Fasteners webpage, downloaded from youngengineers.com/Composites on Jan. 14, 2016.
Printout of The Young Engineers, Inc., Floating Nut Fasteners webpage, downloaded from youngengineers.com/Floaters on Jan. 14, 2016.
Printout of The Young Engineers, Inc., Loret Isolator Inserts webpage, downloaded from youngengineers.com/Isolators on Jan. 14, 2016.
Printout of The Young Engineers, Inc., Molded in Threaded Fasteners webpage, downloaded from youngengineers.com/MoldedInThreaded on Jan. 14, 2016.
Printout of MSC Industrial Supply Co., Brass Press Fit Fastener webpage, downloaded from mscdirect.com/industrialtools/brass-press-fit-fastener on Jan. 8, 2016.
Machine-generated translation of DE 102014014624, downloaded from Espacenet.com on Dec. 26, 2018.
Machine-generated translation of DE 102015211798, downloaded from Espacenet.com on Dec. 26, 2018.

* cited by examiner

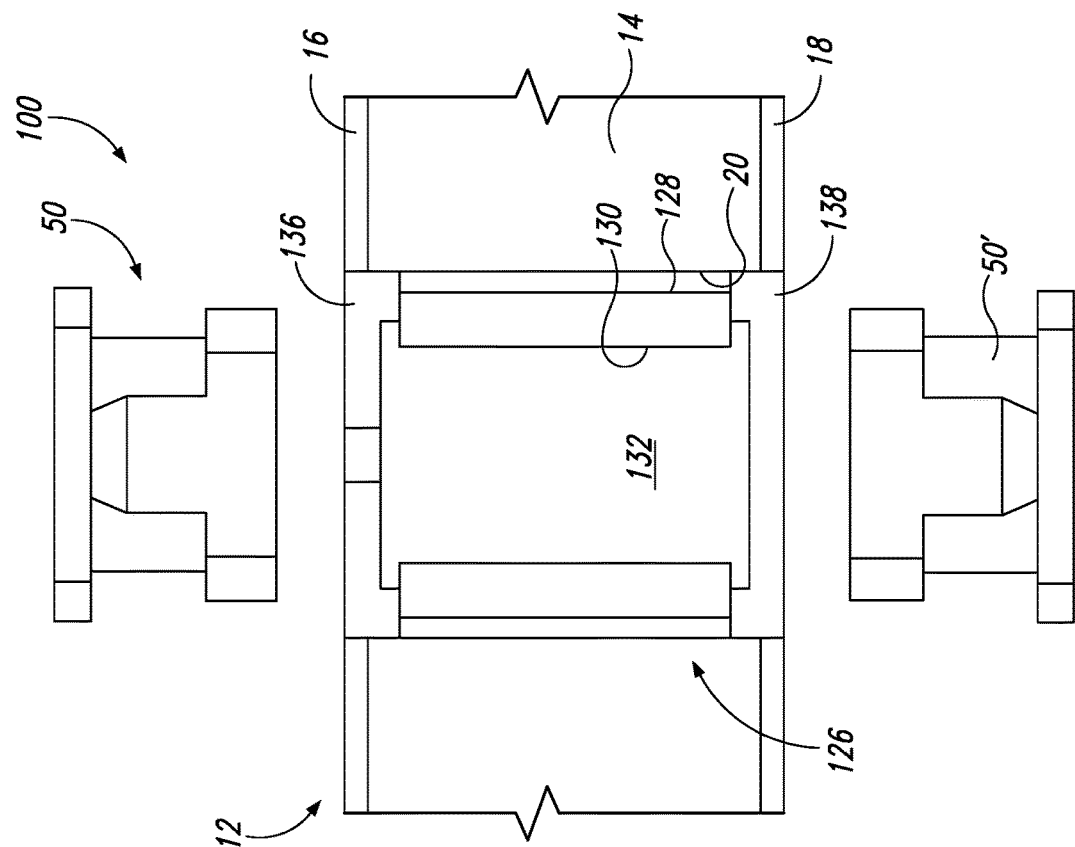
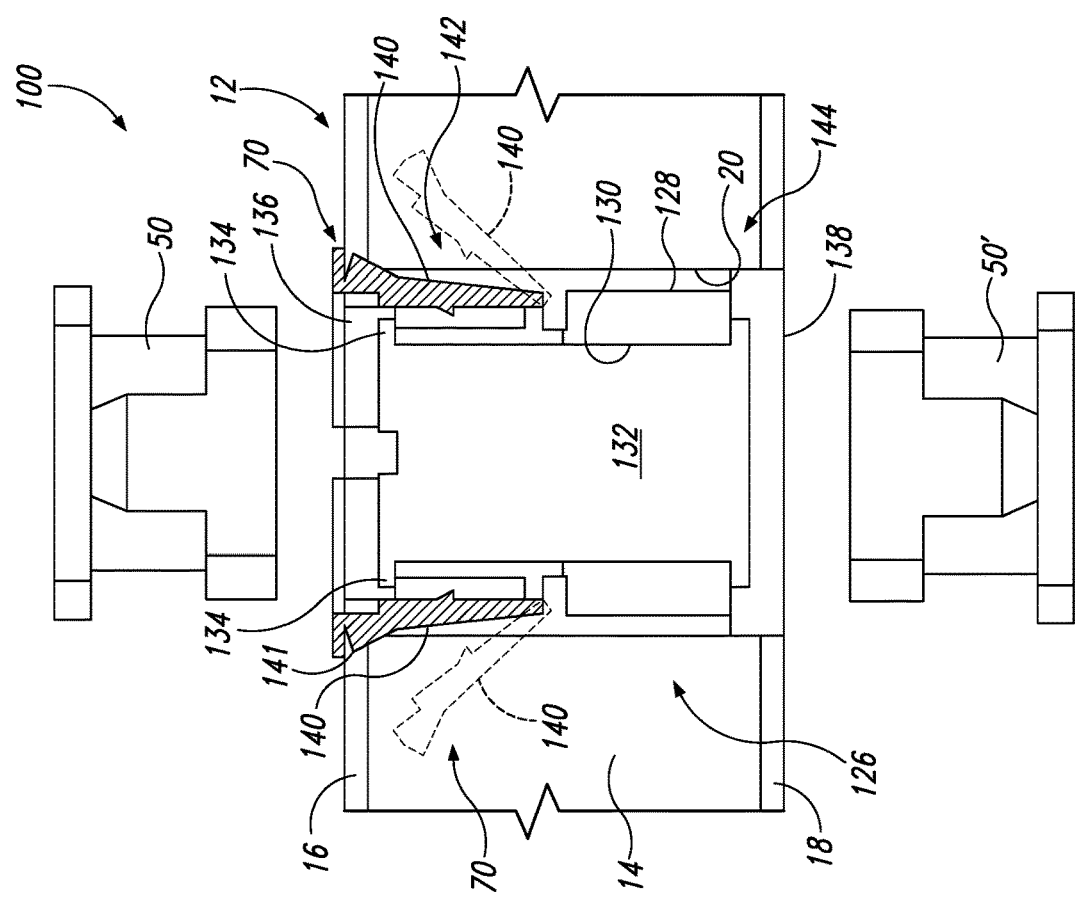

SANDWICH PANEL INSERTS AND RELATED METHODS

RELATED APPLICATION

The present application is a divisional of and claims priority to U.S. patent application Ser. No. 14/818,004, filed on Aug. 4, 2015, entitled "SANDWICH PANEL INSERTS AND RELATED METHODS," the complete disclosure of which is incorporated by reference.

FIELD

The present disclosure relates to sandwich panel inserts and related methods.

BACKGROUND

Sandwich panels (e.g., a core structure sandwiched between two layers of material, or skins) are often used in the construction of aircraft, because they have high strength to weight ratios. Depending on the specific location and application of a sandwich panel in an aircraft, one or more round inserts may be required to be inserted within or through a sandwich panel in order to affix one or more other structures or fasteners to the panel. Round inserts may be used to transfer localized loads (e.g., via a pin, bolt, screw, joint, or other structure) to the sandwich panel, such as to fasten the sandwich panel to another structure, join multiple sandwich panels to each other, and/or attach one or more external objects to the sandwich panel. For example, round inserts may provide a channel for wire bundles to be passed from one side of the sandwich panel to the other, or round inserts may be configured to receive a pin or bolt or other fastener in order to secure another panel or object to the sandwich panel, via the round insert. In the aerospace industry, such sandwich panels and round inserts may be used to assemble the interior main structure and/or secondary structures of the aircraft, and/or may be used to form floor boards, wall panels, galleys, stow bins, overhead compartments, lavatories, and/or other structures within the aircraft. Such sandwich panels and round inserts are also used in other industries.

FIGS. 1 and 2 illustrate a conventional round insert 10 installed in a sandwich panel 11, shown schematically in cross-section. Sandwich panel 11 may include a core 13 sandwiched between a first skin 15 and a second skin 17. First skin 15 and second skin 17 may be rigid or semi-rigid skins, and are typically relatively thin compared to core 13, which is typically formed of a lightweight material. Conventional round insert 10 may be inserted into a circular bore 19 formed in sandwich panel 11, which may be a blind bore 21 (FIG. 1) or a through-bore 23 (FIG. 2). Blind bore 21 may extend through one of the skins (e.g., first skin 15) and into the core 13, towards the other skin (e.g., second skin 17), whereas through-bore 23 may extend entirely through first skin 15, second skin 17, and core 13. As shown in FIGS. 1 and 2, a flange portion 27 of conventional round insert 10 may be substantially flush with one of more of first skin 15 and second skin 17, or, as shown in FIG. 3, flange portion 27 of conventional insert 10 may lay on top of (e.g., on an outer surface of) first skin 15 or second skin 17.

In conventional techniques, an adhesive material, such as a potting compound or epoxy, is injected through potting holes, or vents, in conventional round insert 10 to fill a gap or space 29 between conventional insert 10 and core 13 of sandwich panel 11. The adhesive material, once fully cured, serves to secure the insert in place within bore 19 of sandwich panel 11, substantially preventing relative movement of conventional round insert 10 with respect to sandwich panel 11 and retaining conventional insert 10 within circular bore 19 (e.g., resisting pull-out, rotation, and lateral movement of conventional round insert 10) once the adhesive compound dries, solidifies, and/or cures. However, the use of such adhesive compounds is labor-intensive and may take a significant period of time to cure, such as 2-4 hours or more. During this time, the conventional round insert is not stable within the sandwich panel, and loads cannot be applied to conventional round insert 10, which limits efficiency of the manufacturing process. Furthermore, often, conventional round inserts 10 must be held in place during the cure time (e.g., with the application of masking tape to hold conventional round insert 10 in place), and even with such mitigating techniques, the insert may shift during curing.

In some methods, if excess adhesive material has squeezed out around conventional round insert 10, it must be removed from conventional round insert 10, so that secondary objects (e.g., brackets) may be substantially flush with the insert and sandwich panel. Conventional round inserts 10 and methods of using and/or installing the same also may suffer from "high inserts" or "low inserts," where the conventional round insert is ultimately positioned too far out of the circular bore ("high") or too far into the circular bore ("low"), respectively (e.g., the outer surface of conventional round insert 10 may be too "high," sticking out of the circular bore, or too "low," too far recessed within the circular bore, in either case thereby creating an un-smooth interface with the sandwich panel skin). Such imperfect positioning may be the result of shifting during cure time and/or poor initial placement, and may prevent the proper positioning of the bracket or other secondary device secured via conventional round insert 10. Expansion forces from the adhesive material expanding during curing may also contribute to defects, such as shifting of conventional round insert 10, and may cause visible "mark-off" on the opposite side of the sandwich panel, often an unacceptable result in the finished product.

The use of adhesive material to bond a conventional round insert 10 within the circular sandwich panel bore may disadvantageously prevent automation of the manufacturing technique. Furthermore, installation of an incorrect type of conventional round insert 10 may be difficult and time-consuming to correct, especially in techniques where the conventional round inserts are secured with adhesive material. Many different types of conventional round inserts may be installed within a single sandwich panel, and of the different types of conventional round inserts, they may be interchangeable within the same size circular bores formed in the sandwich panel, thereby making the installation of an incorrect conventional round insert fairly commonplace. Adhesive materials used in conventional techniques also may fail, even after curing, which may result in pull-out of conventional round insert 10 from the circular bore or spinning of the insert within the circular sandwich panel bore when torque forces breakage of the bond between the conventional round insert and the adhesive compound. Such issues with conventional round inserts 10 and methods of installing the same within a sandwich panel are on-going and problematic in a variety of industries.

SUMMARY

Presently disclosed inserts for use with sandwich panels, and related methods (e.g., methods of installing one or more such inserts in a sandwich panel) may address one or more issues with prior art, conventional inserts and related methods. For example, some inserts according to the present disclosure may be retained within the sandwich panel without the use of adhesive potting compound, and thereby may be stable and able to accommodate useful loads immediately upon insertion, rather than having to wait for the potting compound to cure. Disclosed inserts may allow for removal of the insert from the sandwich panel after installation, may improve positioning of the insert with respect to the sandwich panel (e.g., flushness of the insert), and/or may allow for automation of the manufacturing process.

One example of an insert according to the present disclosure may be configured to be installed in a sandwich panel, the sandwich panel having a first skin, a second skin opposite the first skin, and a core therebetween. The insert may generally include a panel-engaging structure configured to engage the sandwich panel when the insert is installed in the sandwich panel (e.g., the panel-engaging structure may be configured to engage the first skin or the second skin of the sandwich panel), an opposing end arranged opposite the panel-engaging structure, a body configured to engage the core of the sandwich panel when the insert is installed in the sandwich panel, a retention feature configured to retain the insert in the sandwich panel without the use of adhesives, and an anti-rotation feature configured to prevent rotation of the insert with respect to the sandwich panel. The body of the insert may include a hole formed therein, the hole extending from the panel-engaging structure into the body and to the opposing end. The anti-rotation feature may be configured to resist rotation of the insert with respect to the sandwich panel, about a longitudinal axis of the hole, and the insert may be configured to receive a secondary object within the hole (e.g., a bracket, a bolt, a wire bundle, etc.), the secondary object being configured to transfer a localized load to the sandwich panel via the insert.

Related methods are also disclosed. For example, one method of installing an insert into a bore formed in a sandwich panel may include providing at least one insert according to the present disclosure, forming at least one bore in the sandwich panel, and installing the at least one insert into a respective one of the at least one bores, such that the panel-engaging structure of the insert engages the sandwich panel, and the body of the insert is positioned within the respective bore in the core of the sandwich panel. In some methods, the insert may be rotated with respect to the bore, as it is installed in the sandwich panel. For example, the insert may be rotated such that a portion of the insert (e.g., a retention feature of the insert) may be positioned between the core of the sandwich panel and either the first skin or the second skin of the sandwich panel.

BRIEF DESCRIPTION OF THE DRAWINGS

FIG. 29 is an exploded view of another example of an insert-receiving base according to the present disclosure, along with two inserts that may be installed within the insert-receiving base.

FIG. 30 is an exploded view of another example of an insert-receiving base according to the present disclosure, along with two inserts that may be installed within the insert-receiving base.

DESCRIPTION

Figure 4:
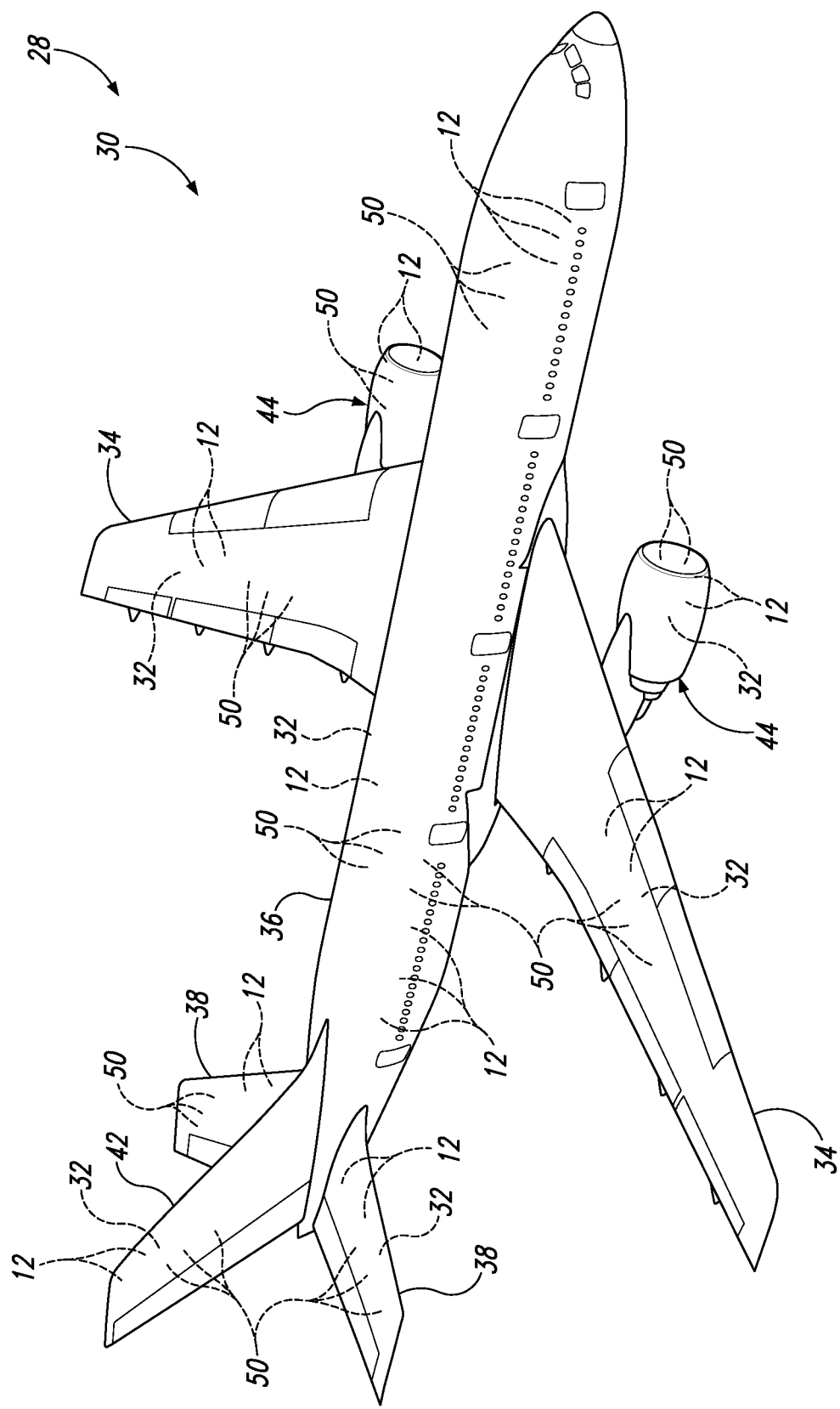
FIG. 4 is a perspective, schematic view of illustrative, non-exclusive examples of an apparatus that may include one or more sandwich panels including one or more inserts according to the present disclosure.

With reference to FIG. 4, one or more inserts 50 according to the present disclosure may be installed in a sandwich panel, which may be useful in many different applications, at least partly due to their high strength-to-weight ratios. For example, such sandwich panels including one or more inserts 50 may be useful in the aerospace, automotive, electronic, construction, military, recreation, and/or motorsport industries. In FIG. 4, an example of an apparatus 28 that may include one or more sandwich panels 12 and inserts 50 generally is illustrated in the form of an aircraft 30. Aircraft 30 may take any suitable form, including commercial aircraft, military aircraft, or any other suitable aircraft. While FIG. 4 illustrates an aircraft 30 in the form of a fixed wing aircraft, other types and configurations of aircraft are within the scope of aircraft 30 according to the present disclosure, including (but not limited to) rotorcraft and helicopters.

Apparatus 28 (e.g., aircraft 30) may include one or more structures 32 formed from one or more sandwich panels 12, one or more of which may be composite panels. Each sandwich panel 12 includes a core 14 formed of a relatively lightweight material, such as a plurality of elongate cells, typically having hexagonal or rectangular cross-sections. Such cores 14 may be referred to as honeycomb cores, but other shapes and configurations also may be used, such as a corrugated structure and/or foam materials. Core 14 may include an open-cell structure and/or a closed-cell structure. Core 14 may be formed of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and/or polypropylene. Sandwich panels 12 include at least two skins, first skin 16 being positioned on one side of core 14 and second skin 18 being positioned on the other side of core 14, arranged to form a three-layer sandwich structure. The skins 16, 18 are typically rigid, with core 14 spanning between the skins. First skin 16 and second skin 18 may be formed of a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or hardwood. First skin 16 and second skin 18 may be formed of the same material(s) in some examples, or may be formed of different materials in other examples.

Structures 32 may include one or more sandwich panels 12, joints formed between two or more sandwich panels 12, and/or three-dimensional structures formed using one or more sandwich panels 12. As illustrative, non-exclusive examples, structures 32 may be utilized in such aircraft structures as wings 34, fuselages 36, horizontal stabilizers 38, overhead storage bins 40, vertical stabilizers 42, and engine housings 44; however, other components of aircraft 30 additionally or alternatively may include structures 32 such as sandwich panels 12 and/or joints formed between two or more sandwich panels 12. Other applications in aircraft 30 for sandwich panels 12 including one or more inserts 50 according to the present disclosure include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, apparatus 28 (including one or more sandwich panels 12 and inserts 50) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Figure 5:
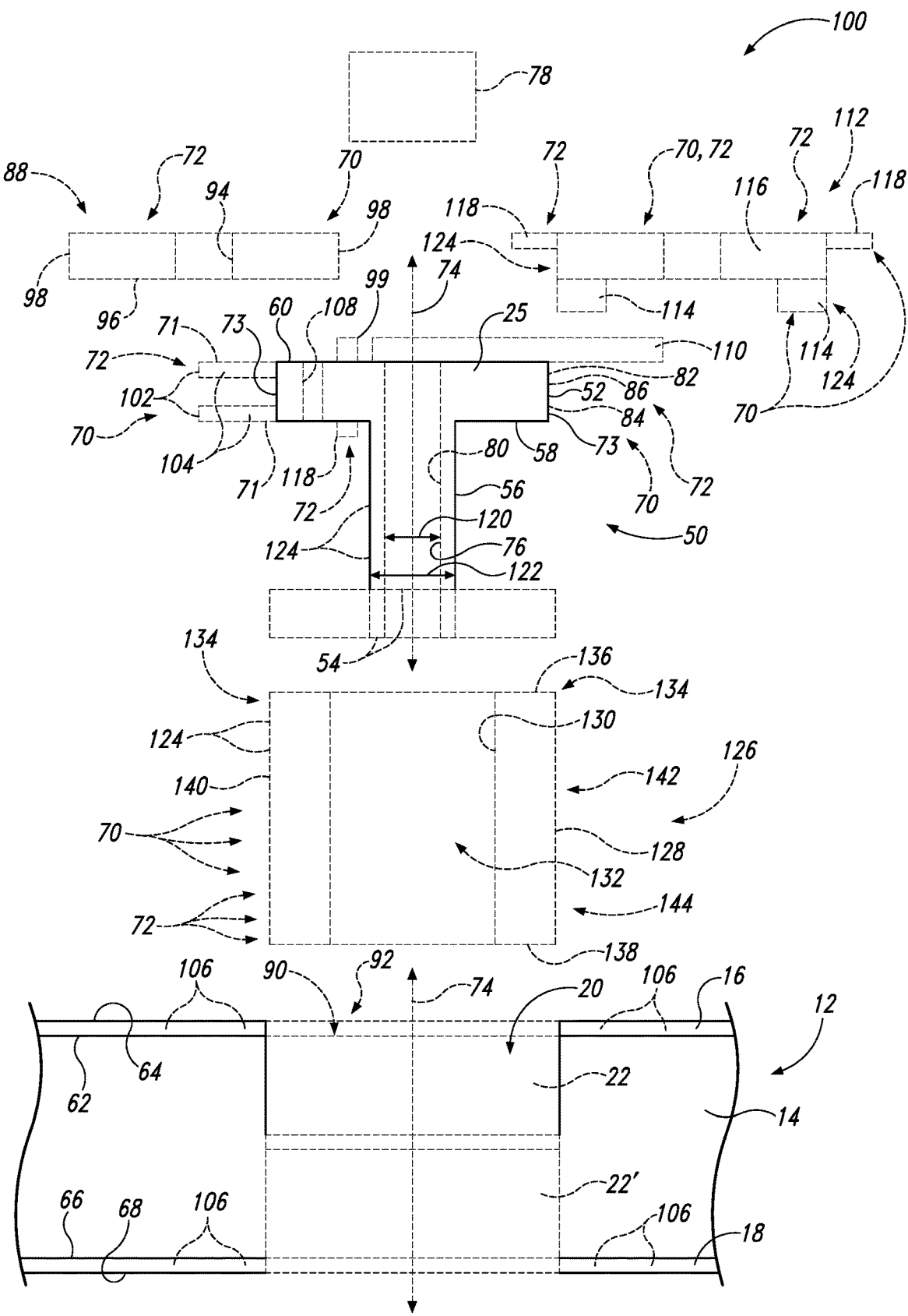
FIG. 5 is a schematic view of illustrative, non-exclusive examples of an insert according to the present disclosure.

FIG. 5 shows a schematic representation of systems 100 that include one or more inserts 50 that may be installed within a respective bore 20 of sandwich panel 12. Generally, presently disclosed inserts 50 may be designed to include one or more retention features 70 and/or anti-rotation features 72 such that inserts 50 may be self-retaining within bore 20 of sandwich panel 12. In some examples, insert 50 may be self-retaining, stable, and/or able to accommodate useful loads once installed in bore 20, without the use of adhesive compounds, such as potting compound. Alternatively, in examples where adhesive compounds are used, insert 50 may be self-retaining, stable, and/or able to accommodate useful loads immediately upon installation in bore 20, before the adhesive compound dries or cures. This may allow for immediate use of insert 50, without needing to wait for any adhesive compound to cure or dry. For example, presently disclosed inserts 50 may accommodate installation of features such as fasteners and brackets that may facilitate continuation of the manufacturing process, either before the adhesive compound cures, or without the use of such adhesive compound. Such inserts 50 may therefore increase manufacturing efficiency by reducing the amount of time spent waiting for adhesive compound to cure, during which time additional process steps are limited or non-existent. Thus, presently disclosed insert 50 may ultimately result in reduced cycle times and/or lower costs associated with certain manufacturing processes. Even in examples where adhesive compound is used with presently disclosed inserts 50, the self-retaining features of insert 50 may allow for manufacturing to continue (e.g., may allow for a secondary object to be installed within insert 50) before the adhesive compound cures. Furthermore, such presently disclosed inserts may be more stable and/or able to accommodate useful loads once installed within sandwich panel 12, at least partially due to reliance on more than just the adhesive compound to resist pull-out and/or rotation of insert 50 with respect to bore 20. In the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Inserts 50 may include a panel-engaging structure 52, an opposing end 54 opposite panel-engaging structure 52, and a body 56 disposed therebetween, body 56 being configured to engage core 14 of sandwich panel 12 when insert 50 is installed within bore 20 of sandwich panel 12. In some examples, panel-engaging structure 52 may include a flange (e.g., flange 25) having an inner flange surface 58 facing opposing end 54, and an outer flange surface 60 facing away from opposing end 54. Insert 50 may be positioned with respect to sandwich panel 12 such that inner flange surface 58 engages first skin 16 or second skin 18, or insert 50 may be positioned with respect to sandwich panel 12 such that outer flange surface 60 engages first skin 16 or second skin 18.

First skin 16 may include a first inner surface 62 facing core 14, and a first outer surface 64 facing away from core 14. Likewise, second skin 18 may include a second inner surface 66 facing core 14, and a second outer surface 68 facing away from core 14. When installed in sandwich panel 12, insert 50 may engage one or both of first skin 16 and second skin 18. For example, insert 50 may be oriented such that panel-engaging structure 52 engages first skin 16 or second skin 18. When panel-engaging structure 52 engages first skin 16, body 56 may extend into core 14, towards second skin 18. In some such examples, insert 50 may extend substantially through the entire sandwich panel 12, such that opposing end 54 engages and/or is substantially flush with second skin 18 of sandwich panel 12. In other examples, body 56 may extend only partially into core 14, such that opposing end 54 may engage core 14. Similarly, when panel-engaging structure 52 engages second skin 18, body 56 may extend into core 14, towards first skin 16. In some such examples, insert 50 may extend substantially through the entire sandwich panel 12, such that opposing end 54 engages and/or is positioned adjacent to first skin 16 of sandwich panel 12. In other examples, body 56 may extend only partially into core 14, such that opposing end 54 may engage core 14. Similarly, opposing end 54 may be substantially flush with second outer surface 68 of second skin 18, substantially flush with first outer surface 64 of first skin 16, or positioned within core 14, depending on positioning of insert 50 with respect to bore 20.

Specifically, insert 50 may be positioned in bore 20 such that specific portions of insert 50 are engaged with specific portions of sandwich panel 12. For example, at least a portion of panel-engaging structure 52 may be positioned adjacent and/or configured to engage first inner surface 62 of first skin 16 or second inner surface 66 of second skin 18. In some specific examples, inner flange surface 58 may engage first outer surface 64 of first skin 16 or second outer surface 68 of second skin 18. In other examples, outer flange surface 60 may engage first inner surface 62 of first skin 16 or second inner surface 66 of second skin 18. Thus, at least a portion of panel-engaging structure 52 may be positioned between first inner surface 62 of first skin 16 and core 14 when insert 50 is installed in sandwich panel 12, or at least a portion of panel-engaging structure 52 may be positioned between second inner surface 66 of second skin 18 and core 14 when insert 50 is installed in sandwich panel 12. For example, at least 5%, at least 10%, at least 20%, at least 25%, at least 33%, at least 40%, at least 50%, at least 67%, and/or at least 75% of a surface area of panel-engaging structure 52 may be positioned between first inner surface 62 and core 14 of sandwich panel 12 when insert 50 is installed in sandwich panel 12. Similarly, at least 5%, at least 10%, at least 20%, at least 25%, at least 33%, at least 40%, at least 50%, at least 67%, and/or at least 75% of a surface area of panel-engaging structure 52 may positioned between second inner surface 66 and core 14 of sandwich panel 12 when insert 50 is installed in sandwich panel 12.

Body 56, which may be generally cylindrical, may include a hole 76 formed therein, which may extend from panel-engaging structure 52 into body 56 and to or towards opposing end 54. In some examples, hole 76 may extend through the entire insert 50, from panel-engaging structure 52 to opposing end 54. Hole 76 may be substantially concentric with bore 20, such that longitudinal axis 74 of bore 20 is also the longitudinal axis of hole 76. Hole 76 may have a hole diameter 120, which may be substantially constant along the length of hole 76, or may be variable along the length of hole 76. Similarly, body 56 may have a body diameter 122 that is substantially constant along the length of body 56, or may be variable along the length of body 56.

Insert 50 may be configured to receive a secondary object 78 within hole 76. Secondary object 78 may be configured to transfer a localized load to sandwich panel 12 via insert 50. For example, secondary object 78 may include one or more of one or more of a pin, a bolt, a rivet, a screw, a joint, a standoff, an angle, a wire, a cable, a secondary insert, and a wire bundle. Hole 76 may include internal threads 80 configured to engage secondary object 78.

Inserts 50 may include one or more retention features 70 and/or one or more anti-rotation features 72, which may be configured to resist pull-out and rotation, respectively, of insert 50 with respect to sandwich panel 12. In other words, retention feature 70 may be configured to retain insert 50 in place within bore 20 of sandwich panel 12. For example, at least a portion of retention feature 70 may be configured to be positioned between first skin 16 and second skin 18 of sandwich panel 12 when insert 50 is installed in sandwich panel 12 (i.e., retention feature 70 may be configured to be positioned within and extend into a portion of the core 14 that is between the first skin 16 and the second skin 18 of the sandwich panel 12). Thus, insert 50 may be configured to be self-retaining in position in sandwich panel 12, without the use of adhesives (e.g., potting compound), or before any adhesives have cured, at least partially due to retention features 70.

In some examples, as will be described in further detail below, retention feature 70 may be one or more portions of panel-engaging structure 52. In some examples, one or more retention features 70 may be configured to engage core 14, first skin 16, and/or second skin 18 of sandwich panel 12 when insert 50 is installed within bore 20. Additionally or alternatively, one or more retention features 70 may be configured to be positioned between first inner surface 62 and core 14 or between second inner surface 66 and core 14 when insert 50 is installed within sandwich panel 12. Additionally or alternatively, one or more retention features 70 may comprise an expanding portion 124 that is configured to expand into core 14 of sandwich panel 12 when insert 50 is installed within sandwich panel 12. Additionally or alternatively, retention feature 70 may comprise a plurality of coarse threads 102 positioned adjacent panel-engaging structure 52 and configured to engage core 14 of sandwich panel 12.

In some examples, retention feature 70 and/or anti-rotation feature 72 may include a snap ring 112 that may be configured to be snapped onto insert 50 prior to installing insert 50 within sandwich panel 12, or may be configured to have an insert 50 snapped into it once snap ring 112 is positioned with respect to bore 20. One or more portions of snap ring 112 may be configured to expand and/or engage first skin 16, second skin 18, and/or core 14, as snap ring 112 is forced into bore 20 of sandwich panel 12. For example, one or more cleats 114 may extend axially from a snap ring body 116 (which may also be referred to as a flange of the snap ring) of snap ring 112, said cleats 114 being configured to engage first skin 16, second skin 18, and/or core 14 when installed in sandwich panel 12. In some examples, snap ring 112 may first be positioned on insert 50, to form a subassembly that is positioned in bore 20 together. As the subassembly is forced into bore 20, insert 50 may press outwardly on cleats 114, thereby expanding cleats 114 radially outward and causing them to engage and press into core 14 and/or engage with either side of first skin 16 or second skin 18.

Snap ring 112 may include one or more rotation stops 118 configured to engage insert 50, in order to substantially prevent rotation of insert 50 with respect to snap ring 112. In some examples, rotation stops 118 may extend radially from snap ring body 116, such as radially outward, or radially inward, from snap ring body 116. Additionally or alternatively, one or more rotation stops 118 may be present on the insert 50 itself. Snap rings 112 may be configured for use with presently disclosed inserts 50 and/or with conventional round inserts 10.

In some examples, insert 50, with or without snap ring 112, may be configured to be rotated as it is installed (i.e., during the installation process, or as part of its installation) within bore 20 of sandwich panel 12. For example, insert 50 may be at least partially inserted into bore 20, and then rotated about a longitudinal axis 74 of bore 20 with respect to sandwich panel 12, to further secure insert 50 within sandwich panel 12. For example, at least a portion of panel-engaging structure 52 may be rotated to a position between core 14 and first skin 16 or second skin 18. Additionally or alternatively, rotation of insert 50 may serve to position retention features 70 such that they increase retention of insert 50, and/or lock or engage anti-rotation features, such that further rotation of insert 50 within bore 20 is substantially prevented.

Anti-rotation feature 72 may be configured to resist rotation of insert 50 with respect to the sandwich panel, such as about longitudinal axis 74 of bore 20, once insert 50 is positioned within bore 20 (e.g., anti-rotation features 72 may be configured to resist further rotation of insert 50 with respect to bore 20 after insert 50 is fully inserted in bore 20, wherein such insertion may include rotation of insert 50). In other words, in examples where insert 50 is rotated into its final position within bore 20, one or more anti-rotation features 72 may be configured to substantially prevent additional rotation beyond the final position of insert 50, thereby substantially retaining the installed position of insert 50 with respect to bore 20.

As shown in FIG. 5, longitudinal axis 74 may be substantially perpendicular to a first plane defined by panel-engaging structure 52 (e.g., inner flange surface 58 and/or outer flange surface 60) and to a second plane defined by opposing end 54. In some examples, a blade portion 104 may extend from insert 50 or snap ring 112. Such blade portions 104 may be configured to aid in positioning insert 50 and/or snap ring 112 with respect to sandwich panel 12, and/or may be configured to facilitate initiation of rotation of insert 50 and/or snap ring 112. Additionally or alternatively, blade portions 104 and/or anti-rotation features 72 may be configured to engage one or more slits 106 formed in first skin 16 and/or second skin 18 of sandwich panel 12. For example, one or more slits 106 may radially extend from one or more bores 20 of sandwich panel 12. In some examples, one or more bores 20 may each include at least 1, at least 2, at least 4, at least 8, at least 12, at least 16, and/or at least 20 slits radially extending from the respective bore 20. Such slits 106 may be spaced substantially equally about the respective circumference of the respective bore 20, and/or may be arranged in respective adjacent pairs of slits 106. In some examples, a portion of first skin 16 and/or second skin 18 may be depressed adjacent one or more slits 106. Additionally or alternatively, anti-rotation feature 72 may include one or more extensions 71 extending from panel-engaging structure 52, such as extending from a primary perimeter 73 of panel-engaging structure 52. Extensions 71 may be any suitable shape, such as wedge-shaped, and may have a variable thickness along their length.

In some examples, retention feature 70 and/or anti-rotation feature 72 may comprise a retainer 88, which may be separate from (e.g., non-integral with) insert 50. Retainer 88 may be configured to substantially prevent rotation of insert 50 within sandwich panel 12 and/or to retain insert 50 within sandwich panel 12. For example, retainer 88 may be installed over insert 50 once insert 50 is positioned within bore 20 and/or rotated with respect to sandwich panel 12. In some examples, once installed, retainer 88 may be configured to be substantially flush with first skin 16 (e.g., first outer surface 64 of first skin 16) or second skin 18 (e.g., second outer surface 68 of second skin 18). Retainer 88 may be configured to cover at least one exposed portion 90 of core 14 (e.g., an area where first skin 16 or second skin 18 has been removed). For example, one or more bores 20 of sandwich panel 12 may include a cut-out 92 in first skin 16 or second skin 18, such cut-out 92 corresponding to an area of first skin 16 or second skin 18 that has been removed in order to receive panel-engaging structure 52 of insert 50 and that may be left exposed once insert 50 is installed and rotated into position in bore 20. Additionally or alternatively, retention feature 70 and/or anti-rotation feature 72 may comprise an adhesive, such as quick-cure compound or UV-cure compound.

In systems 100 including retainer 88, retainer 88 may include a through-hole 94 that may be substantially concentric with hole 76 of insert 50 when retainer 88 is installed with respect to insert 50. Through-hole 94 may have a diameter substantially equal to that of hole 76, or slightly larger than that of hole 76. Thus, secondary object 78 may be inserted through through-hole 94 and then through hole 76 of insert 50, such that retainer 88 may be configured so as to not impede functionality of insert 50. Retainer 88 may include a substantially flat surface 96 that is configured to engage panel-engaging structure 52 of insert 50, with one or more projecting tabs 98 extending from substantially flat surface 96. Projecting tabs 98 may be configured to engage core 14, first skin 16, and/or second skin 18 of sandwich panel 12. In some examples, projecting tabs 98 may be at least partially inserted between core 14 and first skin 16, or between core 14 and second skin 18. Retainer 88 may be rotated with respect to panel-engaging structure 52 as retainer 88 is installed, or retainer 88 may be pressed into position with respect to cut-out 92 and insert 50, without rotation. In some examples, retainer 88 may have a similar overall shape as panel-engaging structure 52 of insert 50.

Insert 50 may include one or more vent holes 108 that may be configured to allow injection of an adhesive compound into at least one space 26 formed between body 56 of insert 50 and core 14 of sandwich panel 12. While use of adhesive compound may not be required with use of presently disclosed inserts 50, it may be used if desired, and/or a quick-cure or UV-cure compound may be injected through vent holes 108 once insert 50 is positioned within sandwich panel 12.

Insert 50 may include one or more peel flanges 110 integrally molded with panel-engaging structure 52, wherein peel flange 110 may be removable from insert 50 after installation of insert 50, such as by peeling peel flange 110 away from panel-engaging structure 52. Unlike conventional peel tabs, because presently disclosed inserts 50 may include integral peel flanges 110, the peel flanges 110 don't need to be added after forming the inserts 50, which may increase efficiency in production processes. Peel flanges 110 may be configured to maintain flushness and/or parallelism between insert 50 and sandwich panel 12 (e.g., first skin 16 and/or second skin 18). Additionally or alternatively, peel flanges 110 may be configured to provide an alignment plane or surface for aligning insert 50 with respect to sandwich panel 12.

Insert 50 may include one or more fins 99 projecting axially from panel-engaging structure 52 which may be configured to facilitate manual insertion (e.g., hand-screwing) of insert 50 into bore 20 (or into another structure placed therein) or to facilitate automation of placement of inserts 50. Such fins 99 may be formed in any suitable shape, size, and arrangement with respect to panel-engaging structure 52.

Panel-engaging structure 52 may be any suitable shape, such as substantially triangular, substantially polygonal, substantially circular, substantially oval, or any irregular shape. In some examples, panel-engaging structure 52 may include one or more straight edges 82 connected to one or more corner portions 84, which may be rounded corner portions 86. In some examples, features of panel-engaging structure 52 may function as retention feature 70. For example, retention feature 70 may include or be formed by one or more portions of panel-engaging structure 52, such as one or more corner portions 84 and/or rounded corner portions 86. For example, one or more corner portions 84 or rounded corner portions 86 may be positioned between a skin and core 14, such as between first inner surface 62 and core 14, or between second inner surface 66 and core 14, such that said positioning of corner portions 84 or rounded corner portions 86 may retain insert 50 within sandwich panel 12, thereby preventing or reducing likelihood of pull-out of insert 50 from bore 20.

As shown, bore 20 may be a through-bore 24 extending all the way through core 14, through both first skin 16 and second skin 18 in some examples, such that any secondary object 78 positioned within hole 76 of insert 50 may extend out from both first skin 16 and second skin 18 of sandwich panel 12, when insert 50 is installed within sandwich panel 12. Bore 20 may be a blind bore 22, extending through just first skin 16 and a portion of core 14 in some examples, or extending through just second skin 18 and a portion of core 14 in some examples. Bore 20 may be a double blind bore in some examples, including a first blind bore 22 and a second blind bore 22', each blind bore 22, 22' being concentric with each other, first blind bore 22 extending through first skin 16, and second blind bore 22' extending through second skin 18. Sandwich panel 12 may include a plurality of bores 20, one or more of which may be through-bores, one or more of which may be blind bores through first skin 16, one or more of which may be blind bores through second skin 18, and/or one or more of which may be double-blind bores (e.g., concentric blind bores on either side of sandwich panel 12). Further, bore 20 is shown as being substantially circular in cross-section, but other shapes are also possible (e.g., oval, elliptical, polygonal, etc.). Systems 100 may include a plurality of inserts 50, with at least one insert 50 being positioned in each respective bore 20 of sandwich panel 12.

Inserts 50 may include any type of insert, such as through clearance, through threaded, blind threaded, floating nut element, counter sunk, keyhole slot, and/or threaded inserts. Some inserts 50 may be configured to be substantially flush with first skin 16 and/or second skin 18 when installed. Some inserts 50 may be configured to be at least partially positioned internally to an outer surface of the respective skin, and such positioning may be referred to herein as "below" the skin or "under" the skin, but does not restrict such positioning to those that are lower than an "upper" surface of the sandwich panel, but rather indicates a position internal to the skin, adjacent an inner surface of the skin and the core of the sandwich panel.

In some examples where one or more bores 20 include a respective cut-out 92 in first skin 16 or second skin 18, cut-out 92 may extend all the way through the respective skin, and at least partially into core 14. Cut-out 92 may have a surface area that is larger than that of bore 20 and/or cut-out 92 may be shaped substantially similar to that of a panel-engaging structure 52 of a respective insert 50.

Systems 100 may include an insert-receiving base 126 that may be configured to receive insert 50, where insert-receiving base 126 is inserted into bore 20, and insert 50 is inserted into insert-receiving base 126, rather than directly into bore 20. In some systems 100, insert-receiving base 126 may be an example of retention feature 70 and/or anti-rotation feature 72, which may be configured to retain and/or prevent rotation of one or more inserts 50 with respect to bore 20. Additionally or alternatively, insert-receiving base 126 may itself include one or more retention features 70 and/or anti-rotation features 72 in order to substantially prevent rotation of and/or pull-out of insert-receiving base 126 with respect to bore 20. For example, insert-receiving base 126 may be configured to substantially prevent rotation of insert 50 once insert 50 is installed within an inner cavity 132 of insert-receiving base 126. Insert-receiving base 126 may include one or more snap features 134 that may be configured to retain at least one insert 50 within inner cavity 132. For example, snap feature 134 may include a lip, a notch, a projection, an extension, a groove, a slot, a slit, and/or any other suitable structure configured to engage one or more portions of an insert 50 installed therein.

Insert-receiving base 126 may include an outer base surface 128 configured to engage core 14 of sandwich panel 12, and an inner base surface 130 opposite outer base surface 128. Inner base surface 130 may define inner cavity 132 configured to receive at least one insert 50. Insert-receiving base 126 may be configured to retain one or more inserts 50 within inner cavity 132. Insert-receiving base 126 may be configured to receive a single insert 50, or may be configured to receive two or more inserts 50. In some examples, insert-receiving base 126 may extend through the entire bore 20 of sandwich panel 12, and may be configured to receive a first insert 50 adjacent first skin 16 of sandwich panel 12, and a second insert 50 adjacent second skin 18 of sandwich panel 12. For example, the two inserts 50 may be arranged longitudinally with respect to one another in inner cavity 132 of insert-receiving base 126.

In examples where insert-receiving base 126 has two inserts 50 installed therein, the two inserts 50 may be the same type of insert, or may be different types of inserts 50. Insert-receiving base 126 may be configured to selectively receive a plurality of different types or styles of inserts 50, and thus a single style of insert-receiving base 126 may be functional to receive many different styles of inserts 50. Thus, insert-receiving base 126 may be "universal" in the sense that a single insert-receiving base 126 may be compatible with many different types of inserts 50. In some examples, once a respective insert 50 is installed into insert-receiving base 126, the insert 50 may be selectively removable from insert-receiving base 126. In other words, if a respective insert 50 of a first type is installed into insert-receiving base 126, some examples may permit removal of the insert 50 and insertion of a respective insert 50 of a second type into insert-receiving base 126. This functionality may facilitate remediation in instances when an incorrect type of insert has been installed into a respective insert-receiving base 126.

Insert-receiving base 126 may include a first skin-engaging structure 136 configured to engage first skin 16 of sandwich panel 12, and/or insert-receiving base 126 may include a second skin-engaging structure 138 configured to engage second skin 18 of sandwich panel 12. In examples where insert-receiving base 126 extends entirely through sandwich panel 12 (e.g., in examples where bore 20 is a through-bore), insert-receiving base 126 may include both first skin-engaging structure 136 and second skin-engaging structure 138. In examples where insert-receiving base 126 extends just partially through sandwich panel 12 (e.g., in examples where bore 20 is a blind bore), insert-receiving base 126 may include just one of first skin-engaging structure 136 and second skin-engaging structure 138.

Insert-receiving base 126 may be configured to be self-retaining within bore 20 of sandwich panel 12, such as by including one or more retention features 70, such as expanding portions 124 that are configured to expand when insert 50 is installed within inner cavity 132. For example, expanding portion 124 may include one or more anchoring walls 140, each of which may formed by a portion of inner base surface 130 and outer base surface 128. Such anchoring walls 140 may be configured to expand radially outward and away from inner cavity 132 when one or more inserts 50 are installed within inner cavity 132 of insert-receiving base 126. For example, one or more anchoring walls 140 may be configured to expand from an initial position in which the anchoring wall 140 is substantially parallel to longitudinal axis 74, to an expanded position in which anchoring wall 140 forms an angle of at least 1°, at least 5°, at least 10°, at least 15°, at least 20°, at least 25°, at least 30°, at least 35°, at least 40°, at least 45°, at least 50°, at least 55°, and/or at least 60° with the longitudinal axis of the inner cavity 132 (e.g., longitudinal axis 74). Additionally or alternatively, when expanded, anchoring wall 140 may be configured to project from a circumference of inner cavity 132 a distance of at least 0.25 mm, 0.5 mm, 0.75 mm, 1 mm, 1.5 mm, 2 mm, 3 mm, 4 mm, 5 mm, 6 mm, 7 mm, 8 mm, 9 mm, and/or at least 10 mm from the circumference of inner cavity 132.

Additionally or alternatively, insert-receiving base 126 may include a retention feature 70 in the form of a lip 141, which may be configured to resist pull-out of insert-receiving base 126 from bore 20 of sandwich panel 12. For example, insert-receiving base 126 may be positioned in bore 20 such that lip 141 is positioned between first inner surface 62 of first skin 16 and core 14, with a portion of first skin-engaging structure 136 being positioned adjacent first outer surface 64 of first skin 16, such that first skin-engaging structure 136 effectively grips either side of first skin 16. In other examples, insert-receiving base 126 may be positioned in bore 20 such that lip 141 is positioned between second inner surface 66 of second skin 18 and core 14, with a portion of first skin-engaging structure 136 being positioned adjacent second outer surface 68 of second skin 18, such that first skin-engaging structure 136 effectively grips either side of second skin 18.

In some examples, insert-receiving base 126 may include a first portion 142 and a second portion 144. When installed in bore 20 of sandwich panel 12, first portion 142 may be positioned adjacent one of first skin 16 and second skin 18, and second portion 144 may be positioned adjacent the other of first skin 16 and second skin 18. First portion 142 may be configured to receive a first respective insert 50, and second portion 144 may be configured to receive a second respective insert 50. In some examples having first portion 142 and second portion 144, just one of first portion 142 and second portion 144 may include an expanding portion 124 (e.g., anchoring walls 140). For example, inserting a first respective insert 50 into first portion 142 may cause an expanding portion 124 of first portion 142 to expand into core 14 of sandwich panel 12, while inserting a second respective insert 50 into second portion 144 may not affect second portion 144, such that second portion 144 remains substantially unchanged after insertion of the first and second inserts 50. In other examples, both first portion 142 and second portion 144 may include an expanding portion 124 (e.g., anchoring walls 140).

Figure 6:
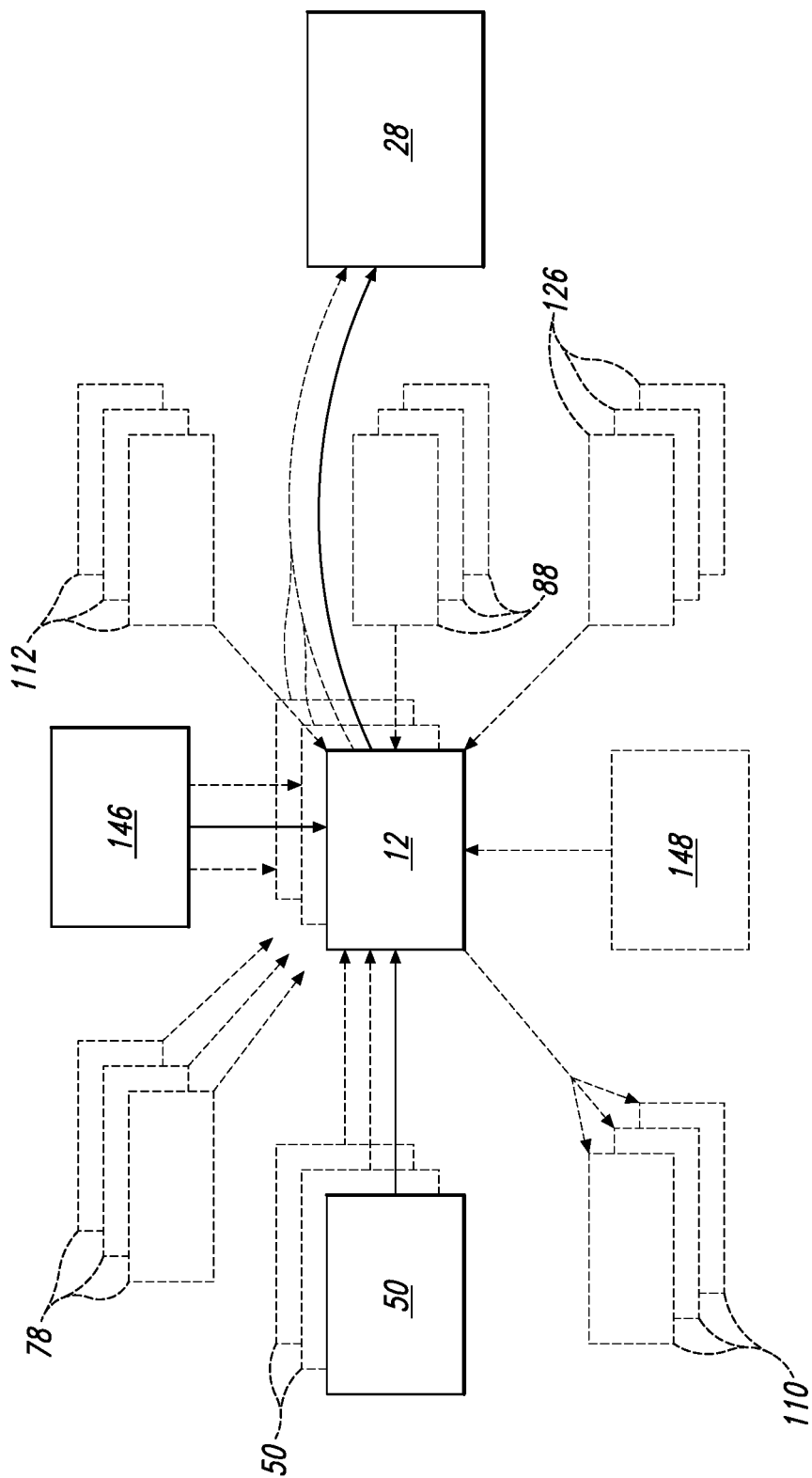
FIG. 6 is a schematic view of illustrative, non-exclusive examples of a sandwich panel including an insert according to the present disclosure.

FIG. 6 is another schematic representation of examples of systems 100 according to the present disclosure. As shown in FIG. 6, an apparatus 28 may include one or more sandwich panels 12, each sandwich panel 12 having one or more inserts 50 according to the present disclosure. Each respective insert 50 may include one or more of a peel flange 110, a snap ring 112, an insert-receiving base 126, and a retainer 88. In a single sandwich panel 12, one or more inserts 50 may include a respective insert-receiving base 126, while others may not. Similarly, in a single sandwich panel 12, one or more inserts 50 may include a respective retainer 88, while others may not. In a single sandwich panel 12, one or more inserts 50 may include a respective snap ring 112, while others may not. In a single sandwich panel 12, one or more inserts 50 may include a respective peel flange 110, while others may not. Once installed in a respective bore 20 of sandwich panel 12, a respective secondary object 78 may be installed in or placed in each respective insert 50. As shown in FIG. 6, systems 100 may include a tool 146 (e.g., a drill, an end mill, and/or any other suitable tool) for forming one or more bores 20 and/or one or more associated cut-outs 92. Additionally or alternatively, systems 100 may include devices 148, such as a sealant gun, for injecting an adhesive compound (e.g., potting compound, UV-cure compounds, and/or quick-cure compounds) in order to facilitate or further secure one or more inserts 50 within sandwich panel 12.

Turning now to FIGS. 7-46, illustrative non-exclusive examples of inserts 50, snap rings 112, and/or insert-receiving bases 126 are illustrated. Where appropriate, the reference numerals from the schematic illustrations of FIGS. 5-6 are used to designate corresponding parts of FIGS. 7-46; however, the examples of FIGS. 7-46 are non-exclusive and do not limit inserts 50, snap rings 112, or insert-receiving bases 126 to the illustrated embodiments of FIGS. 7-46. That is, inserts 50, snap rings 112, and insert-receiving bases 126 are not limited to the specific embodiments illustrated in FIGS. 7-46, and may incorporate any number of the various aspects, configurations, characteristics, properties, etc. that are illustrated in and discussed with reference to the schematic representations of FIGS. 5-6 and/or the embodiments of FIGS. 7-46, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 7-46; however, it is within the scope of the present disclosure that the previously discussed features, variants, etc. may be utilized therewith.

Figure 1:
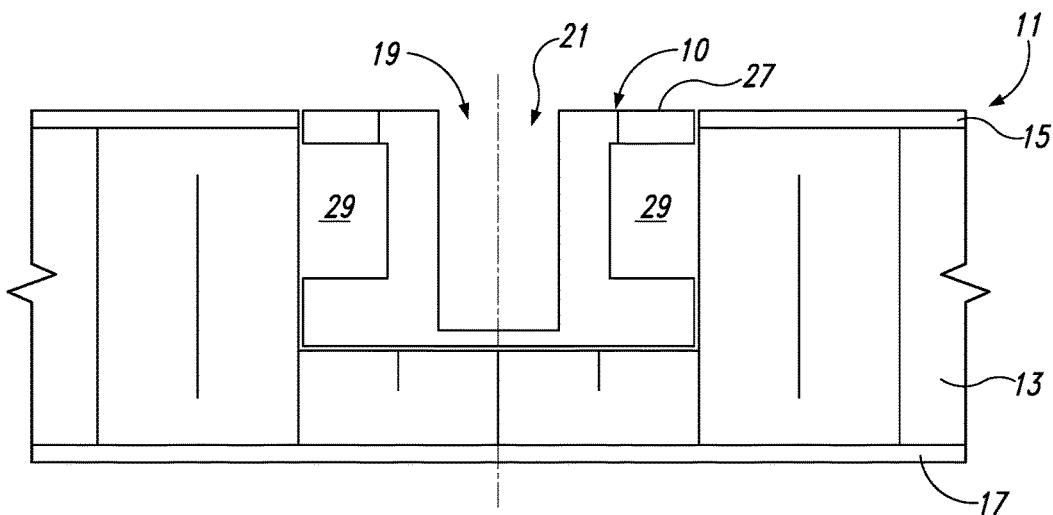
FIG. 1 is a schematic, cross-section view of a prior art insert positioned within a blind bore formed in a sandwich panel, the insert being flush with the sandwich panel skin.
Figure 2:
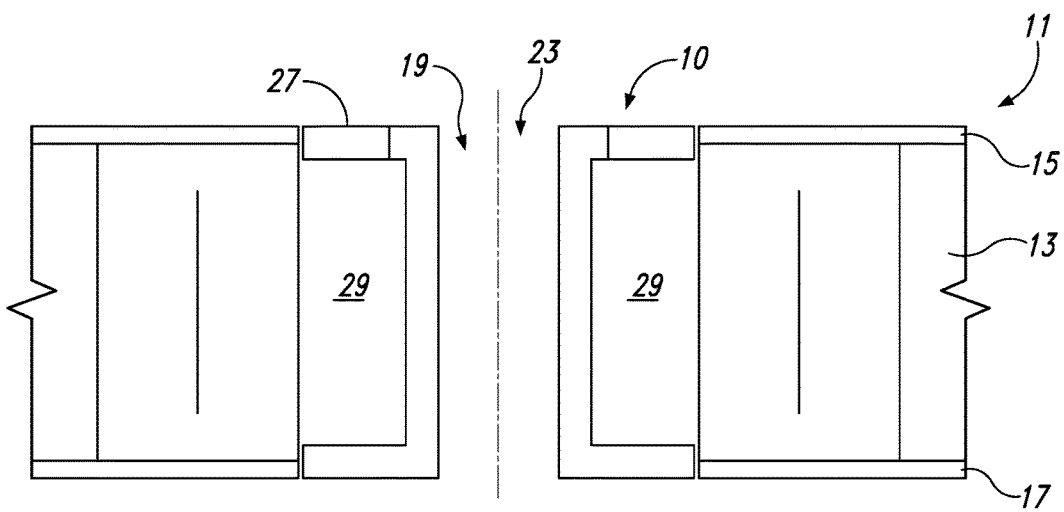
FIG. 2 is a schematic, cross-section view of a prior art insert positioned within a through-bore formed in a sandwich panel, the insert being flush with the sandwich panel skin.
Figure 3:
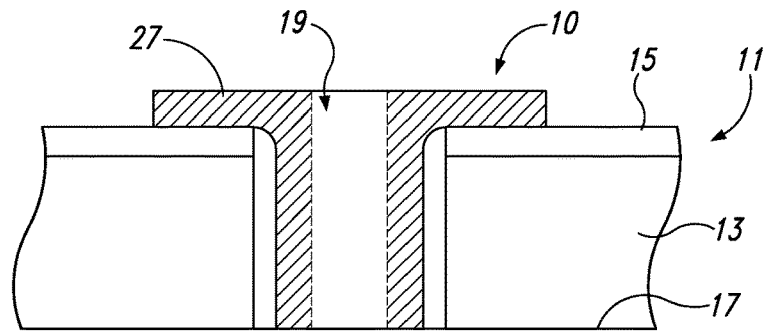
FIG. 3 is a schematic, cross-section view of a prior art insert positioned with respect to a sandwich panel.
Figure 7:
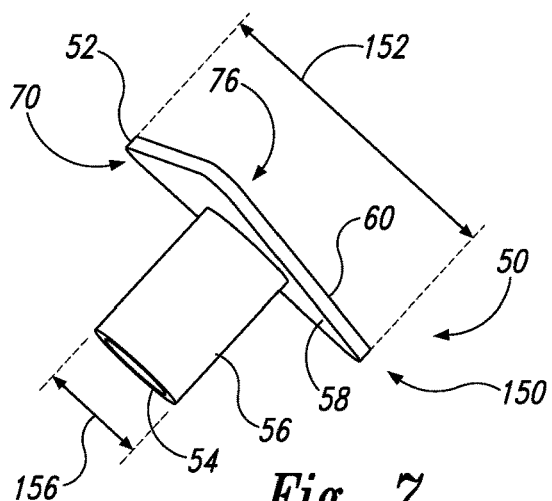
FIG. 7 is a perspective view of an insert according to the present disclosure.

FIG. 7 illustrates one embodiment of an insert 50 according to the present disclosure, in the form of triangular insert 150. As shown in FIG. 7, triangular insert 150 may include panel-engaging structure 52 having inner flange surface 58 and outer flange surface 60. Body 56 may extend from panel-engaging structure 52 (e.g., adjacent inner flange surface 58) to opposing end 54, with hole 76 extending longitudinally through panel-engaging structure 52 and at least part of body 56. Body 56 is shown as substantially cylindrical, but other shapes are also possible. Panel-engaging structure 52 is shown as substantially triangular, and may have a larger surface area than that of the cross-section of body 56. For example, a maximum dimension 152 (e.g., the height of general triangle shape, or the maximum dimension that crosses the center of panel-engaging structure 52, best seen in FIG. 9) of panel-engaging structure 52 may be greater than a hole diameter 154 (FIG. 9) of hole 76 and/or a body diameter 156 of body 56. In some examples, maximum dimension 152 of panel-engaging structure 52 may be at least 20% greater, at least 25% greater, at least 30% greater, at least 35% greater, at least 40% greater, at least 50% greater, at least 60% greater, at least 75% greater, at least 85% greater, at least 100% greater, at least 150% greater, at least 200% greater, and/or at least 300% greater than hole diameter 154 of hole 76. Additionally or alternatively, maximum dimension 152 of panel-engaging structure 52 may be greater than a body diameter of the body of the insert, and optionally wherein the maximum dimension 152 of the panel-engaging structure 52 may be at least 20% greater, at least 25% greater, at least 30% greater, at least 35% greater, at least 40% greater, at least 50% greater, at least 60% greater, at least 75% greater, at least 85% greater, at least 100% greater, at least 150% greater, at least 200% greater, and/or at least 300% greater than body diameter 156 of body 56 of insert 50 (e.g., triangular insert 150). Such an enlarged panel-engaging structure 52, relative to hole 76 and/or body 56, may provide additional surface area for engaging sandwich panel 12, without increasing the required size of bore 20, and/or may provide a space (e.g., space 26 of FIG. 3) for receiving adhesive compound.

Figure 8:
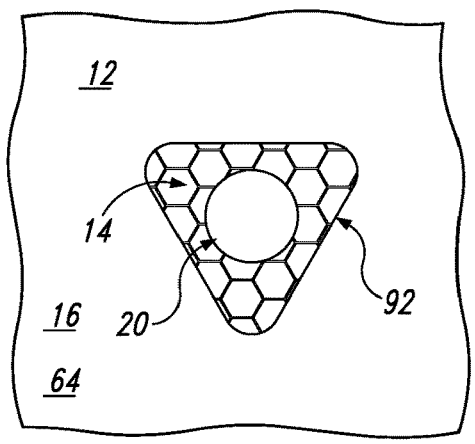
FIG. 8 is a top plan view of a sandwich panel having one or more bores formed therein, each of the bores configured to receive one of the inserts of FIG. 7 therein.
Figure 9:
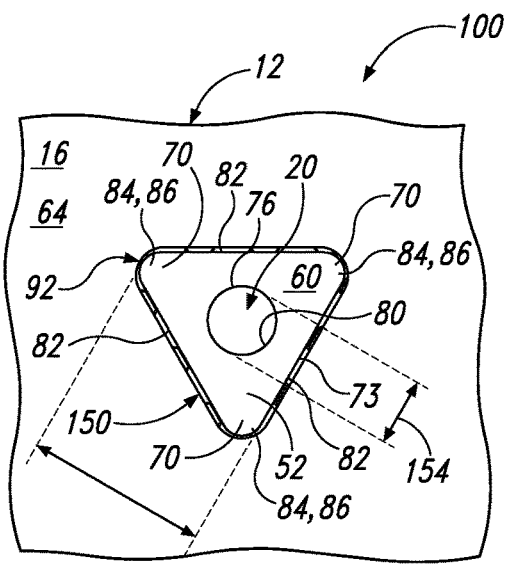
FIG. 9 is a top plan view of the insert of FIG. 7 positioned within one of the bores in the sandwich panel of FIG. 8.

FIG. 8 illustrates one embodiment of a bore 20 and cut-out 92 formed in a skin of a sandwich panel 12, and FIG. 9 illustrates the triangular insert 150 of FIG. 7, as initially positioned within bore 20 of FIG. 8. As seen in FIG. 8, bore 20 may extend through at least one of the two skins of sandwich panel 12 (e.g., first skin 16), and at least partly into core 14. Cut-out 92 may be enlarged as compared to bore 20, and may correspond to an area where first skin 16 is removed, thereby leaving some of core 14 exposed when sandwich panel 12 is viewed from first skin 16, as shown. Cut-out 92 may extend longitudinally, partially into the depth of core 14, but generally not as deep as bore 20. Cut-out 92 may be generally triangular in shape, as shown, and/or may have a similar, but slightly larger footprint than that of panel-engaging structure 52. Sandwich panel 12 may include a plurality of such bores 20 and cut-outs 92 arranged in any suitable fashion. Furthermore, while bore 20 and cut-out 92 are shown formed in first skin 16 in this example, one or more bores 20 and/or cut-outs 92 may additionally or alternatively be formed through second skin 18, extending into core 14 towards first skin 16.

As shown in FIG. 9, panel-engaging structure 52 of triangular insert 150 may be positioned adjacent first skin 16 of sandwich panel 12, but in other examples, panel-engaging structure 52 may be positioned adjacent second skin 18. As positioned in FIG. 9, outer flange surface 60 of triangular insert 150 may be oriented facing outward from core 14 of sandwich panel 12, and inner flange surface 58 of triangular insert 150 may be oriented facing core 14. Hole 76 of triangular insert 150 may include internal threads 80, such as for receiving one or more secondary objects 78 (e.g., a secondary object 78, such as a fastener may be screwed into hole 76 of triangular insert 150 using internal threads 80).

As best seen in FIG. 9, panel-engaging structure 52 may be substantially triangular, but other shapes are also possible. Cut-out 92 of sandwich panel 12 may be of a substantially similar shape, and, as best seen in FIG. 8, also may be substantially triangular. Panel-engaging structure 52 may include a plurality of substantially straight edges 82 that are connected by a plurality of corner portions 84 (e.g., rounded corner portions 86), in order to define the primary perimeter 73 of panel-engaging structure 52. In the initial installation shown in FIG. 9, panel-engaging structure 52 may be seated into cut-out 92, such that body 56 of triangular insert 150 is inserted into bore 20, and panel-engaging structure 52 rests on the exposed portion of core 14, inside cut-out 92. Cut-out 92 may be sized to be slightly larger than panel-engaging structure 52, such that all of panel-engaging structure 52 may be positioned within cut-out 92, without any of panel-engaging structure 52 positioned external to first outer surface 64 of first skin 16.

Figure 10:
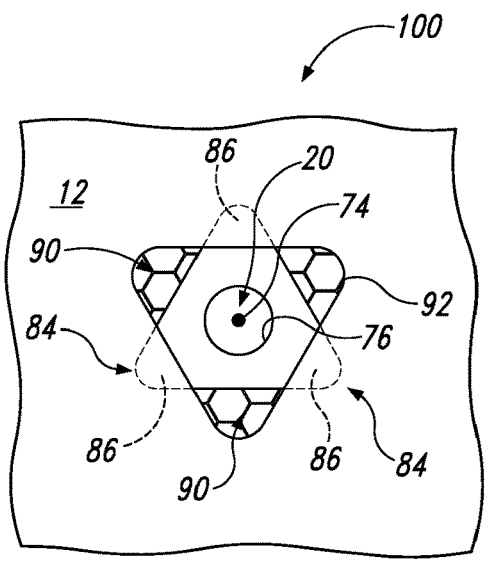
FIG. 10 is a top plan view of the insert and sandwich panel of FIG. 9, with the insert rotated with respect to the sandwich panel.

Portions of panel-engaging structure 52 (e.g., corner portions 84, or rounded corner portions 86) may form one or more retention features 70 that may be configured to retain triangular insert 150 in sandwich panel 12. For example, as illustrated in FIG. 10, triangular insert 150 may be rotated with respect to bore 20, such that a portion of panel-engaging structure 52 may be positioned "under" first skin 16 (e.g., between first inner surface 62 of first skin 16 and core 14) or second skin 18 (e.g., between second inner surface 66 of second skin 18 and core 14). Thus, such portions of panel-engaging structure 52 may function as retention features 70 of triangular insert 150, serving to retain triangular insert 150 within bore 20 and resist pull-out, by virtue of being "under" first skin 16 or second skin 18. As shown in FIG. 10, triangular insert 150 may be rotated about 60° about longitudinal axis 74 of bore 20, with respect to sandwich panel 12, such that rounded corner portions 86 of panel-engaging structure 52 may be positioned between first inner surface 62 of first skin 16 and core 14 (or between second inner surface 66 of second skin 18 and core 14). Rotating triangular insert 150 under one of the skins may cause delamination of the skin from core 14, in the areas where panel-engaging structure 52 is rotated through. For example, a portion of first skin 16 may be delaminated from (e.g., separated from) core 14 adjacent bore 20 when triangular insert 150 is rotated, or a portion of second skin 18 may be delaminated from core 14 adjacent bore 20 when triangular insert 150 is rotated.

While FIGS. 9-10 illustrate a rotation of about 60°, panel-engaging structure 52 may be rotated to a greater or lesser extent, depending on the shape and/or other features of insert 50. For example, an insert 50 according to the present disclosure may be rotated at least 5°, at least 10°, at least 20°, at least 30°, at least 40°, at least 50°, at least 60°, at least 70°, at least 80°, at least 90°, at least 120°, at least 150°, and/or at least 180° with respect to bore 20, once initially positioned within bore 20. In some examples, as shown in FIG. 10, rotation of insert 50 may result in one or more exposed portions 90 of core 14 once one or more portions of panel-engaging structure 52 are no longer positioned over those now-exposed portions. For example, exposed portions 90 of core 14 may be of approximately the same shape and size as the portions of panel-engaging structure 52 that may be positioned between a skin and core 14, once insert 50 is rotated.

Figure 11:
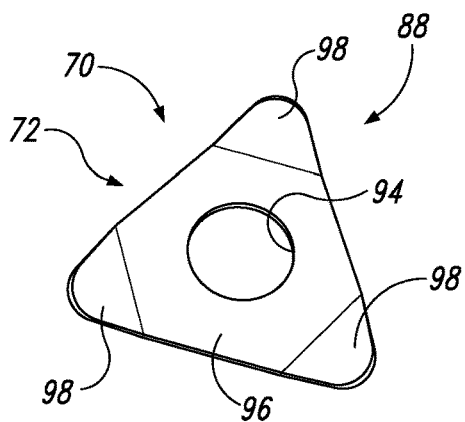
FIG. 11 is a perspective view of a retainer for use with inserts according to the present disclosure.
Figure 12:
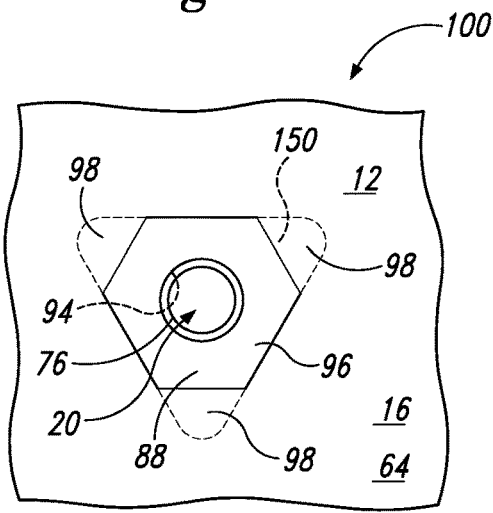
FIG. 12 is a top plan view of the rotated insert and sandwich panel of FIG. 10, with the retainer of FIG. 11 in place over the insert.

Insert 50 (e.g., triangular insert 150) may include one or more anti-rotation features 72, which may be formed integrally with insert 50, or may be a separate structure. As shown in FIG. 11, one example of anti-rotation feature 72 separate from insert 50 may include retainer 88. Retainer 88 may be configured to be positioned over insert 50 (e.g., triangular insert 150), as shown in FIG. 12. Retainer 88 may be configured to align and center triangular insert 150, and/or substantially prevent rotation of triangular insert 150 about longitudinal axis 74. Retainer 88 may include a through-hole 94, which may correspond in size and shape with hole 76 of triangular insert 150, such that when retainer 88 is in place, a secondary object 78 may be inserted through both through-hole 94 of retainer 88 and hole 76 of triangular insert 150. Retainer 88 may include a substantially flat surface 96 that may be configured to engage panel-engaging structure 52 of triangular insert 150, and further may include one or more projecting tabs 98 that extend radially from substantially flat surface 96. As shown in FIG. 12, retainer 88 may be positioned with respect to triangular insert 150 such that projecting tabs 98 cover exposed portions 90 of core 14. Projecting tabs 98 may be slightly bent with respect to substantially flat surface 96, as best seen in FIG. 11, such that projecting tabs 98 may project into core 14 and at least partially between the skin and core (e.g., first skin 16 and core 14). In this manner, retainer 88 may increase retention of triangular insert 150 and/or substantially prevent rotation thereof about longitudinal axis 74. In addition to, or instead of, using retainer 88, an adhesive compound (e.g., a quick-cure adhesive or a UV-cure adhesive) may be injected into and/or on exposed portions 90 of core 14.

Figure 13:
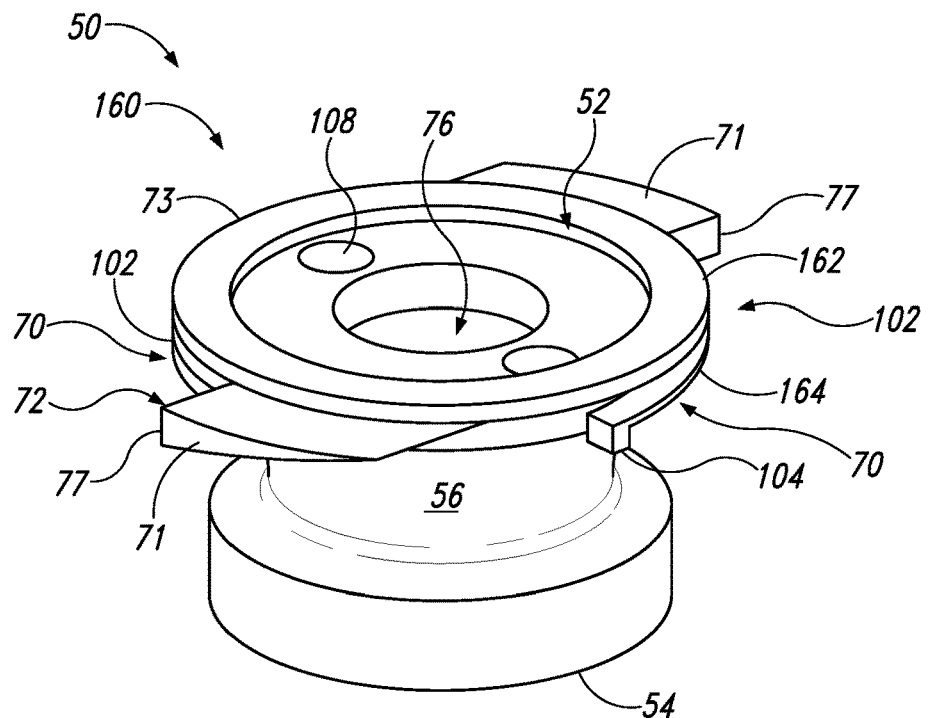
FIG. 13 is a perspective view of another example of an insert according to the present disclosure.
Figure 14:
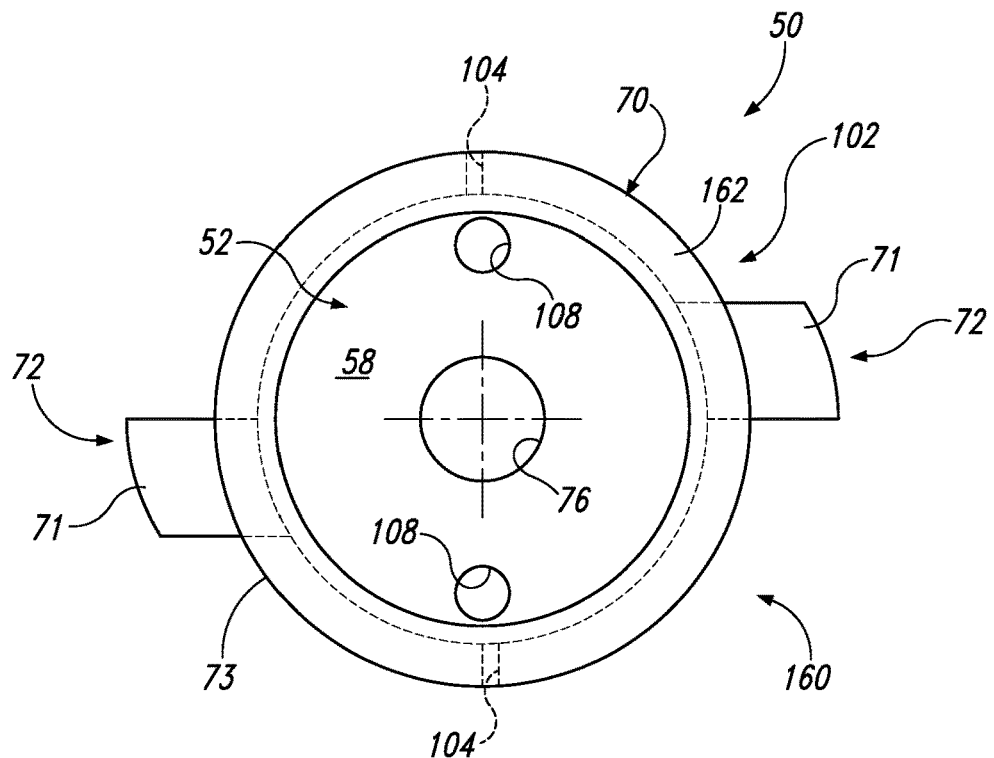
FIG. 14 is a top plan view of an example of an insert according to the present disclosure.
Figure 15:
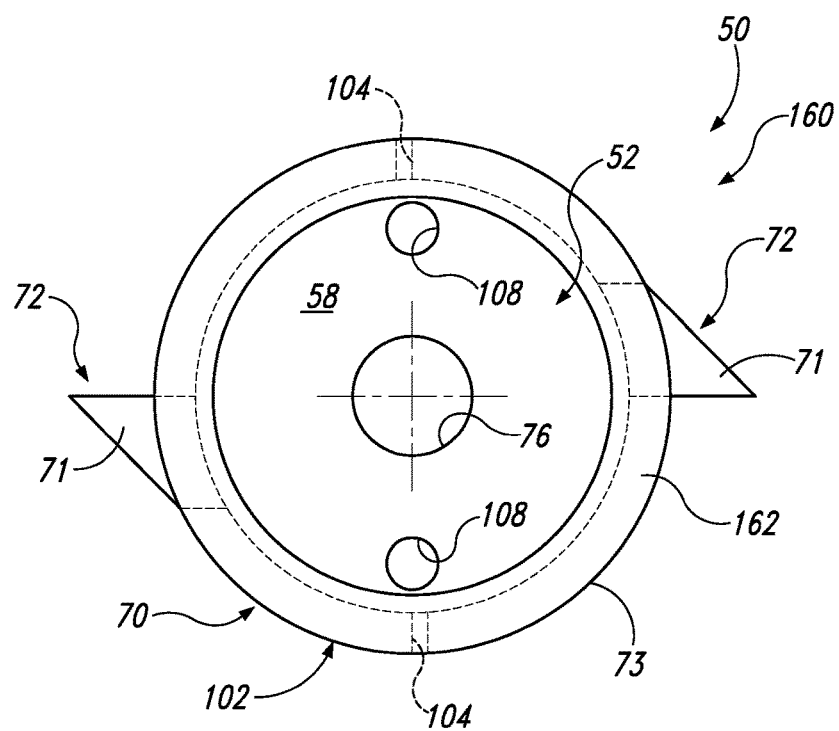
FIG. 15 is a top plan view of an example of an insert according to the present disclosure.

FIGS. 13-15 illustrate another example of insert 50, in the form of an anchoring insert 160, which generally includes panel-engaging structure 52, body 56, and opposing end 54, with hole 76 formed therein. Anchoring insert 160 may include one or more retention features 70, such as coarse threads 102 and/or one or more anti-rotation features 72, such as extensions 71, radially extending from primary perimeter 73 of panel-engaging structure 52. As shown in FIG. 13, extensions 71 may be wedge-shaped, with one end being thicker than the other. Extensions 71 may be any suitable shape, with FIG. 14 showing one variant having one or more curved edges, and FIG. 15 showing another variant having straight edges that form a pointed extension 71.

Figure 16:
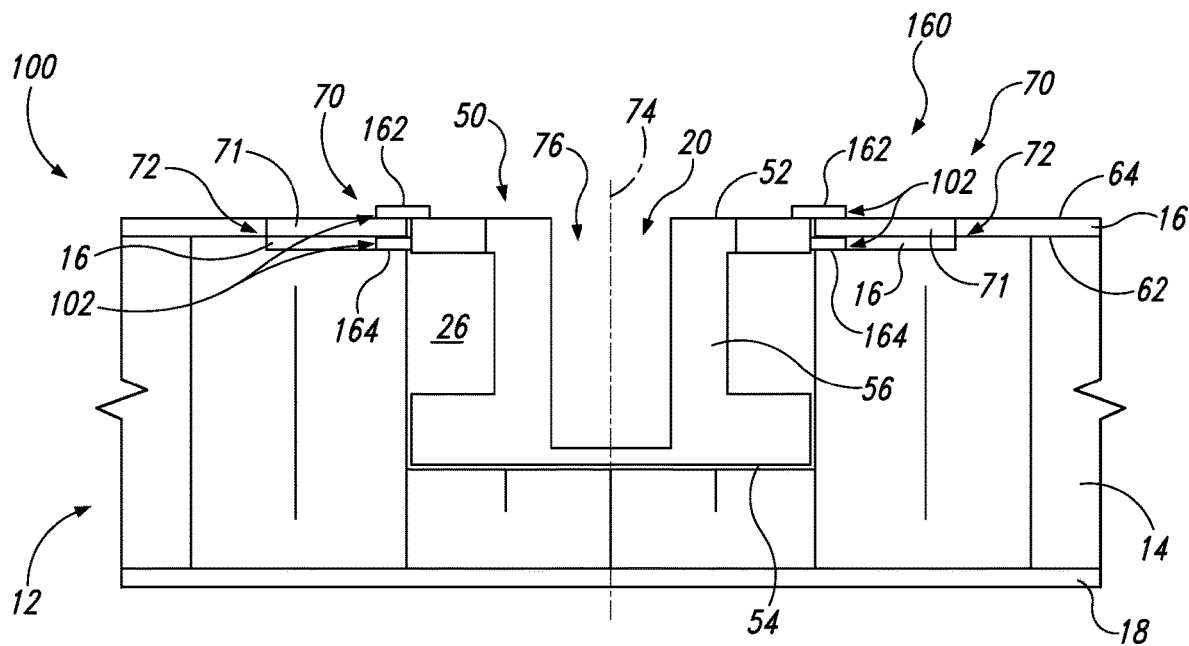
FIG. 16 is a cross-sectional view of an insert according to the present disclosure, installed within a sandwich panel.

As shown in FIG. 16, when anchoring insert 160 is installed within bore 20 (e.g., a blind bore) of sandwich panel 12, coarse threads 102 and/or extensions 71 may engage with sandwich panel 12 in order to retain anchoring insert 160 in place within bore 20, resisting pull-out and rotation of anchoring insert 160. For example, coarse threads 102 may be formed by an upper lip 162 and a lower lip 164, such that once anchoring insert 160 is installed within bore 20 and rotated about longitudinal axis 74, a portion of first skin 16 may be positioned between upper lip 162 and lower lip 164. Having portions of anchoring insert 160 positioned between first skin 16 and core 14 of sandwich panel 12 (e.g., lower lip 164 of coarse threads 102) may increase stability of anchoring insert 160 within bore 20, and resist pull-out thereof, by virtue of positioning of retention features 70 with respect to first skin 16 such that first skin 16 substantially prevents axial movement of anchoring insert 160 when thusly positioned.

As best seen in FIG. 13, extensions 71 may extend radially beyond upper lip 162 and lower lip 164, and may be configured to deform a portion of first skin 16 (e.g., depressing a portion of first skin 16 into core 14), adjacent first inner surface 62 of first skin 16, as anchoring insert 160 is rotated within bore 20. In other examples, extensions 71 may be configured to deform a portion of second skin 18 (e.g., depressing a portion of skin 18 into core 14), adjacent second inner surface 66 of second skin 18, as anchoring insert 160 is rotated within bore 20. As anchoring insert 160 is rotated and coarse threads 102 engage with the panel skin such that anchoring insert 160 is rotated further down into bore 20, such rotation may cause extensions 71 to be pressed down onto the panel skin, and thus may serve as an anti-rotation feature 72, as the extensions deform the panel skin from above (e.g., extensions 71 may press on first outer surface 64 of first skin, or second outer surface 68 of second skin 18 as anchoring insert 160 is rotated into place within bore 20). In some examples, extensions 71 may be configured to limit the range of rotation of anchoring insert 160, such as by permitting rotation of anchoring insert 160 until a vertical edge 77 of extension 71 abuts a respective slit 106 or depressed portion 168 formed in the respective panel skin. FIG. 16 shows anchoring insert 160 oriented in bore 20 formed though first skin 16, such that panel-engaging structure 52 of anchoring insert 160 is positioned adjacent first skin 16. In other examples, however, anchoring insert 160 may be oriented in bore 20 formed through second skin 18, such that panel-engaging structure 52 of anchoring insert 160 may be positioned adjacent second skin 18.

Coarse threads 102 may include one or more blade portions 104, which may be a vertical blade portion 104 as shown in FIG. 13. Blade portions 104 may extend substantially axially from panel-engaging structure 52, such as from upper lip 162 and/or lower lip 164 of coarse threads 102. Blade portion 104 may be configured to engage one or more slits 106 formed in first skin 16 (or second skin 18, if panel-engaging structure 52 is positioned adjacent second skin 18), such as slits 106 shown in FIGS. 17-21. Additionally or alternatively, blade portions 104 may be configured to engage one or more depressed portions 168 of panel skin, such as may be formed between adjacent slits 106, as illustrated in FIGS. 19-21. For example, as anchoring insert 160 is being inserted into bore 20, blade portions 104 may seat themselves into depressed portions 168, acting as a point of initiation for rotation of anchoring insert 160, so that coarse threads 102 engage with the panel skin.

Figure 17:
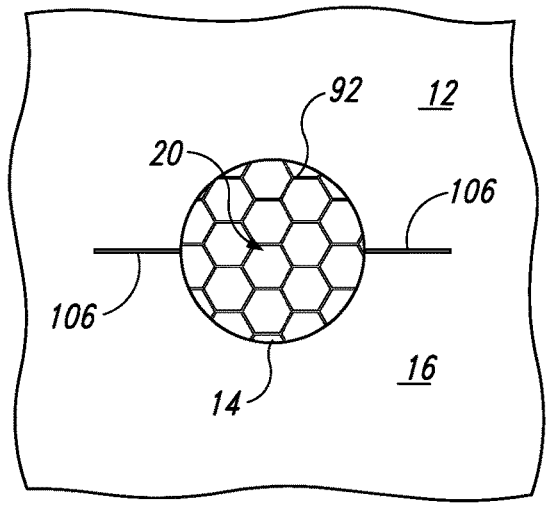
FIG. 17 is a top plan view of a sandwich panel having a cut-out formed through one of the skins, and a plurality of radially extending slits extending from the cut-out.
Figure 18:
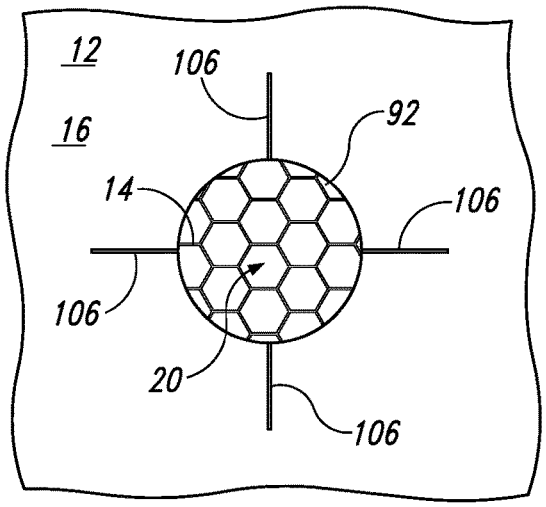
FIG. 18 is a top plan view of a sandwich panel having a cut-out formed through one of the skins, and a plurality of radially extending slits extending from the cut-out, the plurality of radially extending slits spaced substantially equidistantly about the perimeter of the cut-out.
Figure 19:
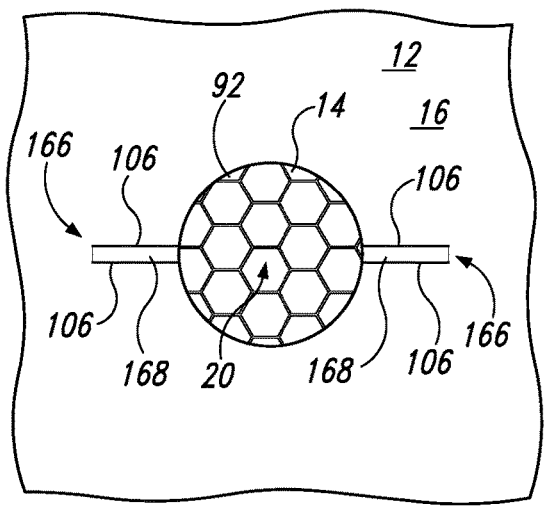
FIG. 19 is a top plan view of a sandwich panel having a cut-out formed through one of the skins, and a plurality of radially extending slits extending from the cut-out, the plurality of radially extending slits arranged into respective adjacent pairs of slits, with portions of the skin being depressed.
Figure 20:
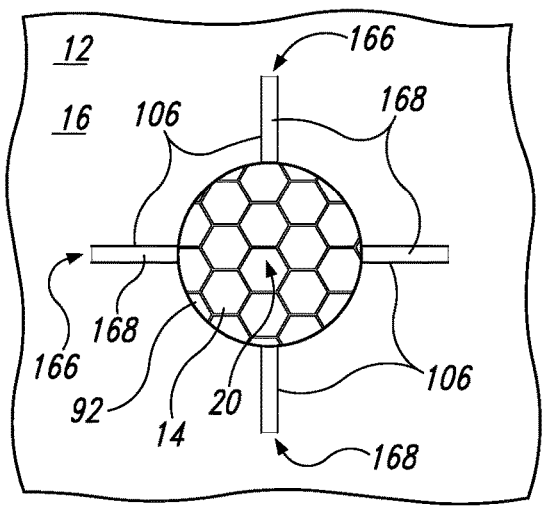
FIG. 20 is a top plan view of a sandwich panel having a cut-out formed through one of the skins, and a plurality of radially extending slits extending from the cut-out, the plurality of radially extending slits arranged into respective adjacent pairs of slits, with portions of the skin being depressed.
Figure 21:
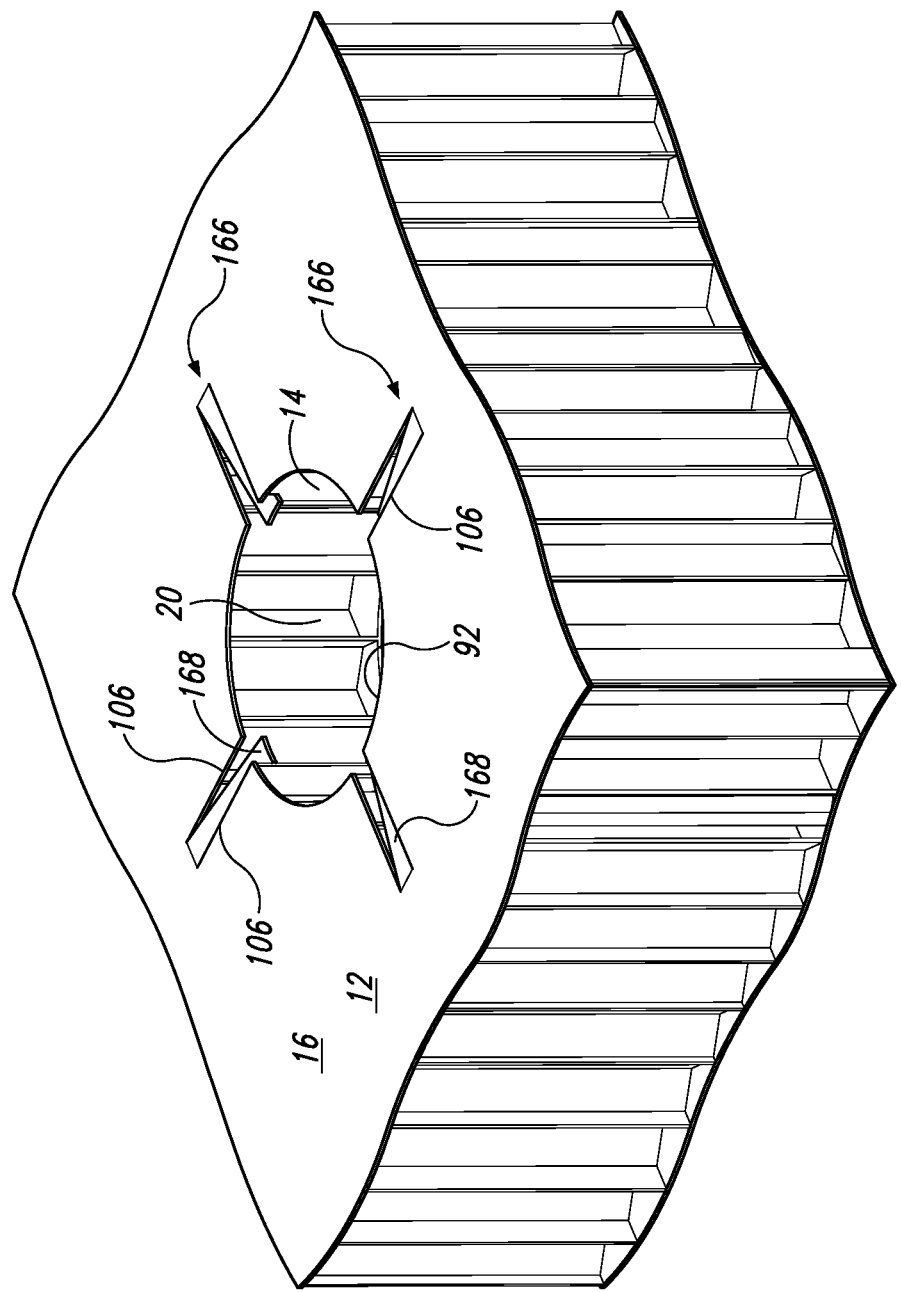
FIG. 21 is a perspective view of the sandwich panel, radially extending slits, and depressed portions of the skin of FIG. 20.

Turning now to FIGS. 17-21, slits 106 may be formed substantially equidistantly, extending radially from cut-out 92 formed in first skin 16, in some examples. For example, FIG. 17 shows two slits 106, formed at about 180° with respect to each other. FIG. 18 shows four slits 106, each formed at about 90° with respect to each adjacent respective slit 106. In some examples, slits 106 may be arranged in respective adjacent pairs 166, such as shown in FIGS. 19-21. FIG. 19 shows two respective pairs 166 of adjacent slits 106, arranged at an approximately 180° angle with respect to each other. FIGS. 20-21 show four respective pairs 166 of adjacent slits 106, each respective pair 166 arranged at an approximately 90° angle with respect to two respective adjacent pairs 166. In some examples, the skin (e.g., first skin 16 or second skin 18) may be depressed between two adjacent slits 106, such as to form one or more depressed portions 168 of the skin. Depressed portions 168 may engage one or more portions of panel-engaging structure 52 of the insert (e.g., may engage retention features 70 and/or anti-rotation features 72) in order to increase retention of the insert within sandwich panel 12. Bores 20 illustrated in FIGS. 17-21 are shown as blind bores, extending part-way through the depth of core 14 of sandwich panel 12, but other configurations (e.g., through-bores) are also possible.

Figure 23:
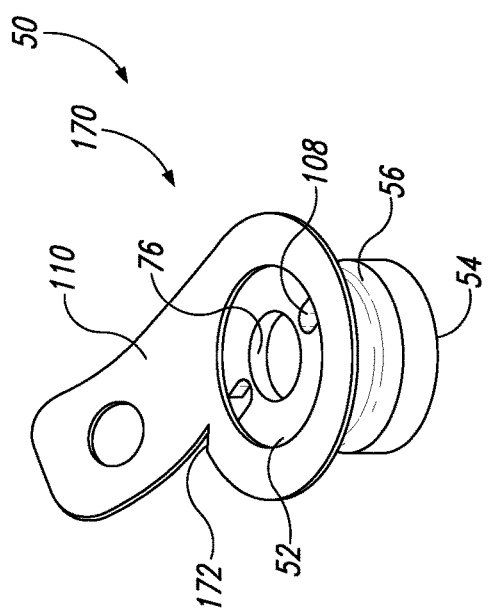
FIG. 23 is a perspective view of the insert of FIG. 22.
Figure 22:
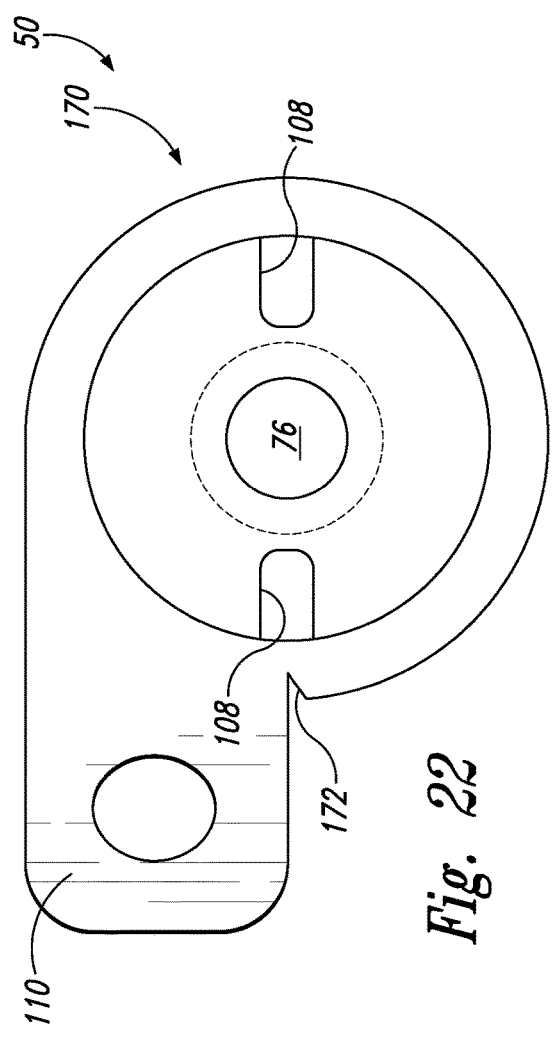
FIG. 22 is a top plan view of another example of an insert according to the present disclosure, including an integral peel flange.
Figure 24:
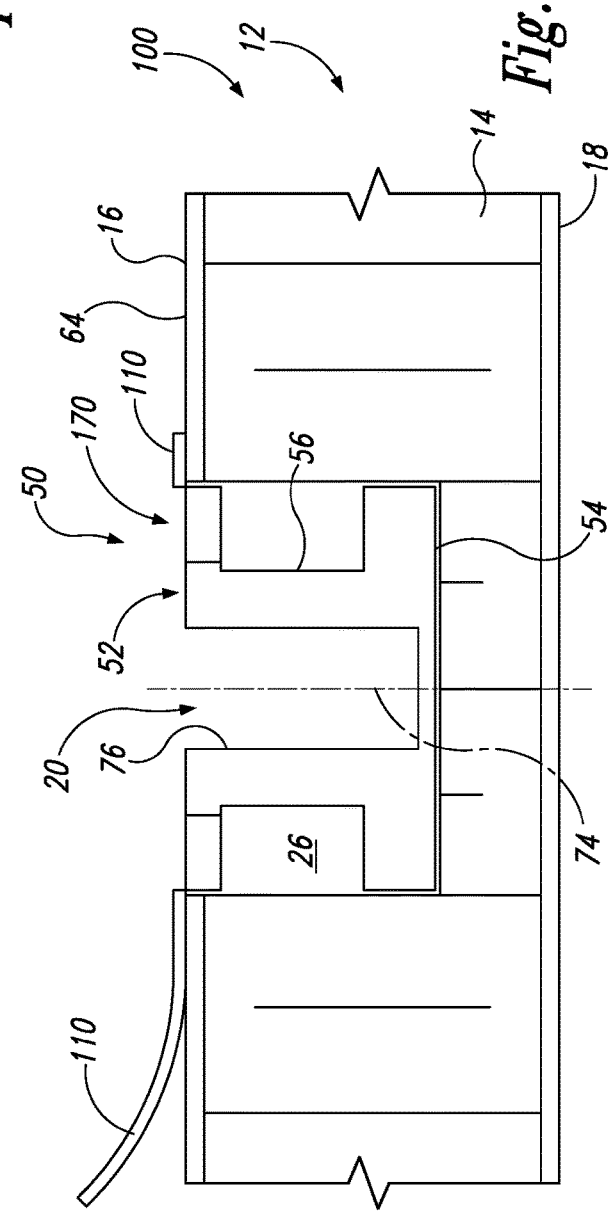
FIG. 24 is a cross-sectional view of the inserts of FIGS. 22-23, installed within a sandwich panel.

FIGS. 22-23 illustrate another example of insert 50, in the form of a peel flange insert 170, having an integrally-formed peel flange 110 coupled to panel-engaging structure 52. Peel flange 110 may aid in alignment and positioning of peel flange insert 170 with respect to sandwich panel 12 (e.g., with respect to first skin 16 and bore 20), and may be removable after placement of peel flange insert 170 in sandwich panel 12. FIG. 24 illustrates an example of peel flange insert 170 installed within bore 20 of sandwich panel 12, showing positioning of peel flange 110 adjacent first outer surface 64 of first skin 16. Peel flange 110 may be formed of, for example, a metallic or polymeric material having sufficient flexibility to be peeled away from peel flange insert 170. Peel flange 110 may include one or more notches 172 that may be configured to aid in removal of peel flange 110 from peel flange insert 170 once it is positioned in bore 20 of sandwich panel 12.

In some systems 100, insert 50 may be seated inside an insert-receiving base 126, rather than directly seated inside bore 20 of sandwich panel 12. FIGS. 25-32 illustrate various examples of insert-receiving bases 126, some for positioning within a blind bore of a sandwich panel (FIGS. 25-28), and some for positioning within a through-bore of a sandwich panel (FIGS. 29-32). Some insert-receiving bases 126 may be configured for receiving a single insert 50 (FIGS. 25-28 and 31-32), while other insert-receiving bases 126 may be configured for receiving two inserts 50 (FIGS. 29-30). Some insert-receiving bases 126 may include one or more expanding anchoring walls 140 (FIGS. 25-29 and 31-32), while others may have a simpler construction (FIG. 30). Some insert-receiving bases 126 may include a first portion 142 and second portion 144 (FIGS. 30-32) having differing features.

Figure 25:
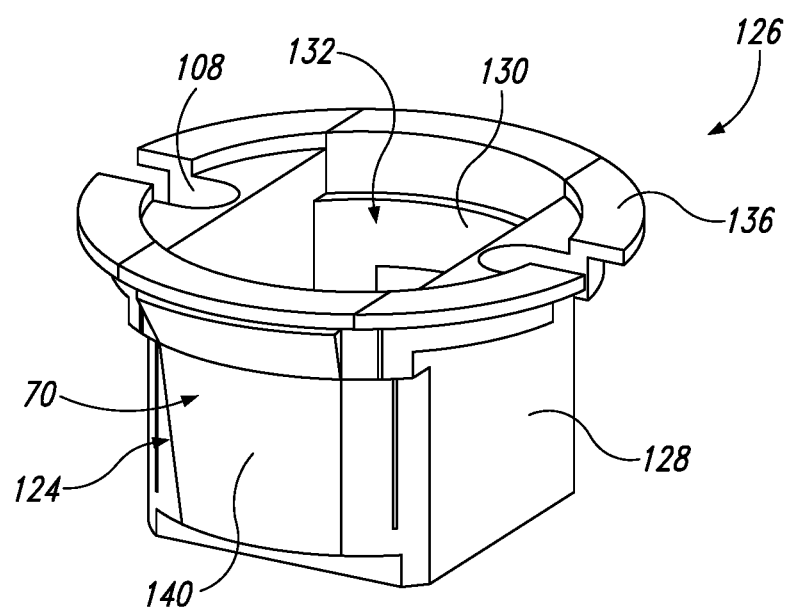
FIG. 25 is a perspective view of an insert-receiving base according to the present disclosure.
Figure 26:
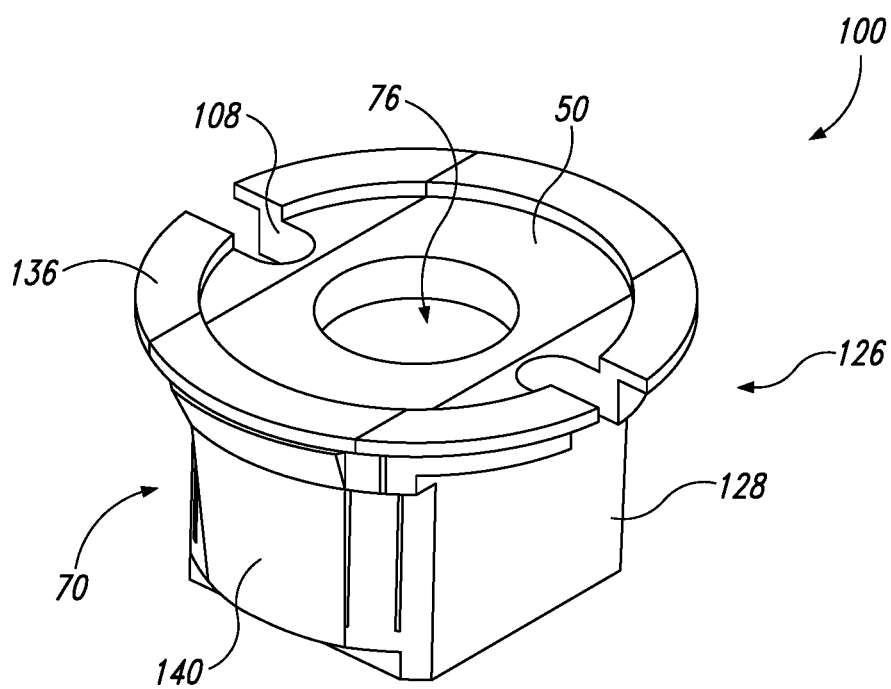
FIG. 26 is a perspective view of an insert in place within the insert-receiving base of FIG. 25.
Figure 27:
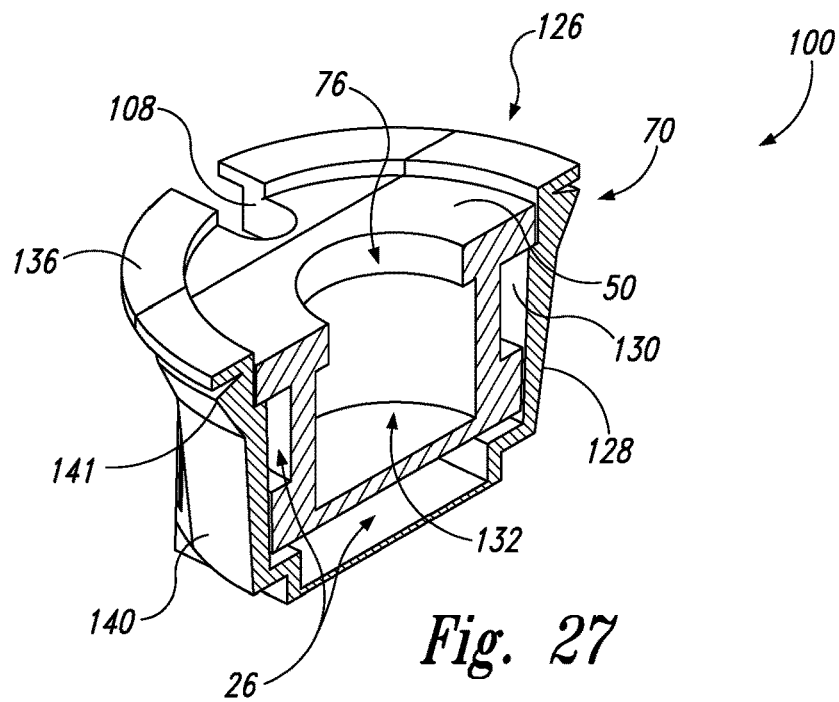
FIG. 27 is a perspective view of the insert and insert-receiving base of FIG. 26, with half of the insert and insert-receiving base removed.

FIG. 25 illustrates an insert-receiving base 126, shown without an insert positioned therein. Outer base surface 128 may be configured to engage bore 20 of sandwich panel 12, while inner base surface 130 may define an inner cavity 132 for receiving an insert 50. First skin-engaging structure 136 of insert-receiving base 126 may be configured to engage a skin of sandwich panel 12 (e.g., first skin 16 or second skin 18). One or more anchoring walls 140 may be expandable portions 124 and may be configured to expand radially outward into core 14 when insert 50 is installed within inner cavity 132, thereby anchoring insert-receiving base 126 in place within bore 20. FIG. 26 illustrates an example of insert 50 in place within insert-receiving base 126 of FIG. 25, and FIG. 27 illustrates the same, with insert 50 and insert-receiving base 126 partially removed. While insert-receiving bases 126 may be inserted into bore 20 before insert 50 is installed within insert-receiving base, FIGS. 26-27 illustrate insert 50 within insert-receiving base 126, outside of sandwich panel 12, for clarity. As shown in FIG. 27, when insert 50 is installed within insert-receiving base 126, spaces 26 may be formed between body 56 of insert 50 and inner base surface 130, as well as between opposing end 54 of insert 50 and inner base surface 130, such as to receive an adhesive compound in some examples.

Figure 28:
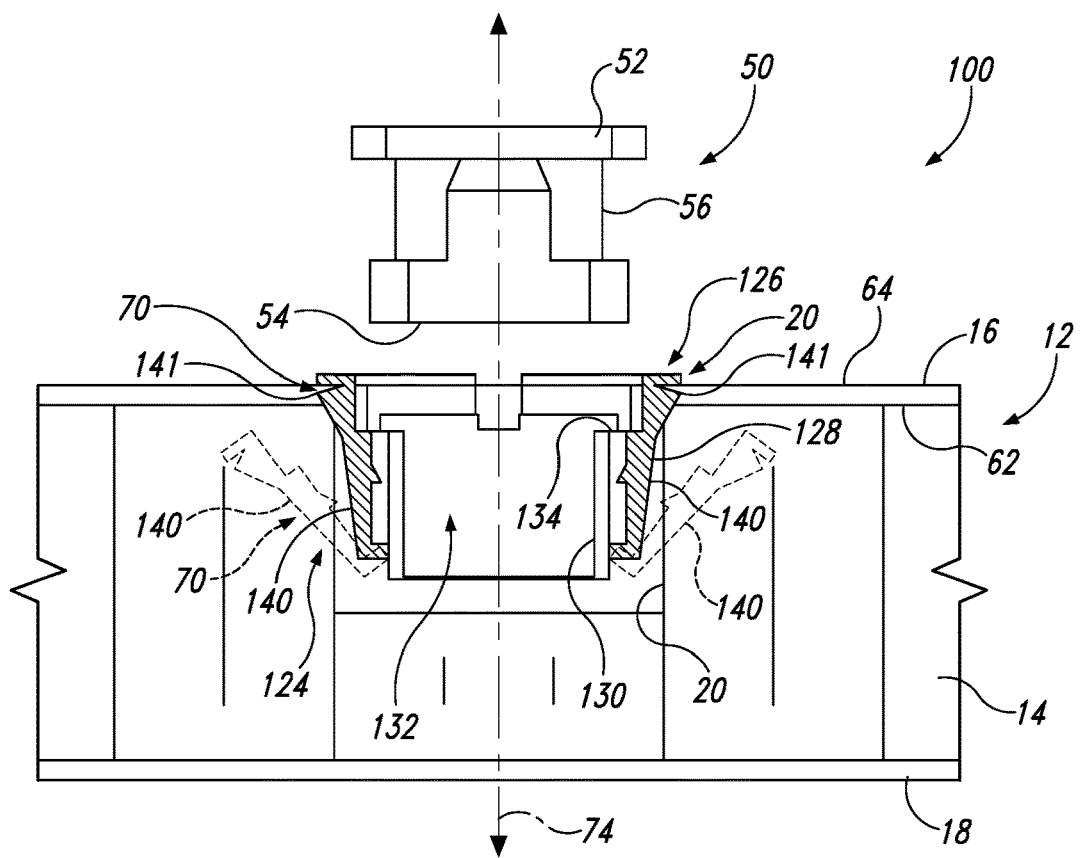
FIG. 28 is an exploded, cross-sectional view of an insert, and an insert-receiving base installed within a sandwich panel.

As shown in FIG. 28, when installed in bore 20 of sandwich panel 12, one or more retention features 70 may aid in retention of insert-receiving base 126 within bore 20. For example, lip 141 may be configured to engage first skin 16, such that a portion of lip 141 is positioned adjacent first inner surface 62 of first skin 16, and a portion of lip 141 is positioned adjacent first outer surface 64 of first skin 16, thereby entrapping a portion of first skin 16 within lip 141. Additionally or alternatively, one or more anchoring walls 140 may be configured to hinge, such that anchoring walls 140 may expand and contract radially away from and towards the remainder of insert-receiving base 126. Anchoring walls 140 of insert-receiving base 126 may contract radially inward from a relaxed position as insert-receiving base 126 is inserted into bore 20, and may expand radially outward into when insert 50 is installed within insert-receiving base 126, thereby anchoring insert-receiving base 126 into bore 20. For example, in FIG. 28, anchoring walls 140 are shown in a first position adjacent insert 50, and in a second position, in dashed line, wherein anchoring walls 140 have been expanded approximately 45° out from the remainder of insert-receiving base 126, representing a relaxed, expanded position of anchoring walls 140 prior to insertion of insert 50 and insert-receiving base 126 within bore 20.

Anchoring walls 140 may be configured to expand any amount upon insertion of insert 50 into insert-receiving base 126, and may take a final, installed, position somewhere between the two positions shown in FIG. 28. For example, anchoring walls 140 may expand to form an angle of at least 1°, at least 5°, at least 10°, at least 15°, at least 20°, at least 25°, at least 30°, at least 35°, at least 40°, at least 45°, at least 50°, at least 55°, and/or at least 60° with the longitudinal axis of the inner cavity 132 (e.g., longitudinal axis 74). Additionally or alternatively, when expanded, anchoring wall 140 may be configured to project from a circumference of inner cavity 132 a distance of at least 0.25 mm, 0.5 mm, 0.75 mm, 1 mm, 1.5 mm, 2 mm, 3 mm, 4 mm, 5 mm, 6 mm, 7 mm, 8 mm, 9 mm, and/or at least 10 mm from the circumference of inner cavity 132. In some examples, anchoring walls 140 may include a "live hinge" or "living hinge" that is configured to enable a range of movement of anchoring walls 140 with respect to the remainder of insert-receiving base 126. Insertion of insert-receiving base 126 into bore 20 may radially contract anchoring walls 140 towards longitudinal axis 74, such that anchoring walls 140 engage core 14 and/or panel skins (e.g., first skin 16 or second skin 18). Insertion of insert 50 into insert-receiving base 126 may radially expand anchoring walls 140 away from longitudinal axis 74, such that the final position of anchoring walls 140 may be a position between the two positions illustrated.

FIG. 29 illustrates an insert-receiving base 126 having a first portion 142 that is substantially similar to the insert-receiving base 126 of FIG. 28, and configured to receive a first insert 50. A second portion 144 of insert-receiving base 126 of FIG. 29 may be configured to receive a second insert 50', which may be the same type of insert as first insert 50, or may be a different type of insert. Second portion 144 of insert-receiving base 126 may be of simpler construction than first portion 142 in some examples. For example, second portion 144 may not include lip 141 or anchoring walls 140. In other examples, second portion 144 may contain one or both of these or other retention features 70. In some examples, such as shown in FIG. 30, insert-receiving base 126 does not include any of lip 141 or anchoring walls 140.

Figure 31:
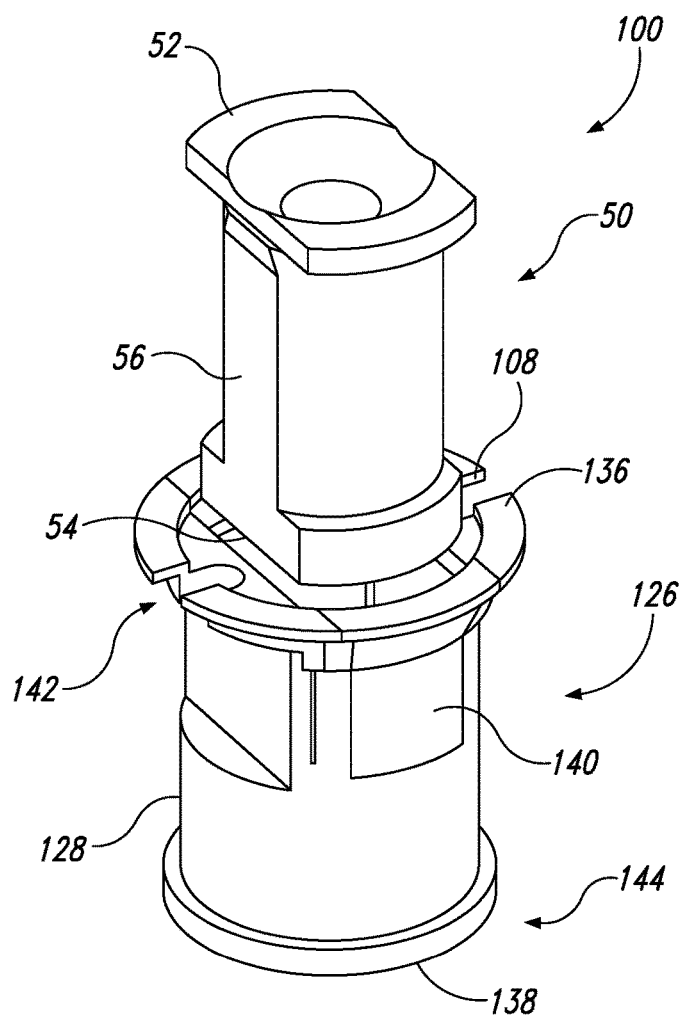
FIG. 31 is a top perspective view of another example of an insert being placed into an insert-receiving base according to the present disclosure.
Figure 32:
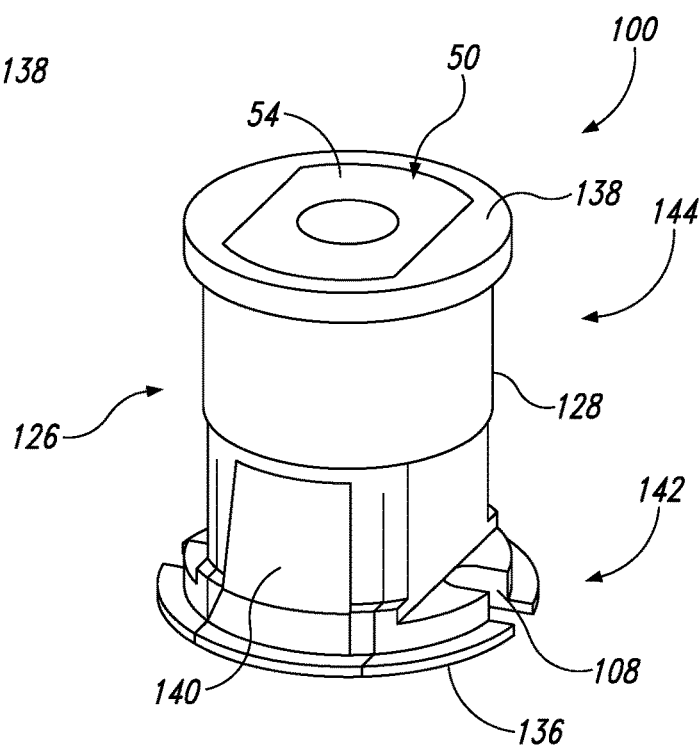
FIG. 32 is a bottom perspective view of the insert and insert-receiving base of FIG. 31.

While FIGS. 29 and 30 illustrate insert-receiving bases 126 configured to receive two inserts 50 in a through-bore 24, FIGS. 31 and 32 illustrate an example of an insert-receiving base 126 configured for a through-bore 24, but may just receive a single insert 50 that may extend from first skin-engaging structure 136 to second skin-engaging structure 138. First portion 142 may be configured to expand into core 14 of sandwich panel 12 upon insertion of insert 50 into the insert-receiving base 126 of FIGS. 31-32. FIG. 31 illustrates insert-receiving base 126 and insert 50 in an exploded view, viewed from first skin-engaging structure 136, while FIG. 32 illustrates the same insert-receiving base 126 and insert 50, with insert 50 installed in insert-receiving base 126, viewed from second skin-engaging structure 138. As shown in FIGS. 25-27 and 31-32, insert-receiving base 126 may include one or more vent holes 108 for receiving an adhesive compound.

Figure 33:
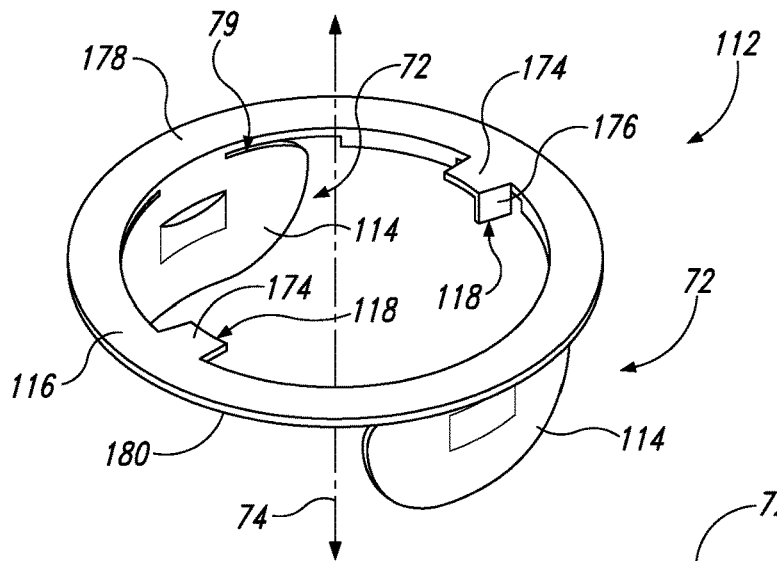
FIG. 33 is a top perspective view of one example of a snap ring according to the present disclosure that may be installed on an insert.
Figure 34:
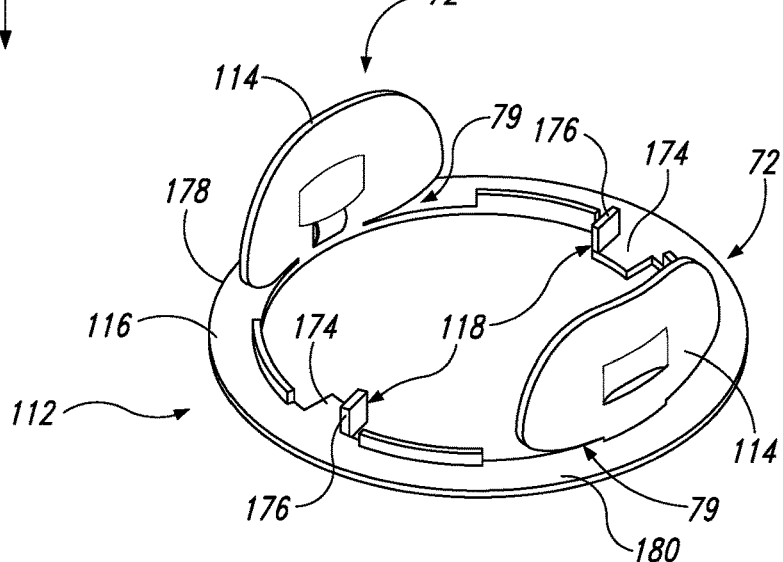
FIG. 34 is a bottom perspective view of the snap ring of FIG. 33.

FIGS. 33-46 illustrate various examples of snap rings 112 that may be configured for use with inserts 50 according to the present disclosure, along with various geometries for bores 20 of sandwich panels 12 that may receive such inserts 50 and snap rings 112. For example, FIGS. 33-34 illustrate perspective views from the top (FIG. 33) and bottom (FIG. 34) of an example of snap ring 112, which may be configured to be inserted into a bore 20 of a sandwich panel 12, and then insert 50 may be snapped into snap ring 112. In other examples, insert 50 may be snapped into snap ring 112 before either is inserted into bore 20 of sandwich panel 12, and insert 50 and snap ring 112 may be inserted into bore 20 together, as a subassembly. Snap rings 112 may be configured for use with any variation of inserts 50 disclosed herein, and/or with conventional round inserts 10. Snap ring 112 may include one or more cleats 114 extending axially from snap ring body 116 of snap ring 112. The example shown in FIGS. 33-34 includes two axially extending cleats 114, but more or fewer cleats 114 may be included in various different examples. For example, snap rings 112 according to the present disclosure may include at least one, at least two, at least three, at least four, at least five, at least six, at least seven, and/or at least eight cleats 114 extending axially from snap ring body 116.

Figure 35:
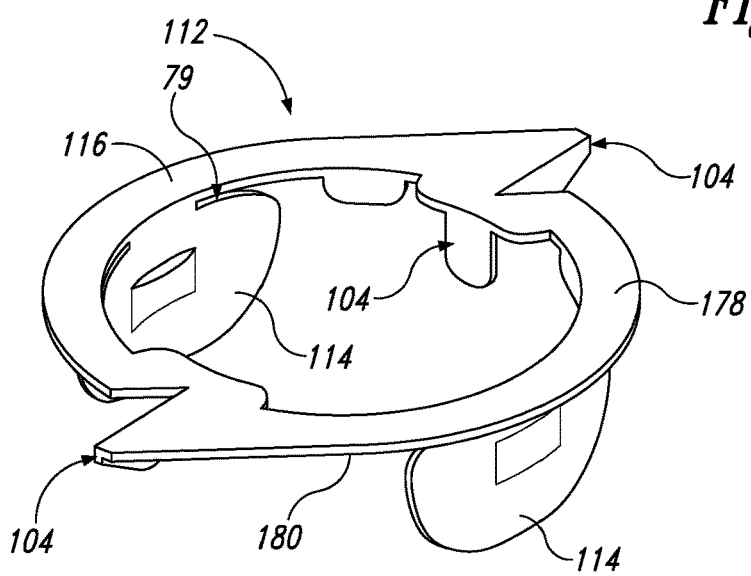
FIG. 35 is a top perspective view of another example of a snap ring according to the present disclosure that may be installed on an insert.

Cleats 114 may be configured to engage core 14, first skin 16, and/or second skin 18 of sandwich panel 12 when inserted into a bore 20, and/or may be configured to expand radially out from snap ring body 116 in response to an insert 50 pushing them radially outward, thereby further engaging sandwich panel 12 and anchoring snap ring 112 and insert 50 in place within bore 20. In some examples, a portion of one or more cleats 114 may be positioned under the panel skin when snap ring 112 and insert 50 are inserted within bore 20 of sandwich panel 12. As shown in FIGS. 33-35, cleats 114 may include one or more tapered portions 79, which may be configured to crimp the panel skin under such tapered portions 79 of cleats 114 as snap ring 112 is snapped into place within bore 20. Cleats 114 may serve as anti-rotation features 72 for snap ring 112 and/or an insert 50 contained within snap ring 112, with respect to bore 20. Cleats 114 are shown as substantially ear-shaped cleats 114, but other shapes are also within the scope of the present disclosure. For example, snap rings 112 may include one or more cleats 114 that are substantially circular, substantially square, substantially triangular, substantially rectangular, substantially polygonal, substantially oval, substantially hemispherical, substantially trapezoidal, and/or any other shapes, such as irregularly shaped cleats 114.

Snap ring 112 may include one or more rotation stops 118, which may function to substantially prevent rotation of insert 50 with respect to snap ring 112. For example, rotation of insert 50 within snap ring 112, about longitudinal axis 74, may be possible until one or more rotation stops 118 collide with one or more other features of insert 50 (e.g., panel-engaging structure 52, vent holes 108, etc.), thereby preventing further rotation of insert 50 with respect to snap ring 112. As shown in FIGS. 33-34, rotation stops 118 may include a radial portion 174 that extends radially from snap ring body 116 (e.g., radially inward, as shown in FIGS. 33-34), and an axial portion 176 that extends axially from snap ring body 116 and/or from radial portion 174. As shown in FIGS. 33-34, axial portions 176 may extend axially "downward," from snap ring body 116, which may be in the same axial direction as one or more cleats 114, and/or may be axially away from a first surface 178 of snap ring body 116, towards a second surface 180 on the underside of snap ring body 116 (e.g., second surface 180 may be oriented opposite first surface 178).

FIG. 35 illustrates a variation on the snap ring 112 shown in FIGS. 33-34. As compared to FIGS. 33-34, the snap ring 112 of FIG. 35 includes cleats 114 that are similar in size and shape to those of FIGS. 33-34. However, in contrast to the snap ring of FIGS. 33-34, the snap ring of FIG. 35 may be configured to engage with an insert by installing the insert from the underside of snap ring 112 (e.g., installing the insert from second surface 180, towards first surface 178). The example of snap ring 112 illustrated in FIG. 35 may include one or more blade portions 104 that extend radially outward from snap ring body 116, such as to engage with one or more slits 106 or other formations in bore 20 or cut-out 92 of sandwich panel 12. Snap ring 112 of FIG. 35 may be configured to be positioned on an insert before either is inserted into a bore of a sandwich panel, such that snap ring 112 and the insert may be inserted into the bore together.

Figure 36:
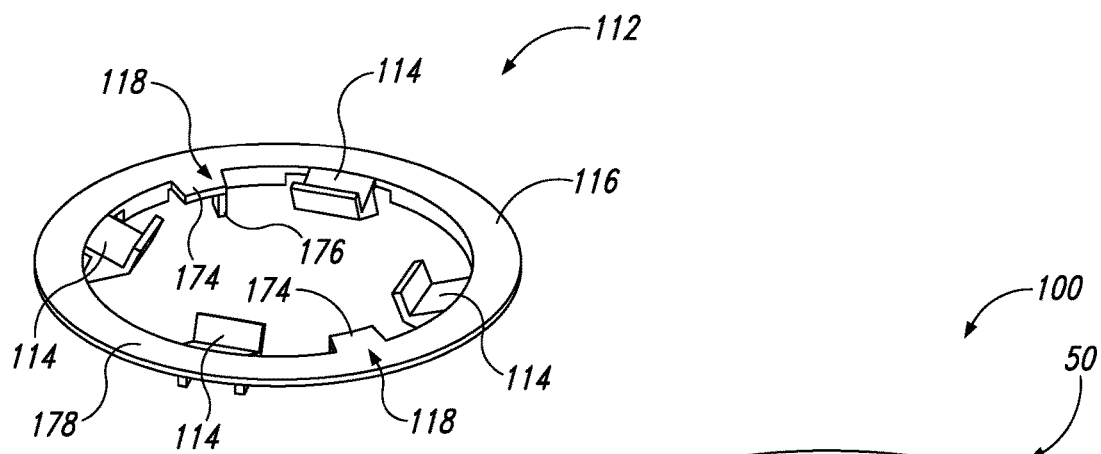
FIG. 36 is a top perspective view of another example of a snap ring according to the present disclosure that may be installed on an insert.
Figure 37:
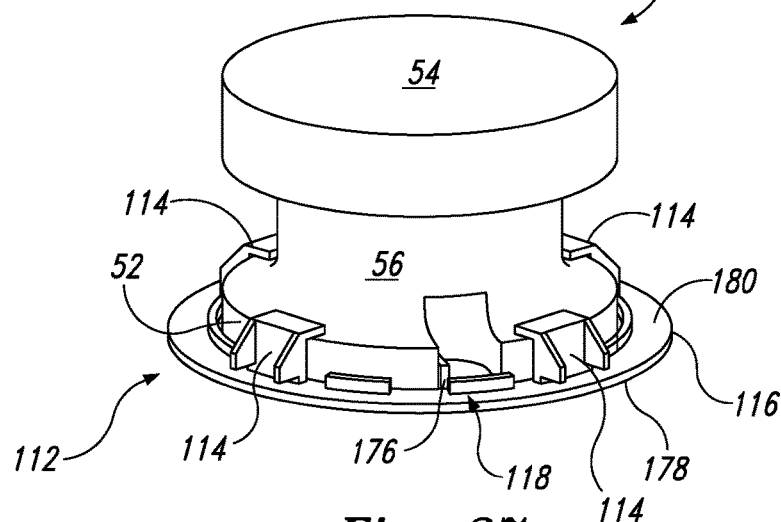
FIG. 37 is a bottom perspective view of one example of a snap ring according to the present disclosure, installed on an insert.
Figure 38:
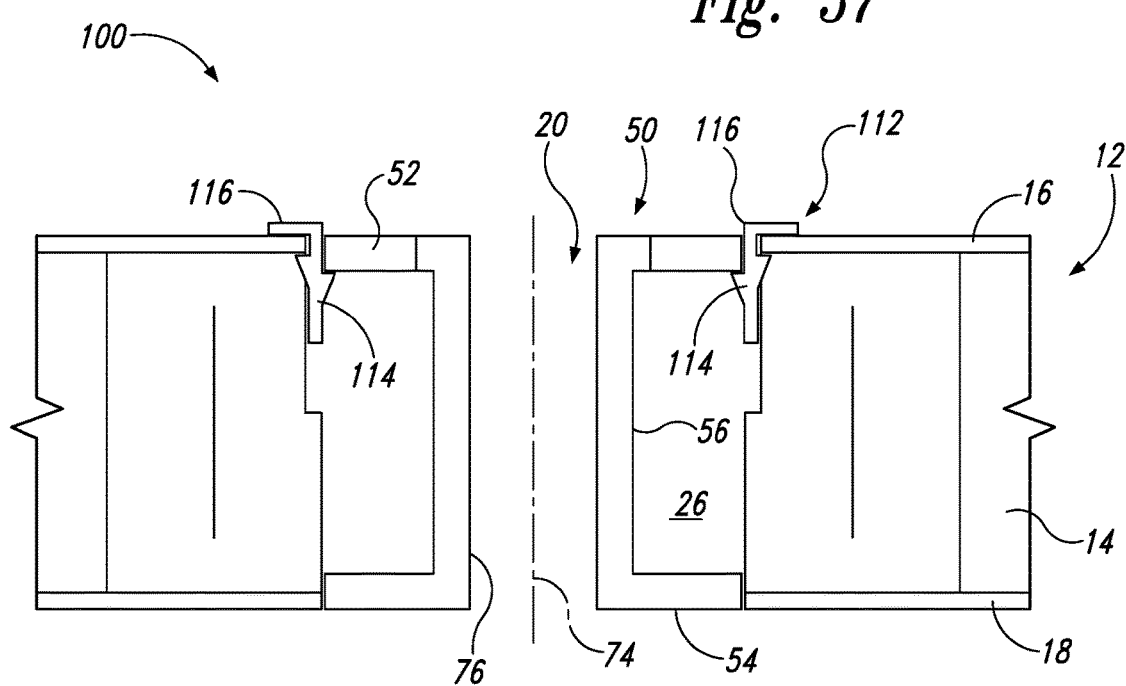
FIG. 38 is a cross-sectional, schematic representation of an example of a snap ring and insert installed within a sandwich panel according to the present disclosure.

FIG. 36 illustrates yet another variation of snap ring 112, having rotation stops 118 similar to those of FIGS. 33-34, but with different cleats 114 extending from snap ring body 116 of snap ring 112. Snap ring 112 of FIG. 36 includes four cleats 114 extending from snap ring body 116. As shown in FIG. 36, cleats 114 may extend substantially radially from snap ring body 116, rather than axially, as shown in FIGS. 33-35. Cleats 114 of snap ring 112 of FIG. 36 may be configured to engage insert 50 installed with snap ring 112, as well as a panel skin (e.g., first skin 16 or second skin 18 of sandwich panel 12). For example, FIG. 37 illustrates snap ring 112 of FIG. 36, in place on an insert 50, shown in perspective and viewed from opposing end 54 of insert 50. As shown in FIG. 37, cleats 114 may be configured to engage panel-engaging structure 52 to secure snap ring 112 to insert 50, and rotation stops 118 may be configured to engage vent holes 108 of insert 50. Cleats 114 may be configured to simultaneously engage the first skin or second skin of a sandwich panel (e.g., first skin 16 or second skin 18 of sandwich panel 12) when insert 50 and snap ring 112 are inserted into a bore of the sandwich panel. FIG. 38 illustrates a schematic cross-section view of a snap ring 112 and insert 50 installed within bore 20 of sandwich panel 12, according to the present disclosure, showing snap ring 112 (e.g., main body 116 and cleats 114 of snap ring 112) engaged with first skin 16 of sandwich panel 12, as well as engaged with insert 50.

Figure 39:
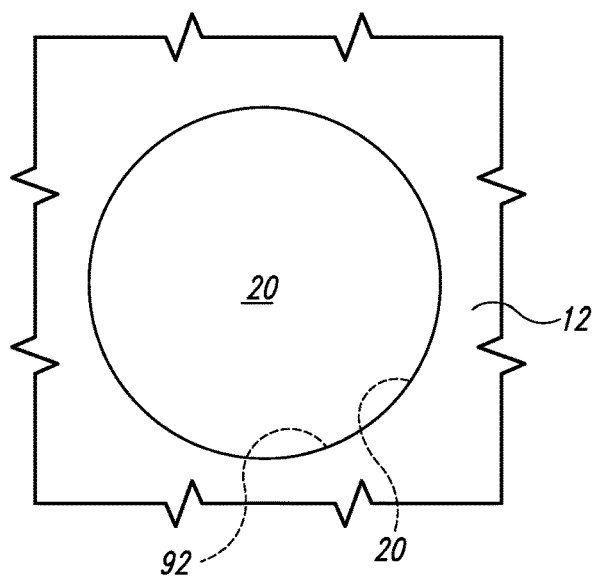
FIG. 39 is a top plan, schematic representation of a bore formed in a sandwich panel for receiving an insert and/or snap ring according to the present disclosure.
Figure 40:
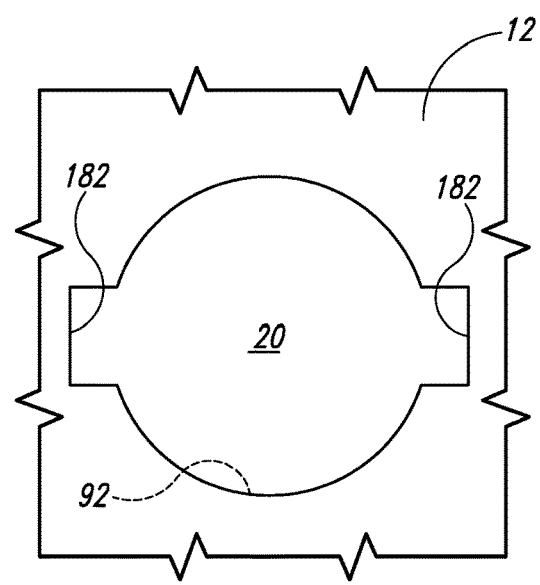
FIG. 40 is a top plan, schematic representation of a bore formed in a sandwich panel for receiving an insert and/or snap ring according to the present disclosure, having notches formed in the panel.
Figure 41:
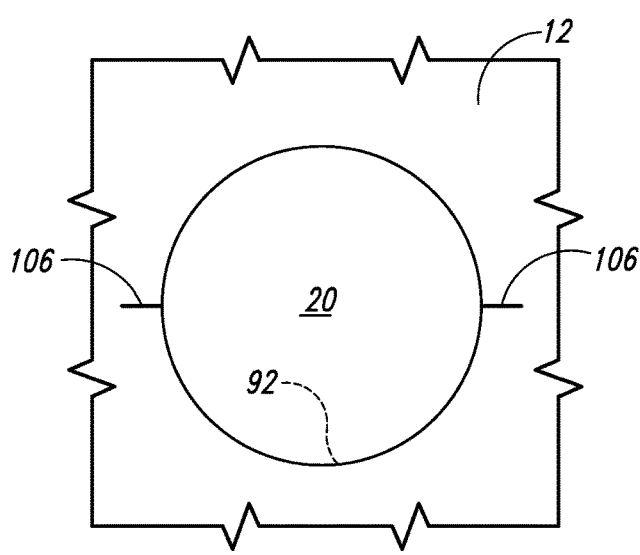
FIG. 41 is a top plan, schematic representation of a bore formed in a sandwich panel for receiving an insert and/or snap ring according to the present disclosure, having slits formed in the panel.

FIGS. 39-41 schematically illustrate various examples of bore geometries of bores 20 and/or cut-outs 92 within sandwich panel 12, that insert 50 and/or snap ring 112 may be configured to engage with. For example, FIG. 39 illustrates a standard bore 20 with a substantially circular cut-out 92, without any specific features designed to engage an insert or snap ring according to the present disclosure. FIG. 40 illustrates a bore 20 and cut-out 92 having one or more bore notches 182 formed therein, the bore notches 182 being configured to engage one or more features of insert 50 and/or snap ring 112. For example, one or more cleats 114 and/or rotation stops 118 of snap ring 112 of FIG. 35 may be configured to be contained within bore notches 182 once snap ring 112 is rotated such that they are positioned therein. Similarly, FIG. 41 illustrates a bore 20 and cut-out 92 having one or more slits 106 formed therein, such as may be configured to engage rotation stops 118 of snap ring 112 of FIG. 35.

Figure 42:
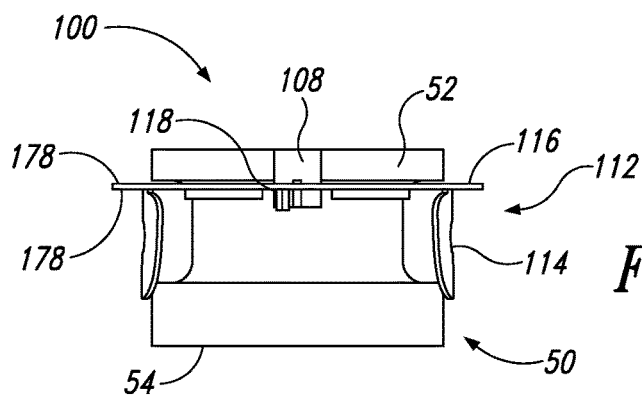
FIG. 42 is a side elevation view of one example of a snap ring according to the present disclosure, installed on an insert.
Figure 43:
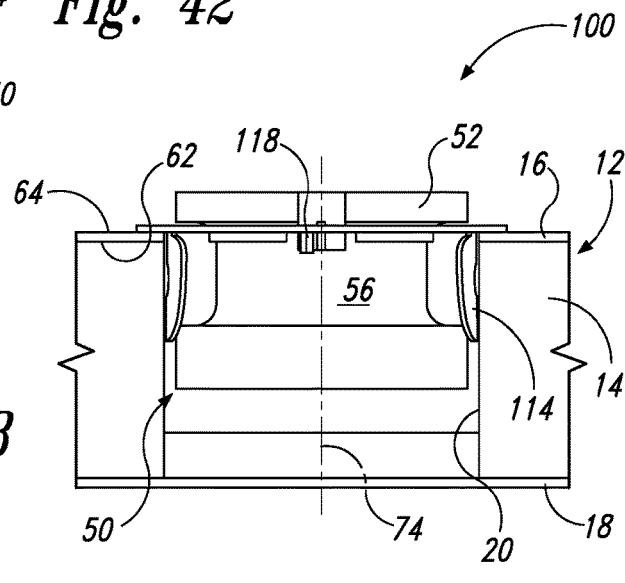
FIG. 43 is a side elevation view of the snap ring and insert of FIG. 42 partially installed within a sandwich panel, the sandwich panel shown in cut-away.
Figure 44:
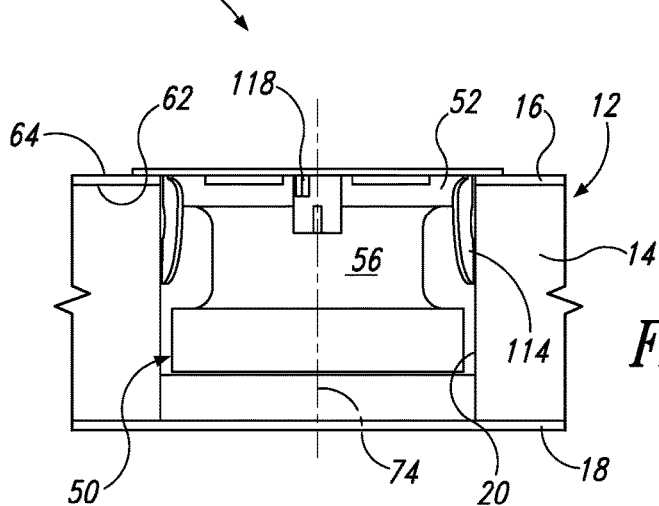
FIG. 44 is a side elevation view of the snap ring and insert of FIG. 42 further installed within a sandwich panel, the sandwich panel shown in cut-away.
Figure 45:
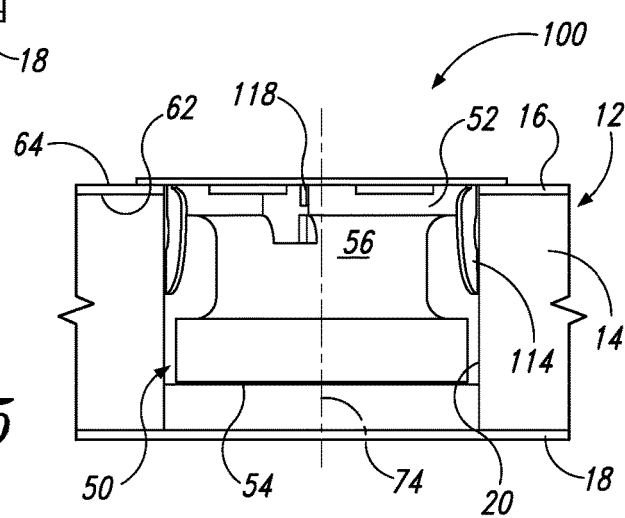
FIG. 45 is a side elevation view of the snap ring and insert of FIG. 42 fully installed within a sandwich panel, the sandwich panel shown in cut-away.
Figure 46:
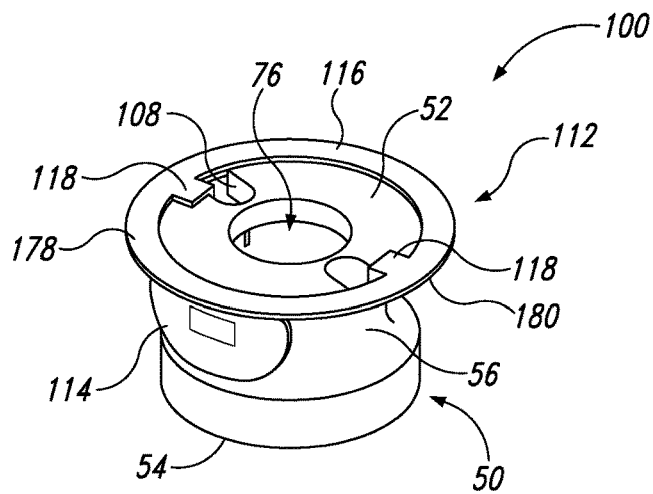
FIG. 46 is a perspective view of one example of a snap ring according to the present disclosure, in place on an insert, illustrating rotation of the insert with respect to the snap ring.

FIGS. 42-46 illustrate, sequentially, one example of a snap ring 112 with an insert 50 being installed in a bore 20 of a sandwich panel 12, according to the present disclosure. As shown in FIG. 42, snap ring 112 may be placed onto insert 50, adjacent panel-engaging structure 52, such that snap ring 112 is captured between panel-engaging structure 52 and opposing end 54 (e.g., with cleats 114 adjacent body 56 of insert 50). So assembled, as shown in FIG. 43, snap ring 112 and insert 50 may be inserted into a bore 20 of a sandwich panel 12. Second surface 180 of snap ring body 116 of snap ring 112 may engage an outer skin surface of sandwich panel 12 (e.g., first outer surface 64 of first skin 16). Once positioned in bore 20 of sandwich panel 12, and as shown in FIG. 44, insert 50 may be further inserted into bore 20 and snap ring 112. Snap ring body 116 of snap ring 112 may have a larger diameter than bore 20 and/or cut-out 92, such that snap ring body 116 of snap ring 112 may be prevented from being inserted into bore 20 beyond the outer skin (e.g., first skin 16, as shown). However, further inserting insert 50 into bore 20 may force snap ring 112 (e.g., snap ring body 116 and cleats 114) to grip first skin 16 (e.g., a portion of snap ring 112 may be positioned adjacent first outer surface 64 of first skin 16, and a portion of snap ring 112 may be positioned adjacent first inner surface 62 of first skin 16) and/or engage core 14 of sandwich panel 12. Finally, as shown in FIG. 45, insert 50 may be rotated about longitudinal axis 74 with respect to snap ring 112 and bore 20, wherein such rotation may be configured to lock insert 50 in place within snap ring 112 and bore 20, such as by engaging rotation stops 118 of snap ring 112 with panel-engaging structure 52 of insert 50, at which point an adhesive compound and/or a secondary object 78 may be injected and/or installed, respectively. FIG. 46 illustrates a perspective view of insert 50 and snap ring 112, showing insert 50 after it has been rotated with respect to snap ring 112, such that rotation stops 118 are engaged with panel-engaging structure 52 of insert 50.

Figure 47:
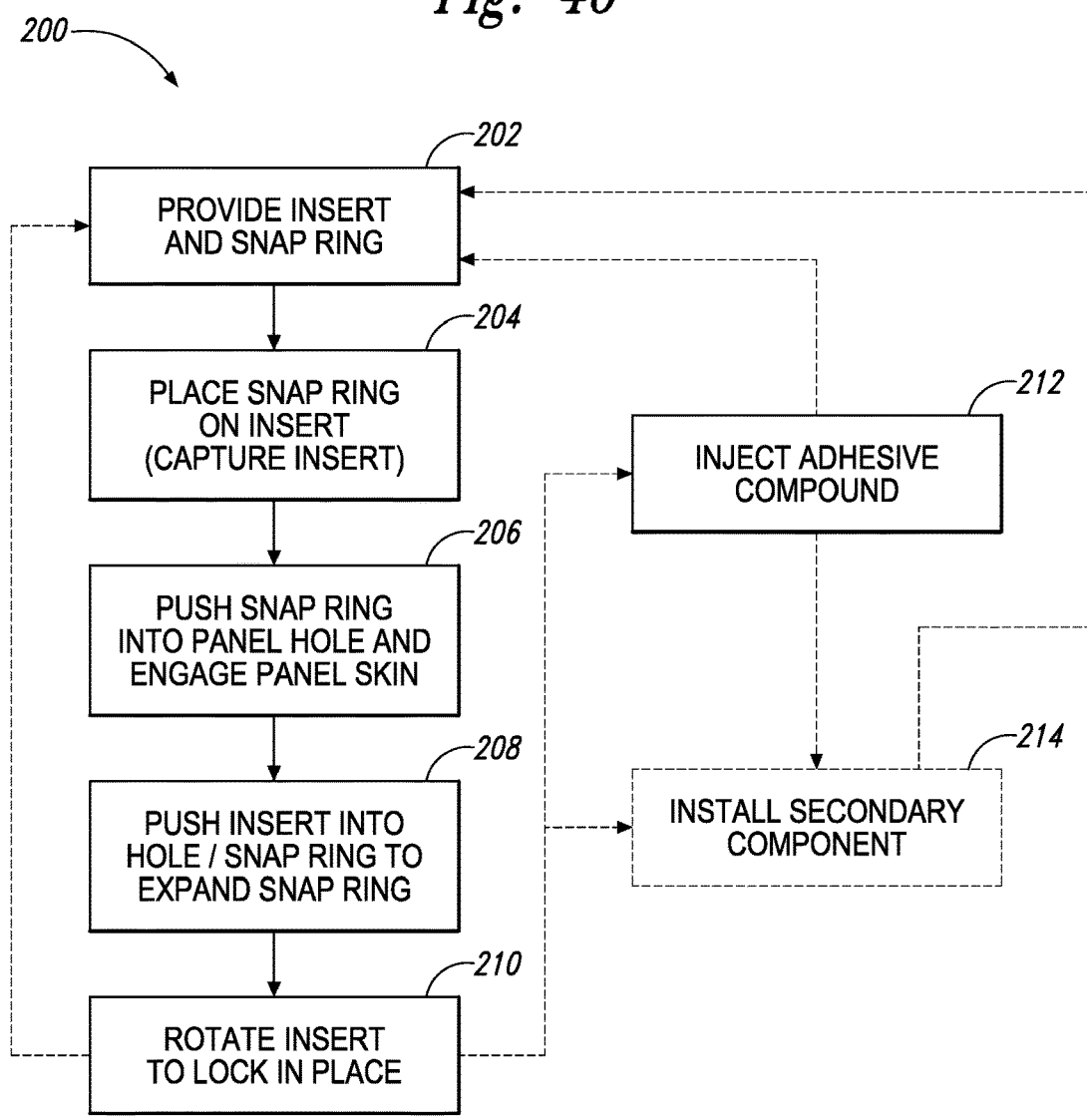
FIG. 47 is a schematic flow chart diagram, representing methods of installing an insert having a snap ring within a sandwich panel, according to the present disclosure.
Figure 48:
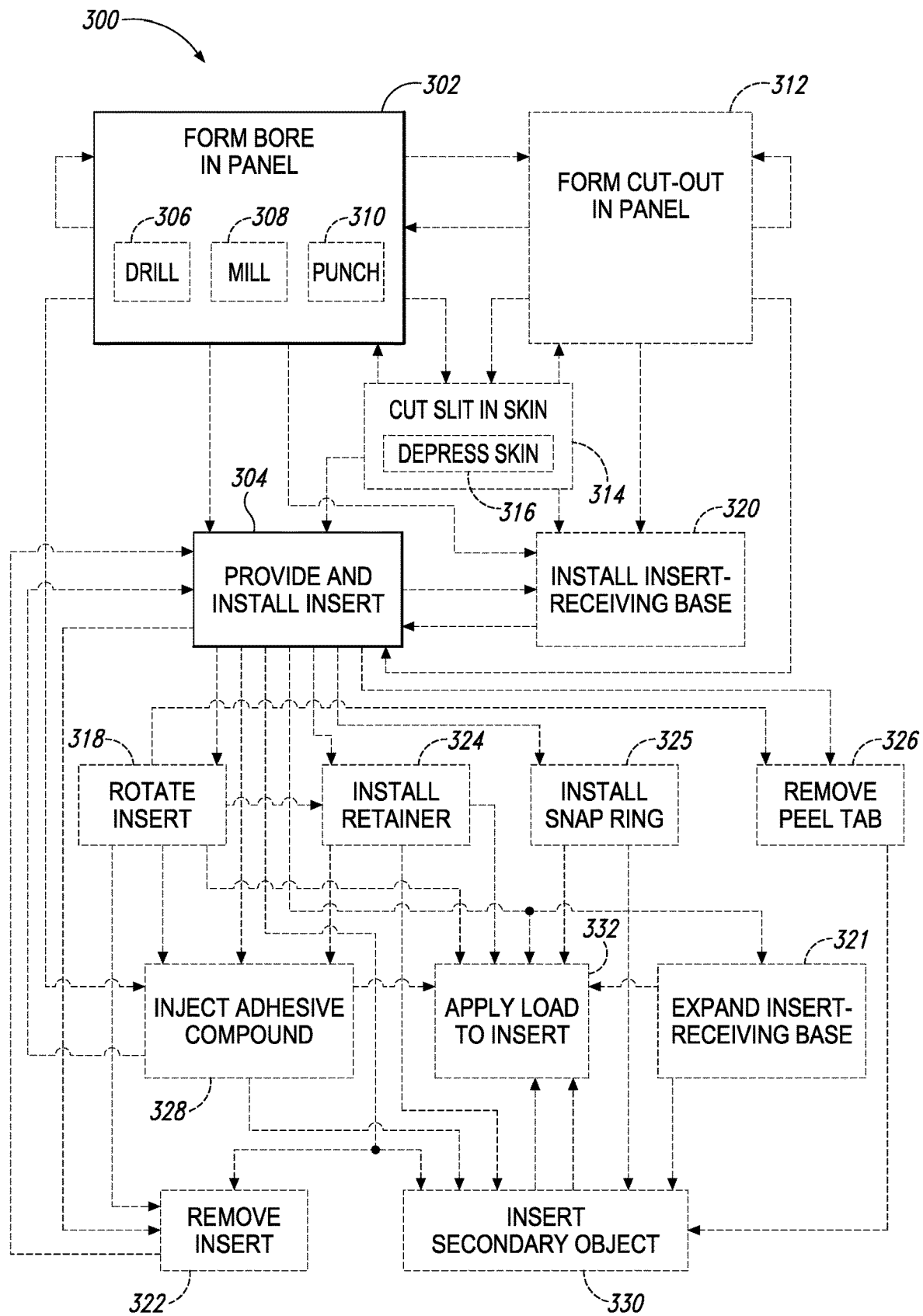
FIG. 48 is a schematic flow chart diagram, representing methods of installing one or more inserts into a sandwich panel, according to the present disclosure.

FIGS. 47-48 schematically provide flowcharts representing illustrative, non-exclusive examples of methods according to the present disclosure. In FIGS. 47-48, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 47-48 are not limiting and other methods and steps are within the scope of the present disclosure, including methods having greater than or fewer than the number of steps illustrated, as understood from the discussions herein.

FIG. 47 illustrates examples of methods 200 of installing an insert (e.g., insert 50) and snap ring (e.g., snap ring 112), corresponding to FIGS. 42-46. For example, an insert and snap ring may be provided at 202, and the snap ring may be placed onto the insert at 204 (e.g., as shown in FIG. 42). The snap ring may be inserted at least partially into a bore (e.g., bore 20) formed in a sandwich panel (e.g., sandwich panel 12) at 206 (e.g., as shown in FIG. 43). In some methods, the snap ring may be positioned with respect to the bore before the insert is captured within the snap ring (e.g., pushing the snap ring into the bore at 206 may include positioning just the snap ring with respect to the bore and engaging the panel skin (e.g., first skin 16 or second skin 18)). In other methods, the insert may be captured within the snap ring at 204 before the snap ring is pushed into the panel hole at 206, such that the insert and the snap ring are inserted into the bore together at 206.

In some methods, at least partially inserting the snap ring and insert at 206 may include pushing the insert into the bore in the sandwich panel until the snap ring engages a skin of the sandwich panel (e.g., until a second surface 180 of a snap ring body 116 of snap ring 112 contacts a first outer surface 64 of a first skin 16 of sandwich panel 12). The insert may be further inserted or pressed into the bore and snap ring at 208, in order to force the snap ring to expand and engage with the core (e.g., core 14) and/or skin of the sandwich panel (e.g., as shown in FIG. 44). The insert may be rotated about the longitudinal axis of the bore (e.g., longitudinal axis 74) with respect to the snap ring at 210, such as to lock the insert in place within the bore and snap ring (e.g., as shown in FIG. 45). Methods 200 may include repeating steps 200-210 any number of times, to insert any number of respective snap rings and inserts into any number of bores formed in a single sandwich panel or in multiple sandwich panels. Some methods 200 may include injecting an adhesive compound (e.g., potting compound) at 212 and/or installing a secondary component (e.g., secondary object 78) at 214 into a hole (e.g., hole 76) of the insert.

FIG. 48 illustrates methods 300 of installing an insert (e.g., insert 50) in a bore (e.g., bore 20) of a sandwich panel (e.g., sandwich panel 12), and may generally include forming the bore in the sandwich panel at 302, and providing and installing an insert into said bore at 304. Forming the bore at 302 may include forming at least one bore (which may be a circular bore in some examples), and may include forming a plurality of bores in a single sandwich panel and/or in a plurality of sandwich panels. Forming the bore at 302 may be performed using any suitable technique, and may include drilling at 306, milling at 308, and/or punching using a punch set at 310 to form the bore. Forming the bore at 302 may include forming one or more blind bores, one or more double-blind bores, and/or one or more through-bores in the sandwich panel (e.g., forming the bore at 302 may include forming at least one bore such that it extends through at least one of the first skin and the second skin and into the core of the sandwich panel). Providing and installing the insert at 304 may include installing at least one insert into at least one respective bore, such that the panel-engaging surface of the insert engages the sandwich panel (e.g., the first skin or the second skin of the sandwich panel), and the body of the insert is positioned within the bore of the sandwich panel. In some examples, providing and installing the insert at 304 may include installing one insert into each respective bore. Additionally or alternatively, some examples of providing and installing the insert at 304 may include installing two inserts into one or more respective bores, wherein said two inserts may be the same type of insert or different types of inserts.

In some methods 300, a cut-out (e.g., cut-out 92) may be formed adjacent one or more bores in the sandwich panel, such as by milling a portion of the sandwich panel skin adjacent one or more of the bores in order to form the cut-out at 312. Forming the cut-out at 312 may include forming a cut-out that has a larger surface area than the bore it surrounds, and the cut-out may be configured to only extend a fraction of the way into the depth of the bore. Forming the cut-out at 312 may include forming any shape of cut-out, such as substantially triangular, substantially circular, polygonal, and/or any other shape. In some methods, one or more cut-outs in a respective sandwich panel may be shaped differently from one or more other cut-outs in the respective sandwich panel.

Additionally or alternatively, the sandwich panel may be further prepared to receive an insert according to the present disclosure, such as by forming one or more slits (e.g., slits 106) in the skin, adjacent and radially extending from one or more of the bores, at 314. Forming one or more slits at 314 may include forming one or more respective slits adjacent a plurality of bores formed in a sandwich panel, and/or just a portion of the bores in a given sandwich panel may have slits formed adjacent thereto. In some methods 300, forming the slits in the skin at 314 may include depressing a portion of the sandwich panel skin at 316. For example, one or more portions of the sandwich panel skin (e.g., the first skin or the second skin) may be depressed into the core of the sandwich panel, such as portions of skin between adjacent pairs of slits.

Once the insert is initially inserted into the bore at 304, the insert may be rotated about the longitudinal axis of the bore and insert (e.g., longitudinal axis 74) at 318, which may aid in securing the insert in place within the bore. In some methods, rotating the insert at 318 may include rotating the insert at least 5°, at least 10°, at least 20°, at least 30°, at least 40°, at least 50°, at least 60°, at least 70°, at least 80°, at least 90°, at least 120°, at least 150°, and/or at least 180° about the longitudinal axis and with respect to the sandwich panel. In some methods, rotating the insert at 318 may include breaking a bond between the sandwich panel skin and the core, adjacent the bore. For example, rotating the insert at 318 may cause a portion of the insert (e.g., a portion of the panel-engaging structure, such as corner portions, projections, coarse threads, etc.) to be rotated into a position under the skin of the sandwich panel, between the skin and the core. In some methods, rotating the insert at 318 may include rotating the insert until a rotation stop (e.g., rotation stop 118 of a snap ring 112) contacts a portion of the insert (e.g., a vent hole 108 of insert 50).

Some methods 300 may include installing an insert-receiving base (e.g., insert-receiving base 126) into one or more of the bores in the sandwich panel, at 320. In some methods, installing the insert-receiving base at 320 may be performed prior to the installing the insert at 304, such that the insert-receiving base may be inserted directly into the bore, and the insert may be inserted within the insert-receiving base. In some such methods, installing the insert at 304 may cause expanding the respective insert-receiving base into which the insert is installed at 321, such that at least a portion of the outer surface of the insert-receiving base is pressed into the respective bore, due to the insert pressing on the inner surface of the insert-receiving base. Some methods may include removing at least one insert from one or more respective insert-receiving bases at 322. For example, if an incorrect insert was installed in a respective insert-receiving base, the incorrect insert may be removed at 322 and a different (e.g., correct) insert may then be placed into the insert-receiving base, again at 304.

Some methods 300 may include installing a respective retainer (e.g., retainer 88) onto one or more respective inserts, at 324, the retainer being configured to resist movement of the respective insert with respect to the sandwich panel. Additionally or alternatively, methods 300 may include installing a snap ring (e.g., snap ring 112) at 325, which may include one or more of the steps of methods 200 as illustrated in FIG. 47. After the installing the insert at 304, some methods 300 may include removing a peel flange (e.g., peel flange 110) from the insert at 326 and/or injecting an adhesive compound (e.g., a potting compound, a quick-cure adhesive, and/or a UV-cure adhesive) into one or more vent holes (e.g., vent holes 108) of the insert at 328, such that the adhesive compound at least partially fills a space (e.g., space 26) between the insert and the core of the sandwich panel, inside the bore. Some methods 300 may include inserting one or more secondary objects (e.g., secondary object 78) into the hole of the insert at 330, and/or applying a load to the insert at 332, which may be caused via the secondary object, or independent from the secondary object. In some methods 300, such applying a load at 332 and/or inserting a secondary object at 330 may be performed before any adhesive compound injected during the injecting at 328 has cured, or without the use of any adhesive compound at all. In other words, presently disclosed inserts, snap rings, and/or insert-receiving bases may be configured to be secure within a bore of the sandwich panel independent of use of any adhesive compound. Adhesive compound may be still be used to supplement retention of the insert within the bore in some methods, but is not required. One or more steps of methods 300 may be automated in some examples. For example, forming at least one bore at 304 and/or installing at least one insert into a respective bore at 304 may be automated.

Illustrative, non-exclusive examples of inventive subject matter according to the present disclosure are described in the following enumerated paragraphs:

A1. An insert configured to be installed in a sandwich panel, the sandwich panel comprising a first skin, a second skin opposite the first skin, and a core therebetween; the insert comprising:

a panel-engaging structure configured to engage one of the first skin and the second skin of the sandwich panel when the insert is installed in a bore of the sandwich panel;

an opposing end opposite the panel-engaging structure;

a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;

a retention feature configured to retain the insert in the sandwich panel, at least a portion of the retention feature being configured to be positioned between the first skin and the second skin of the sandwich panel when the insert is installed in the sandwich panel; and an anti-rotation feature configured to resist rotation of the insert with respect to the sandwich panel once the insert is fully inserted in the sandwich panel, wherein the insert is configured to receive a secondary object within the hole, the secondary object being configured to transfer a localized load to the sandwich panel via the insert.

A1.1. The insert of paragraph A1, wherein the panel-engaging structure is configured to engage the first skin of the sandwich panel.

A1.2. The insert of paragraph A1.1, wherein the opposing end is configured to engage the second skin of the sandwich panel.

A1.3. The insert of paragraph A1, wherein the panel-engaging structure is configured to engage the second skin of the sandwich panel.

A1.4. The insert of paragraph A1.3, wherein the opposing end is configured to engage the first skin of the sandwich panel.

A1.5. The insert of any of paragraphs A1-A1.4, wherein the hole has a longitudinal axis that is substantially perpendicular to a first plane defined by the panel-engaging structure and to a second plane defined by the opposing end.

A1.6. The insert of any of paragraphs A1-A1.5, wherein the panel-engaging structure comprises a flange, the flange comprising an inner flange surface arranged facing the opposing end, the flange further comprising an outer flange surface facing away from the opposing end.

A1.7. The insert of paragraph A1.6, wherein the inner flange surface is configured to engage one of the first skin and the second skin of the sandwich panel when the insert is installed in the sandwich panel.

A1.8. The insert of paragraph A1.6, wherein the outer flange surface is configured to engage one of the first skin and the second skin of the sandwich panel when the insert is installed in the sandwich panel.

A2. The insert of any of paragraphs A1-A1.8, wherein the hole extends from the panel-engaging structure to the opposing end.

A3. The insert of any of paragraphs A1-A2, wherein the hole comprises internal threads.

A4. The insert of any of paragraphs A1-A3, wherein the opposing end is configured to be substantially flush with a second outer surface of the second skin of the sandwich panel when the insert is installed in the sandwich panel, wherein the second outer surface faces away from the core of the sandwich panel.

A5. The insert of any of paragraphs A1-A3, wherein the opposing end is configured to engage the core of the sandwich panel when the insert is installed in the sandwich panel.

A6. The insert of any of paragraphs A1-A5, wherein the panel-engaging structure is substantially triangular.

A7. The insert of any of paragraphs A1-A6, wherein the first skin of the sandwich panel comprises a first outer surface facing away from the core of the sandwich panel and a first inner surface opposite the first outer surface and facing the core of the sandwich panel, wherein at least a portion of the panel-engaging structure of the insert is configured to engage the first inner surface of the first skin when the insert is installed in the sandwich panel.

A8. The insert of paragraph A7, wherein at least a portion of the panel-engaging structure is positioned between the first inner surface of the first skin and the core when the insert is installed in the sandwich panel.

A8.1. The insert of paragraph A7 or A8, wherein at least 5%, at least 10%, at least 20%, at least 25%, at least 33%, at least 40%, at least 50%, at least 67%, and/or at least 75% of a surface area of the panel-engaging structure is positioned between the first inner surface and the core of the sandwich panel when the insert is installed in the sandwich panel.

A9. The insert of paragraph A7, A8, and/or A8.1, wherein the anti-rotation feature of the panel-engaging structure comprises at least one extension extending from a primary perimeter of the panel-engaging structure, wherein the at least one extension is configured to be positioned adjacent the first outer surface of the first skin when the insert is installed in the sandwich panel.

A10. The insert of paragraph A9, wherein the at least one extension is wedge-shaped, having a variable thickness along its length.

A11. The insert of any of paragraphs A1-A10, wherein the panel-engaging structure is substantially polygonal.

A11.1. The insert of any of paragraphs A1-A10, wherein the panel-engaging structure comprises a plurality of straight edges connected by a respective plurality of corner portions, wherein the retention feature comprises at least one of the corner portions, and wherein the corner portions are configured to be positioned between the first inner surface of the first skin and the core when the insert is installed in the sandwich panel.

A12. The insert of paragraph A11.1, wherein each corner portion of the plurality of corner portions is a rounded corner portion.

A12.1. The insert of any of paragraphs A1-A12, wherein the second skin of the sandwich panel comprises a second outer surface facing away from the core of the sandwich panel and a second inner surface opposite the second outer surface and facing the core of the sandwich panel, wherein at least a portion of the panel-engaging structure of the insert is configured to engage the second inner surface of the second skin when the insert is installed in the sandwich panel.

A12.2. The insert of paragraph A12.1, wherein at least a portion of the panel-engaging structure is positioned between the second inner surface of the second skin and the core when the insert is installed in the sandwich panel.

A12.3. The insert of paragraph A12.1 or A12.2, wherein at least 5%, at least 10%, at least 20%, at least 25%, at least 33%, at least 40%, at least 50%, at least 67%, and/or at least 75% of a surface area of the panel-engaging structure is positioned between the second inner surface and the core of the sandwich panel when the insert is installed in the sandwich panel.

A12.4. The insert of paragraph A12.1, A12.2, and/or A12.3, wherein the anti-rotation feature of the panel-engaging structure comprises at least one extension extending from a primary perimeter of the panel-engaging structure, wherein the at least one extension is configured to be positioned adjacent the second outer surface of the second skin when the insert is installed in the sandwich panel.

A12.5. The insert of paragraph A12.4, wherein the at least one extension is wedge-shaped, having a variable thickness along its length.

A12.6. The insert of any of paragraphs A12.1-A12.5, wherein the panel-engaging structure comprises a plurality of straight edges connected by a respective plurality of corner portions, wherein at the retention feature comprises at least one of the corner portions, and wherein the corner portions are configured to be positioned between the second inner surface of the second skin and the core when the insert is installed in the sandwich panel.

A12.7. The insert of paragraph A12.6, wherein each corner portion of the plurality of corner portions is a rounded corner portion.

A13. The insert of any of paragraphs A1-A12.7, wherein the insert is configured to be rotated as it is installed in the sandwich panel.

A13.1. The insert of paragraph A13, wherein the insert is configured to be rotated with respect to the sandwich panel such that at least a portion of the panel-engaging structure is rotated to a position between the core and one of the first skin and the second skin.

A14. The insert of any of paragraphs A1-A13.1, wherein the insert is configured to be self-retaining in its position in the sandwich panel without the use of adhesives.

A15. The insert of any of paragraphs A1-A14, wherein the anti-rotation feature of the insert comprises a retainer configured to substantially prevent rotation of the insert within the sandwich panel.

A15.1. The insert of paragraph A15, wherein the retainer is configured to be substantially flush with the first skin or the second skin of the sandwich panel when the retainer is installed with respect to the insert.

A15.2. The insert of any of paragraphs A15-A15.1, wherein the retainer is configured to cover at least one exposed area of the core of the sandwich panel when the retainer is installed with respect to the insert.

A15.3. The insert of any of paragraphs A15-A15.2, wherein the retainer comprises a through-hole that is substantially concentric with the hole of the insert when the retainer is installed with respect to the insert, the through-hole having approximately the same diameter as the hole.

A15.4. The insert of paragraph A15.3, wherein the through-hole of the retainer is configured to receive the secondary object therethrough.

A15.5. The insert of any of paragraphs A15-A15.4, wherein the retainer comprises a substantially flat surface and at least one projecting tab extending from the substantially flat surface, wherein the substantially flat surface is configured to engage the panel-engaging structure of the insert, and wherein the at least one projecting tab is configured to engage one or more of the core, the first skin, and the second skin of the sandwich panel.

A15.6. The insert of any of paragraphs A15-A15.5, wherein the retainer has the same overall shape as the panel-engaging structure of the insert.

A15.7. The insert of any of paragraphs A15-A15.6, wherein the retainer is rotated with respect to the panel-engaging structure of the insert when installed with respect to the insert.

A15.8. The insert of any of paragraphs A15-A15.7, wherein the retainer is a separate piece from the insert.

A16. The insert of any of paragraphs A1-15.8, wherein the secondary object the insert is configured to receive in the hole comprises one or more of a pin, a bolt, a rivet, a screw, a joint, a standoff, an angle, a wire, a cable, a secondary insert, and a wire bundle.

A17. The insert of any of paragraphs A1-A16, wherein the anti-rotation feature is configured to resist rotation of the insert with respect to the sandwich panel, about the longitudinal axis of the hole.

A17.1. The insert of any of paragraphs A1-A17, wherein the retention feature comprises a plurality of coarse threads positioned adjacent the panel-engaging structure of the insert and configured to engage one or more of the first skin and the second skin of the sandwich panel.

A17.2. The insert of any of paragraphs A1-A17.1, further comprising a blade portion extending from the insert, wherein the blade portion is configured to engage one or more of a slit and a depressed portion formed in one or more of the first skin and the second skin of the sandwich panel.

A17.3. The insert of any of paragraphs A1-A17.2, wherein the anti-rotation feature is configured to engage a slit formed in one or more of the first skin and the second skin of the sandwich panel.

A18. The insert of any of paragraphs A1-A17.3, further comprising at least one vent hole configured to allow injection of an adhesive compound into at least one space formed between the body and the core of the sandwich panel, after installation of the insert in the sandwich panel.

A19. The insert of any of paragraphs A1-A18, further comprising a peel flange integrally molded with the panel-engaging structure, wherein the peel flange is removable by peeling it away from the panel-engaging structure after the insert is installed in the sandwich panel.

A20. The insert of any of paragraphs A1-A19, wherein the bore comprises a blind bore into the sandwich panel, extending only part way from the first skin towards the second skin.

A20.1. The insert of any of paragraphs A1-A20, wherein the bore comprises a blind bore into the sandwich panel, extending only part way from the second skin towards the first skin.

A21. The insert of any of paragraphs A1-A20.1, wherein the bore comprises a through-bore through the entire sandwich panel, from the first skin to the second skin, such that the secondary object may extend out from both the first skin and the second skin of the sandwich panel when the secondary object is inserted within the hole of the insert installed in the sandwich panel.

A22. The insert of any of paragraphs A1-A21, wherein the retention feature comprises a snap ring that is configured to be snapped onto the insert prior to installing the insert within the sandwich panel.

A22.1. The insert of any of paragraphs A1-A22, wherein the anti-rotation feature comprises a/the snap ring that is configured to be snapped onto the insert.

A22.2. The insert of paragraph A22.1, wherein the snap ring is configured to be snapped onto the insert prior to installing the insert within the sandwich panel.

A22.3. The insert of any of paragraphs A22-A22.2, wherein the snap ring is configured to expand and engage one or more of the first skin and the second skin as the snap ring is snapped into the bore.

A22.4. The insert of any of paragraphs A22-A22.3, wherein the snap ring comprises at least one cleat extending axially away from a snap ring body, the at least one cleat being configured to be expanded and engaged with one or more of the first skin and the second skin of the sandwich panel when the snap ring and the insert are installed in the sandwich panel.

A22.5. The insert of any of paragraphs A22-A22.4, wherein the snap ring comprises at least one rotation stop extending radially outward from a/the snap ring body, the at least one rotation stop being configured to substantially prevent rotation of the insert with respect to the snap ring.

A23. The insert of any of paragraphs A1-A22.5, wherein the body of the insert is generally cylindrical.

A24. The insert of any of paragraphs A1-A23, wherein a maximum dimension of the panel-engaging structure is greater than a hole diameter of the hole, and optionally wherein the maximum dimension of the panel-engaging structure is at least 20% greater, at least 25% greater, at least 30% greater, at least 35% greater, at least 40% greater, at least 50% greater, at least 60% greater, at least 75% greater, at least 85% greater, at least 100% greater, at least 150% greater, at least 200% greater, and/or at least 300% greater than the hole diameter of the hole of the insert.

A25. The insert of any of paragraphs A1-A24, wherein a/the maximum dimension of the panel-engaging structure is greater than a body diameter of the body of the insert, and optionally wherein the maximum dimension of the panel-engaging structure is at least 20% greater, at least 25% greater, at least 30% greater, at least 35% greater, at least 40% greater, at least 50% greater, at least 60% greater, at least 75% greater, at least 85% greater, at least 100% greater, at least 150% greater, at least 200% greater, and/or at least 300% greater than the body diameter of the body of the insert.

A26. The insert of any of paragraphs A1-A25, wherein a/the hole diameter of the hole of the insert is substantially constant along the length of the hole.

A27. The insert of any of paragraphs A1-A26, wherein a/the body diameter of the body of the insert is substantially constant along the length of the body.

A28. The insert of any of paragraphs A1-A26, wherein a/the body diameter of the body of the insert is variable along the length of the body.

A29. The insert of any of paragraphs A1-A28, wherein the retention feature comprises an expanding portion that is configured to expand into one or more of the core, the first skin, and the second skin of the sandwich panel when the insert is installed within the sandwich panel.

A30. The insert of any of paragraphs A1-A29, wherein the retention feature comprises an insert-receiving base that is configured to retain the insert in the sandwich panel.

B1. An insert-receiving base configured to receive at least one insert, each of the at least one inserts being the insert of any of paragraphs A1-A30, the insert-receiving base comprising:

an outer base surface configured to engage a core of a sandwich panel, the core being sandwiched between a first skin and a second skin of the sandwich panel;

an inner base surface opposite the outer base surface and defining an inner cavity configured to receive at least one of the at least one inserts, wherein the insert-receiving base is configured to retain the at least one of the at least one inserts within the inner cavity, the insert-receiving base being configured to be positioned within a bore of the sandwich panel, the bore being formed through at least one of the first skin and the second skin, and extending into the core.

B2. The insert-receiving base of paragraph B1, wherein the insert-receiving base is configured to receive a plurality of different styles of inserts.

B3. The insert-receiving base of any of paragraphs B1-B2, wherein the at least one insert is selectively removable from the insert-receiving base.

B4. The insert-receiving base of any of paragraphs B1-B3, wherein at least one of the at least one inserts comprises a first insert and a second insert, the first insert and the second insert being arranged longitudinally with respect to one another within the inner cavity of the insert-receiving base, the insert-receiving base further comprising the first insert and the second insert.

B5. The insert-receiving base of paragraph B4, wherein the first insert and the second insert are the same style of inserts.

B6. The insert-receiving base of paragraph B4, wherein the first insert and the second insert are different styles of inserts.

B7. The insert-receiving base of any of paragraphs B1-B6, wherein the insert-receiving base comprises a lip configured to retain the at least one of the at least one inserts within the inner cavity.

B8. The insert-receiving base of any of paragraphs B1-B7, further comprising a first skin-engaging structure configured to engage the first skin of the sandwich panel.

B9. The insert-receiving base of any of paragraphs B1-B8, further comprising a second skin-engaging structure configured to engage the second skin of the sandwich panel.

B10. The insert-receiving base of any of paragraphs B1-B9, wherein at least a portion of the insert-receiving base is configured to expand when the at least one insert is installed within the inner cavity.

B10.1. The insert-receiving base of paragraph B10, further comprising an anchoring wall at least partly defined by a portion of the inner base surface and a portion of the outer base surface, wherein at least a portion of the anchoring wall is configured to expand away from the inner cavity when the at least one insert is installed within the inner cavity.

B10.2. The insert-receiving base of paragraph B10.1, wherein the anchoring wall is configured to expand from an initial position in which the anchoring wall is substantially parallel to a longitudinal axis of the inner cavity to an expanded position in which the anchoring wall forms an angle of at least 5°, at least 10°, at least 15°, at least 20°, at least 25°, at least 30°, at least 35°, at least 40°, at least 45°, at least 50°, at least 55°, and/or at least 60° with the longitudinal axis of the inner cavity.

B10.3. The insert-receiving base of any of paragraphs B10.1-B10.2, wherein the anchoring wall is configured to project from a circumference of the inner cavity a distance of at least 0.25 mm, 0.5 mm, 0.75 mm, 1 mm, 1.5 mm, 2 mm, 3 mm, 4 mm, 5 mm, 6 mm, 7 mm, 8 mm, 9 mm, and/or at least 10 mm from the circumference of the inner cavity.

B11. The insert-receiving base of any of paragraphs B1-B10.3, wherein the insert-receiving base is configured to substantially prevent rotation of the at least one insert with respect to the insert-receiving base, once the at least one insert is installed within the inner cavity.

B12. The insert-receiving base of any of paragraphs B1-B11, wherein the insert-receiving base is configured to be self-retaining within the bore of the sandwich panel.

B13. The insert-receiving base of any of paragraphs B1-B12, wherein the insert-receiving base comprises a first portion and a second portion, the first portion being positioned adjacent the first skin when the insert-receiving base is installed within the sandwich panel and the second portion being positioned adjacent the second skin when the insert-receiving base is installed within the sandwich panel, the first portion being configured to receive a first insert, and the second portion being configured to receive a second insert.

B14. The insert-receiving base of paragraph B13, wherein the first portion of the insert-receiving base comprises an/the anchoring wall that is configured to expand radially outward away from the inner cavity when the first insert is inserted into the insert-receiving base.

B15. The insert-receiving base of paragraph B14, wherein the second portion of the insert-receiving base is substantially unchanged upon insertion of the second insert into the insert-receiving base.

B16. The insert-receiving base of any of paragraphs B1-B15, further comprising a lip configured to be positioned between a first inner surface of the first skin and the core of the sandwich panel, the lip being configured to resist pull-out of the insert-receiving base from the bore of the sandwich panel.

B17. The insert-receiving base of any of paragraphs B1-B15, further comprising a lip configured to be positioned between a second inner surface of the second skin and the core of the sandwich panel, the lip being configured to resist pull-out of the insert-receiving base from the bore of the sandwich panel.

C1. A sandwich panel, comprising:
a first skin having a first inner surface and a first outer surface opposite the first inner surface;
a second skin opposite the first skin, the second skin having a second inner surface and a second outer surface opposite the second inner surface, and the first outer surface and the second outer surface facing away from one another;
a core sandwiched between the first inner surface of the first skin and the second inner surface of the second skin;
at least one bore formed in at least one of the first skin and the second skin, and extending into the core; and
at least one insert, each of the at least one inserts being the insert of any of paragraphs A1-A30 installed in the at least one bore of the sandwich panel.

C1.1. The sandwich panel of paragraph C1, wherein at least one of the at least one bores is formed in the first skin and extends into the core towards the second skin.

C1.2. The sandwich panel of paragraph C1 or C1.1, wherein at least one of the at least one bores is formed in the second skin and extends into the core towards the first skin.

C2. The sandwich panel of any of paragraphs C1-C1.2, wherein the at least one insert comprises a plurality of inserts, each of the plurality of inserts comprising any of the inserts of any of paragraphs A1-A30, wherein each of the plurality of inserts is installed in a respective one of the at least one bores.

C3. The sandwich panel of any of paragraphs C1-C2, further comprising the insert-receiving base of any of paragraphs B1-B17, wherein the at least one insert is positioned within the insert-receiving base.

C4. The sandwich panel of any of paragraphs C1-C3, further comprising a plurality of insert-receiving bases of any of paragraphs B1-B17, wherein at least one respective insert of the at least one inserts is positioned within each respective insert-receiving base of the plurality of insert-receiving bases.

C5. The sandwich panel of any of paragraphs C1-C4, wherein the core comprises one or more of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and polypropylene.

C5.1. The sandwich panel of any of paragraphs C1-05, wherein the first skin comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

C5.2. The sandwich panel of any of paragraphs C1-05.1, wherein the second skin comprises one or more of a laminate of fiberglass-reinforced polymer, a laminate of carbon fiber-reinforced polymer, a thermoset polymer, an epoxy, sheet metal, carbon, aramid, aluminum, steel, plywood, balsa, teak, and hardwood.

C6. The sandwich panel of any of paragraphs C1-05.2, wherein the sandwich panel comprises a composite panel.

C7. The sandwich panel of any of paragraphs C1-C6, wherein the core comprises a honeycomb core.

C7.1. The sandwich panel of any of paragraphs C1-C7, wherein the core comprises a closed-cell structure.

C7.2. The sandwich panel of any of paragraphs C1-C7.1, wherein the core comprises an open-cell structure.

C8. The sandwich panel of any of paragraphs C1-C7.2, wherein a portion of at least one of the at least one inserts is positioned between the first skin and the core.

C9. The sandwich panel of any of paragraphs C1-C8, wherein at least a portion of the panel-engaging structure of at least one of the at least one inserts is positioned between the first skin and the core.

C9.1. The sandwich panel of any of paragraphs C8-C9, wherein at least a portion of the panel-engaging structure of at least one of the at least one inserts is positioned adjacent the first inner surface of the first skin.

C9.2. The sandwich panel of paragraph C9.1, wherein at least a portion of the panel-engaging structure of at least one of the at least one inserts is engaged with the first inner surface of the first skin.

C9.3. The sandwich panel of any of paragraphs C1-C9.2, wherein a portion of at least one of the at least one inserts is positioned between the second skin and the core.

C9.4. The sandwich panel of any of paragraphs C1-C9.3, wherein at least a portion of the panel-engaging structure of at least one of the at least one inserts is positioned between the second skin and the core.

C9.5. The sandwich panel of any of paragraphs C9.3-C9.5, wherein at least a portion of the panel-engaging structure of at least one of the at least one inserts is positioned adjacent the second inner surface of the second skin.

C9.6. The sandwich panel of paragraph C9.5, wherein at least a portion of the panel-engaging structure of at least one of the at least one inserts is engaged with the second inner surface of the second skin.

C10. The sandwich panel of any of paragraphs C1-C9.6, wherein at least one of the at least one inserts comprises a blind insert, wherein the opposing end is embedded within the core of the sandwich panel.

C10.1. The sandwich panel of any of paragraphs C1-C10, wherein at least one of the at least one inserts comprises a double blind insert, wherein at least one of the at least one bores comprises a first bore formed in the first skin and through a portion of the core, wherein the at least one of the at least one bores comprises a second bore formed in the second skin and through a portion of the core, wherein the first bore is substantially concentric with the second bore, and wherein the double blind insert comprises a first insert and a second insert, the first insert being installed in the first bore and the second insert being installed in the second bore.

C11. The sandwich panel of any of paragraphs C1-C10.1, wherein at least one of the at least one bores extends through the first skin and the second skin, and wherein at least one of the at least one inserts comprises a through-insert and the opposing end is positioned adjacent the second skin of the sandwich panel.

C11.1. The sandwich panel of any of paragraphs C1-C11, wherein at least one of the at least one bores extends through the first skin and the second skin, and wherein at least one of the at least one inserts comprises a through-insert and the opposing end is positioned adjacent the first skin of the sandwich panel.

C12. The sandwich panel of any of paragraphs C1-C11.1, wherein at least a portion of the panel-engaging structure of at least one of the at least one inserts is substantially flush with the first outer surface of the first skin.

C12.1. The sandwich panel of any of paragraphs C1-C12, wherein at least a portion of the panel-engaging structure of at least one of the at least one inserts is substantially flush with the second outer surface of the second skin.

C13. The sandwich panel of any of paragraphs C1-C12.1, wherein at least a portion of the opposing end of at least one of the at least one inserts is substantially flush with the second outer surface of the second skin.

C13.1. The sandwich panel of any of paragraphs C1-C13, wherein at least a portion of the opposing end of at least one of the at least one inserts is substantially flush with the first outer surface of the first skin.

C14. The sandwich panel of any of paragraphs C1-C13.1, wherein the at least one bore comprises a plurality of bores, each respective bore of the plurality of bores extending from at least one of the first skin and the second skin, and into the core, wherein the at least one insert comprises a plurality of inserts, each of the plurality of inserts being an insert of any of paragraphs A1-A30, and wherein at least one of the plurality of inserts is installed within each respective bore of the plurality of bores.

C15. The sandwich panel of any of paragraphs C1-C14, wherein each of the at least one bores comprises a substantially cylindrical bore formed at least partly through the core.

C16. The sandwich panel of any of paragraphs C1-C15, wherein at least one of the at least one bores comprises a cut-out formed through the first skin.

C16.1. The sandwich panel of any of paragraphs C1-C16, wherein at least one of the at least one bores comprises a cut-out formed through the second skin.

C17. The sandwich panel of paragraph C16 or C16.1, wherein the cut-out extends at least partially into the core of the sandwich panel.

C18. The sandwich panel of any of paragraphs C16-C17, wherein the cut-out is substantially triangular.

C19. The sandwich panel of any of paragraphs C16-C18, wherein the cut-out has a surface area that is larger than that of the bore.

C20. The sandwich panel of any of paragraphs C1-C19, further comprising at least one slit cut in the first skin.

C21. The sandwich panel of any of paragraphs C1-C20, further comprising at least one slit cut in the second skin.

C22. The sandwich panel of C20 or C21, wherein the at least one slit extends radially from the at least one bore.

C23. The sandwich panel of any of paragraphs C20-C22, wherein the at least one bore comprises a plurality of bores, and wherein the at least one slit comprises at least 1, at least 2, at least 4, at least 8, at least 12, at least 16, and/or at least 20 slits radially extending from each of the plurality of bores.

C24. The sandwich panel of paragraph C23, wherein the at least one slit comprises at least two slits radially extending from each of the plurality of bores, and wherein the at least two slits are equally spaced about a respective circumference of each respective bore of the plurality of bores.

C25. The sandwich panel of paragraph C23, wherein the at least one slit comprises at least two slits radially extending from each of the plurality of bores, the at least two slits being arranged in respective pairs.

C26. The sandwich panel of any of paragraphs C20-C25, wherein a portion of the first skin is depressed adjacent at least one of the at least one slits.

C27. The sandwich panel of any of paragraphs C1-C26, further comprising one or more of a potting compound, a quick cure compound, and a UV cure compound inserted between the core of the sandwich panel and the body of at least one of the at least one inserts.

C28. The sandwich panel of any of paragraphs C1-C27, further comprising at least one retainer configured to retain at least one of the at least one inserts within the at least one bore.

D1. An apparatus including at least one sandwich panel according to any of paragraphs C1-C28.

D2. The apparatus of paragraph D1, wherein the apparatus comprises one or more of an aircraft, a satellite, an antenna, a transit vehicle, a shipping container, an automobile, and a shelter.

D3. The apparatus of any of paragraphs D1-D2, wherein the sandwich panel forms a portion of one or more of a floor, a galley, an interior main structure, a secondary structure, an interior wall, a stow bin, an overhead compartment, a lavatory, a capsule panel, a nose cone, an instrumentation enclosure, a bulkhead panel, a curtain wall, a partition, and a divider panel in the apparatus.

E1. A method of installing an insert into a bore formed in a sandwich panel, the method comprising:
providing at least one insert, each of the at least one inserts being the insert of any of paragraphs A1-A30;
forming at least one bore in a sandwich panel, the sandwich panel having a first skin having a first inner surface and an opposite first outer surface, a second skin opposite the first skin, the second skin having a second inner surface and an opposite second outer surface, the first outer surface and the second outer surface facing away from one another, and a core sandwiched between the first inner surface of the first skin and the second inner surface of the second skin, wherein the forming the at least one bore comprises forming at least one bore such that it extends through at least one of the first skin and the second skin, and into the core; and installing the at least one insert into a respective one of the at least one bores, such that the panel-engaging structure of the insert engages the sandwich panel, and the body of the insert is positioned within the respective bore in the core of the sandwich panel.

E1.1. The method of paragraph E1, wherein the panel-engaging structure of at least one of the at least one inserts engages the first skin of the sandwich panel.

E1.2. The method of paragraph E1 or E1.1, wherein the panel-engaging structure of at least one of the at least one inserts engages the second skin of the sandwich panel.

E2. The method of any of paragraphs E1-E1.2, wherein the forming the at least one bore comprises forming at least one blind bore that extends only partially into a thickness of the core of the sandwich panel.

E3. The method of paragraph E2, wherein the forming the at least one bore comprises forming a plurality of blind bores in the sandwich panel.

E4. The method of paragraph E3, wherein the forming the at least one bore comprises forming a first blind bore through the first skin and forming a second blind bore through the second skin, wherein the first blind bore and the second blind bore are substantially concentric.

E4.1. The method of paragraph E4, wherein the installing the at least one insert comprises installing a first insert into the first blind bore and installing a second insert into the second blind bore.

E4.2. The method of paragraph E4.1, wherein the first insert is a different type of insert than the second insert.

E5. The method of any of paragraphs E1-E4.2, wherein the forming the at least one bore comprises forming at least one through-bore that extends through the first skin, the second skin, and a/the thickness of the core of the sandwich panel.

E6. The method of any of paragraphs E1-E5, wherein the forming the at least one bore comprises one or more of drilling, milling, and punching.

E7. The method of any of paragraphs E1-E6, wherein the forming the at least one bore comprises forming at least one circular bore through at least a portion of a/the thickness of the core of the sandwich panel.

E8. The method of any of paragraphs E1-E7, further comprising milling a portion of the first skin adjacent at least one of the at least one bores, to form a cut-out having a surface area that is larger than that of the respective adjacent bore.

E9. The method of any of paragraphs E1-E8, further comprising milling a portion of the second skin adjacent at least one of the at least one bores, to form a cut-out having a surface area that is larger than that of the respective adjacent bore.

E10. The method of paragraph E8 or E9, wherein the cut-out is substantially triangular.

E11. The method of any of paragraphs E1-E10, wherein the forming the at least one bore comprises forming a plurality of bores, and wherein the installing at least one insert comprises installing a plurality of inserts, each respective insert of the plurality of inserts being installed into a respective bore of the plurality of bores.

E12. The method of any of paragraphs E1-E11, wherein the installing the at least one insert comprises rotating the at least one insert about a longitudinal axis of the bore, optionally wherein the insert is rotated at least 5°, at least 10°, at least 20°, at least 30°, at least 40°, at least 50°, at least 60°, at least 70°, at least 80°, at least 90°, at least 120°, at least 150°, and/or at least 180°.

E13. The method of any of paragraphs E1-E12, wherein the installing the at least one insert comprises breaking a bond between the first skin and the core, adjacent the respective bore.

E14. The method of any of paragraphs E1-E13, wherein the installing the at least one insert comprises breaking a bond between the second skin and the core, adjacent the respective bore.

E15. The method of any of paragraphs E1-E14, further comprising inserting at least one secondary object within the hole of a respective insert of the at least one inserts, the at least one secondary object being configured to transfer a localized load to the sandwich panel via the insert.

E16. The method of any of paragraphs E1-E15, further comprising injecting one or more of a potting compound, a quick-cure adhesive, and a UV-cure adhesive into a space between the body of the insert and the core of the sandwich panel, inside the bore.

E17. The method of paragraphs E15 and E16, wherein the inserting the at least one secondary object is performed before the one or more of the potting compound, the quick-cure adhesive, and the UV-cure adhesive is allowed to cure.

E18. The method of paragraph E16 or E17, further comprising applying a load to the at least one insert before the one or more of the potting compound, the quick-cure adhesive, and the UV-cure adhesive is allowed to cure.

E19. The method of any of paragraphs E1-E15, wherein the installing the at least one insert is performed without the use of a potting compound, a quick-cure adhesive, or a UV-cure adhesive.

E20. The method of any of paragraphs E1-E19, further comprising installing at least one insert-receiving base of any of paragraphs B1-1317 into a respective one of the at least one bores of the sandwich panel, and wherein the installing the at least one insert into the respective one of the at least one bores comprises installing at least one of the at least one inserts into a respective insert-receiving base of the at least one insert-receiving bases.

E21. The method of paragraph E20, wherein the installing the at least one of the at least one inserts into the respective one of the at least one insert-receiving bases comprises expanding the respective insert-receiving base such that at least a portion of the outer surface of the respective insert-receiving base is pressed into the respective bore of the at least one bores, due to the at least one of the at least one inserts pressing on the inner surface of the insert-receiving base when the respective at least one insert is installed therein.

E22. The method of paragraph E20 or E21, further comprising removing the at least one of the at least one inserts from the respective insert-receiving base.

E23. The method of any of paragraphs E1-E22, further comprising removing one or more integrated peel flanges from at least one of the at least one inserts after the installing the at least one insert into the respective one of the at least one bores.

E24. The method of any of paragraphs E1-E23, further comprising inserting a snap ring onto at least one of the at least one inserts.

E24.1. The method of paragraph E24, further comprising inserting the snap ring into at least one of the at least one bores, thereby engaging the first skin of the sandwich panel with a flange of the snap ring.

E24.2. The method of paragraph E24, further comprising inserting the snap ring into at least one of the at least one bores, thereby engaging the second skin of the sandwich panel with a flange of the snap ring.

E24.3. The method of paragraph E24.1 or E24.2, further comprising pushing the insert into the snap ring, thereby expanding at least one cleat of the snap ring into the at least one bore of the sandwich panel.

E24.4. The method of any of paragraphs E24.1-E24.3, further comprising causing a portion of the snap ring to engage with one or more of the first inner surface of the first skin and the second inner surface of the second skin.

E25. The method of any of paragraphs E24-E24.4, further comprising rotating the at least one of the at least one inserts with respect to the snap ring, thereby locking the at least one of the at least one inserts with respect to the snap ring.

E26. The method of any of paragraphs E1-E25, further comprising forming at least one slit in the first skin, radially extending from at least one of the at least one bores.

E27. The method of any of paragraphs E1-E26, further comprising forming at least one slit in the second skin, radially extending from at least one of the at least one bores.

E28. The method of paragraph E26 or E27, further comprising depressing at least one portion of at least one of the first skin and the second skin, adjacent at least one of the at least one slits.

E28.1. The method of paragraph E28, wherein the depressing the at least one portion of the at least one of the first skin and the second skin comprises forming a space to receive a portion of at least one of the at least one inserts.

E28.2. The method of paragraph E12 and any of paragraphs E27-E28.1, wherein the rotating the at least one insert about the longitudinal axis of the bore comprises rotating the at least one insert until a rotation stop of a snap ring contacts the panel-engaging structure of the insert.

E29. The method of any of paragraphs E1-E28.2, wherein one or more of the forming the at least one bore in the sandwich panel and the installing the at least one insert into the respective one of the at least one bores is automated.

E30. The method of any of paragraphs E1-E29, further comprising installing a retainer on at least one of the at least one inserts, the retainer being configured to resist movement of the at least one of the at least one inserts with respect to the sandwich panel.

E31. The method of paragraph E30, wherein the retainer is substantially triangular.

E32. The method of paragraph E30 or E31, wherein the retainer comprises a plurality of tabs, at least a portion of each of the plurality of tabs being configured to be positioned between the first inner surface of the first skin and the core.

E33. The method of paragraph E30 or E31, wherein the retainer comprises a plurality of tabs, at least a portion of each of the plurality of tabs being configured to be positioned between the second inner surface of the second skin and the core.

F1. Use of the insert of any of paragraphs A1-A30 to receive the secondary object within the hole of the insert, to transfer the localized load to the sandwich panel via the insert.

G1. Use of the sandwich panel of any of paragraphs C1-C28 to construct a portion of one or more of an aircraft, a satellite, an antenna, a transit vehicle, a shipping container, an automobile, and a shelter.

H1. Use of the insert-receiving base of any of paragraphs B1-B17 to receive the insert of any of paragraphs A1-A30 and position the same within a sandwich panel.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An insert configured to be installed in a bore of a sandwich panel, the sandwich panel comprising a first skin, a second skin opposite the first skin, and a core therebetween; the insert comprising:
   a panel-engaging structure configured to engage one of the first skin and the second skin of the sandwich panel when the insert is installed in the sandwich panel;
   an opposing end opposite the panel-engaging structure;
   a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;
   a retention feature configured to retain the insert in the sandwich panel without the use of adhesives, at least a portion of the retention feature being configured to be positioned between the first skin and the second skin of the sandwich panel when the insert is installed in the sandwich panel; and
   an anti-rotation feature configured to prevent rotation of the insert with respect to the sandwich panel, wherein the anti-rotation feature is configured to resist rotation of the insert with respect to the sandwich panel, about a longitudinal axis of the hole, wherein the insert is configured to receive a secondary object within the hole, the secondary object being configured to transfer a localized load to the sandwich panel via the insert, wherein the insert is configured to be rotated about a longitudinal axis of the hole as it is installed in the sandwich panel, and wherein the insert is configured to be rotated with respect to the sandwich panel such that at least a portion of the panel-engaging structure is rotated to a position between the core and one of the first skin and the second skin, and such that it breaks a bond between the first skin and the core, adjacent the bore.

2. The insert according to claim 1, wherein the hole comprises internal threads.

3. The insert according to claim 1, wherein the panel-engaging structure is substantially triangular.

4. The insert according to claim 1, wherein the first skin of the sandwich panel comprises a first outer surface facing away from the core of the sandwich panel and a first inner surface opposite the first outer surface and facing the core of the sandwich panel, wherein at least a portion of the panel-engaging structure is positioned between the first inner surface of the first skin and the core when the insert is installed in the sandwich panel.

5. The insert according to claim 1, wherein the second skin of the sandwich panel comprises a second outer surface facing away from the core of the sandwich panel and a second inner surface opposite the second outer surface and facing the core of the sandwich panel, wherein at least a portion of the panel-engaging structure is positioned between the second inner surface of the second skin and the core when the insert is installed in the sandwich panel.

6. The insert according to claim 1, wherein the anti-rotation feature of the insert comprises a retainer configured to substantially prevent rotation of the insert within the sandwich panel, wherein the retainer comprises a through-hole that is substantially concentric with the hole of the insert when the retainer is installed with respect to the insert, the through-hole having approximately the same diameter as the hole, and wherein the retainer is configured to cover at least one exposed area of the core of the sandwich panel when the retainer is installed with respect to the insert.

7. The insert according to claim 6, wherein the retainer comprises a substantially flat surface and at least one projecting tab extending from the substantially flat surface, wherein the substantially flat surface is configured to engage the panel-engaging structure of the insert, and wherein the at least one projecting tab is configured to engage at least one selected from the group comprising the core, the first skin, and the second skin of the sandwich panel.

8. The insert according to claim 1, wherein the insert is configured such that rotation of the insert with respect to the sandwich panel effectuates at least one selected from the group comprising engaging the retention feature with the sandwich panel, and engaging the anti-rotation feature with the sandwich panel.

9. The insert according to claim 1, wherein the retention feature engages the sandwich panel when the insert is installed in the sandwich panel.

10. The insert according to claim 1, wherein the panel-engaging structure comprises a plurality of straight edges connected by a respective plurality of corner portions, wherein the retention feature comprises at least one of the corner portions, and wherein the corner portions are configured to be positioned between a first inner surface of the first skin and the core when the insert is installed in the sandwich panel.

11. An insert configured to be installed in a bore of a sandwich panel, the sandwich panel comprising a first skin, a second skin opposite the first skin, and a core therebetween; the insert comprising:
a panel-engaging structure configured to engage one selected from the group comprising the first skin and the second skin of the sandwich panel, when the insert is installed in the sandwich panel;
an opposing end opposite the panel-engaging structure;
a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;
a retention feature configured to retain the insert in the sandwich panel without the use of adhesives; and
a retainer configured to resist rotation of the body with respect to the sandwich panel, about a longitudinal axis of the hole, wherein the insert is configured to receive a secondary object within the hole, the secondary object being configured to transfer a localized load to the sandwich panel via the insert, wherein the insert is configured to be rotated about a longitudinal axis of the hole as it is installed in the sandwich panel, and wherein the insert is configured to be rotated with respect to the sandwich panel such that at least a portion of the panel-engaging structure is rotated to a position between the core and the first skin, and such that it breaks a bond between the first skin and the core, adjacent the bore.

12. The insert according to claim 11, wherein the retainer is configured to be installed on the panel-engaging structure after the body is installed in the bore of the sandwich panel, wherein the retainer comprises a through-hole that is substantially concentric with the hole of the body when the retainer is installed with respect to the body, the through-hole having approximately the same diameter as the hole formed in the body.

13. The insert according to claim 11, wherein the retainer comprises a substantially flat surface and at least one projecting tab extending from the substantially flat surface, wherein the substantially flat surface is configured to engage the panel-engaging structure of the insert, and wherein the at least one projecting tab is configured to engage one or more selected from the group comprising the core, the first skin, and the second skin of the sandwich panel.

14. An insert configured to be installed in a bore of a sandwich panel, the sandwich panel comprising a first skin, a second skin opposite the first skin, and a core therebetween; the insert comprising:
a panel-engaging structure configured to engage one of the first skin and the second skin of the sandwich panel when the insert is installed in the sandwich panel;
an opposing end opposite the panel-engaging structure;
a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;
a retention feature configured to retain the insert in the sandwich panel without the use of adhesives, at least a portion of the retention feature being configured to be positioned between the first skin and the second skin of the sandwich panel when the insert is installed in the sandwich panel; and an anti-rotation feature configured to prevent rotation of the insert with respect to the sandwich panel, wherein the anti-rotation feature is configured to resist rotation of the insert with respect to the sandwich panel, about a longitudinal axis of the hole, wherein the anti-rotation feature of the insert comprises a retainer configured to substantially prevent rotation of the insert within the sandwich panel, wherein the retainer comprises a through-hole that is substantially concentric with the hole of the insert when the retainer is installed with respect to the insert, the through-hole having approximately the same diameter as the hole, and wherein the retainer is configured to cover at least one exposed area of the core of the sandwich panel when the retainer is installed with respect to the insert, and wherein the insert is configured to receive a secondary object within the hole, the secondary object being configured to transfer a localized load to the sandwich panel via the insert.

15. The insert according to claim 14, wherein the retainer comprises a substantially flat surface and at least one projecting tab extending from the substantially flat surface, wherein the substantially flat surface is configured to engage the panel-engaging structure of the insert, and wherein the at least one projecting tab is configured to engage at least one selected from the group comprising the core, the first skin, and the second skin of the sandwich panel.

16. An insert configured to be installed in a bore of a sandwich panel, the sandwich panel comprising a first skin, a second skin opposite the first skin, and a core therebetween; the insert comprising:

a panel-engaging structure configured to engage one selected from the group comprising the first skin and the second skin of the sandwich panel, when the insert is installed in the sandwich panel;

an opposing end opposite the panel-engaging structure;

a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;

a retention feature configured to retain the insert in the sandwich panel without the use of adhesives; and a retainer configured to resist rotation of the body with respect to the sandwich panel, about a longitudinal axis of the hole, wherein the retainer is configured to be installed on the panel-engaging structure after the body is installed in the bore of the sandwich panel, wherein the retainer comprises a through-hole that is substantially concentric with the hole of the body when the retainer is installed with respect to the body, the through-hole having approximately the same diameter as the hole formed in the body, and wherein the insert is configured to receive a secondary object within the hole, the secondary object being configured to transfer a localized load to the sandwich panel via the insert.

17. An insert configured to be installed in a bore of a sandwich panel, the sandwich panel comprising a first skin, a second skin opposite the first skin, and a core therebetween; the insert comprising:

a panel-engaging structure configured to engage one selected from the group comprising the first skin and the second skin of the sandwich panel, when the insert is installed in the sandwich panel;

an opposing end opposite the panel-engaging structure;

a body disposed between the panel-engaging structure and the opposing end, the body being configured to engage the core of the sandwich panel when the insert is installed in the sandwich panel, the body having a hole formed therein, the hole extending from the panel-engaging structure into the body and towards the opposing end;

a retention feature configured to retain the insert in the sandwich panel without the use of adhesives; and a retainer configured to resist rotation of the body with respect to the sandwich panel, about a longitudinal axis of the hole, wherein the retainer comprises a substantially flat surface and at least one projecting tab extending from the substantially flat surface, wherein the substantially flat surface is configured to engage the panel-engaging structure of the insert, and wherein the at least one projecting tab is configured to engage one or more selected from the group comprising the core, the first skin, and the second skin of the sandwich panel, and wherein the insert is configured to receive a secondary object within the hole, the secondary object being configured to transfer a localized load to the sandwich panel via the insert.

* * * * *